United States Patent
Caldeira et al.

(10) Patent No.: US 10,785,832 B2
(45) Date of Patent: Sep. 22, 2020

(54) SYSTEMS AND METHODS FOR SELECTIVE SENSING AND SELECTIVE THERMAL HEATING USING NANOSTRUCTURES

(71) Applicant: Elwha LLC, Bellevue, WA (US)

(72) Inventors: Kenneth G. Caldeira, Redwood City, CA (US); Peter L. Hagelstein, Carlisle, MA (US); Roderick A. Hyde, Redmond, WA (US); Edward K. Y. Jung, Las Vegas, NV (US); Jordin T. Kare, Seattle, WA (US); Nathan P. Myhrvold, Bellevue, WA (US); David Schurig, Salt Lake City, UT (US); Clarence T. Tegreene, Mercer Island, WA (US); Thomas Allan Weaver, San Mateo, CA (US); Charles Whitmer, North Bend, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 1574 days.

(21) Appl. No.: 14/530,231

(22) Filed: Oct. 31, 2014

(65) Prior Publication Data
US 2016/0123911 A1    May 5, 2016

(51) Int. Cl.
| | | |
|---|---|---|
| H05B 1/02 | (2006.01) |
| H05B 3/20 | (2006.01) |
| H05B 3/14 | (2006.01) |
| G01N 25/48 | (2006.01) |
| G01K 17/00 | (2006.01) |
| G01K 7/16 | (2006.01) |
| G01K 11/18 | (2006.01) |

(52) U.S. Cl.
CPC ............. *H05B 3/20* (2013.01); *G01K 7/16* (2013.01); *G01K 11/18* (2013.01); *G01K 17/006* (2013.01); *G01N 25/4806* (2013.01); *H05B 1/0227* (2013.01); *H05B 3/145* (2013.01); *H05B 2214/04* (2013.01)

(58) Field of Classification Search
CPC ........ H05B 3/20; H05B 1/0277; H05B 3/145; H05B 3/026; H05B 2203/005; H05B 2203/02; G01K 7/16; G01K 11/18; G01K 17/006; G01K 26/4806
USPC ................ 219/388, 483–486, 508, 504, 505
See application file for complete search history.

(56) References Cited

U.S. PATENT DOCUMENTS

| | | | |
|---|---|---|---|
| 4,485,294 A * | 11/1984 | Rosenberg .......... | G03D 13/002 219/216 |
| 6,597,450 B1 * | 7/2003 | Andrews ................ | G01N 21/64 356/246 |
| 7,073,937 B2 | 7/2006 | Nakayama et al. | |

(Continued)

OTHER PUBLICATIONS

S. Selvarasah et al., A Three Dimensioinal Thermal Sensor Based on Single-Walled Carbon Nanotubes, http://www.ece.neu.edu/faculty/mehmetd/publication/thermal%20sensor10.pdf, visited Dec. 3, 2014, 4 pgs.

(Continued)

*Primary Examiner* — Mark H Paschall

(57) ABSTRACT

Various methods for sensing and/or heating that utilize nanostructures or carbon structures, such as nanotubes, nanotube meshes, or graphene sheets, are disclosed. In some methods, at least a pair of contacts are electrically coupled with a given nanostructure or carbon structure to sense a change or to pass a current for heating.

21 Claims, 43 Drawing Sheets

(56) References Cited

U.S. PATENT DOCUMENTS

| | | | |
|---|---|---|---|
| 7,268,350 B1 | 9/2007 | Ouvrier-Buffet et al. | |
| 8,084,716 B2* | 12/2011 | Day | B60L 1/02 |
| | | | 219/203 |
| 8,596,108 B2* | 12/2013 | Bristol | G01N 27/122 |
| | | | 73/25.01 |
| 9,028,142 B2* | 5/2015 | Raravikar | B82Y 15/00 |
| | | | 374/112 |
| 2002/0084410 A1 | 7/2002 | Colbert et al. | |
| 2002/0172820 A1 | 11/2002 | Majumdar et al. | |
| 2004/0240252 A1 | 12/2004 | Pinkerton et al. | |
| 2006/0231237 A1 | 10/2006 | Dangelo | |
| 2007/0138010 A1* | 6/2007 | Ajayan | G01L 1/005 |
| | | | 204/400 |
| 2007/0277866 A1 | 12/2007 | Sander et al. | |
| 2008/0251723 A1* | 10/2008 | Ward | G01J 5/02 |
| | | | 250/338.4 |
| 2009/0084969 A1 | 4/2009 | Ohta et al. | |
| 2009/0220561 A1 | 9/2009 | Jin et al. | |
| 2009/0277897 A1 | 11/2009 | Lashmore et al. | |
| 2011/0051775 A1* | 3/2011 | Ivanov | B82Y 30/00 |
| | | | 374/143 |
| 2012/0125771 A1* | 5/2012 | Salzer | G01N 27/308 |
| | | | 204/412 |
| 2013/0078622 A1 | 3/2013 | Collins et al. | |
| 2013/0255906 A1 | 10/2013 | Chang et al. | |
| 2014/0105242 A1* | 4/2014 | Fernandes | G01J 5/046 |
| | | | 374/45 |
| 2015/0312967 A1* | 10/2015 | Qian | H05B 3/84 |
| | | | 219/203 |
| 2015/0369675 A1 | 12/2015 | Caldeira et al. | |
| 2016/0238547 A1* | 8/2016 | Park | C08K 7/00 |

OTHER PUBLICATIONS

Fung et al., Dielectrophoretic Batch Fabrication of Encapsulated Carbon Nanotube Thermal Sensors, http://70.40.222.74/ftp/papers/apcot-mnt-2004-kmfung.doc, visited Dec. 3, 2014, 4 pgs.

B. Crawford et al., Flexible Carbon Nanotube Based Temperature Sensor for Ultra-Small-Site Applications, Mechanical Engineering Undergraduate Capstone Projects. Paper 55, http://hdl.handle.net/2047/d10012904, visited Dec. 3, 2014, 84 pgs.

C.Gau et al., Nano Temperature Sensor Using Selective Lateral Growth of Carbon Nanotube Between Electrodes, Proceedings of the 5th IEEE Conference on Nanotechnology (2005), pp. 63-69.

P. Dorozhkin et al., A Liquid-Ga-Filled Carbon Nanotube: A Miniaturized Temperature Sensor and Electrical Switch, Small, vol. 1, No. 11 (2005), pp. 1088-1093.

L. Dai et al., Sensors and Sensor Arrays Based on Conjugated Polymers and Carbon Nanotubes, Pure and Applied Chemistry, vol. 74, No. 9 (2002), pp. 1753-1772.

G.U. Sumanasekera et al., Thermoelectric Chemical Sensor Based on Single Wall Carbon Nanotubes, Molecular Crystals and Liquid Crystals, vol. 387, (2002) pp. [253]/31-[261]/37.

G.E. Begtrup et al., Probing Nanoscale Solids at Thermal Extremes: Supplementary Materials, http://research.physics.berkeley.edu/zettl/projects/tehrmal_test_plat/Extreme.html, visited Dec. 3, 2014, 5 pgs.

* cited by examiner

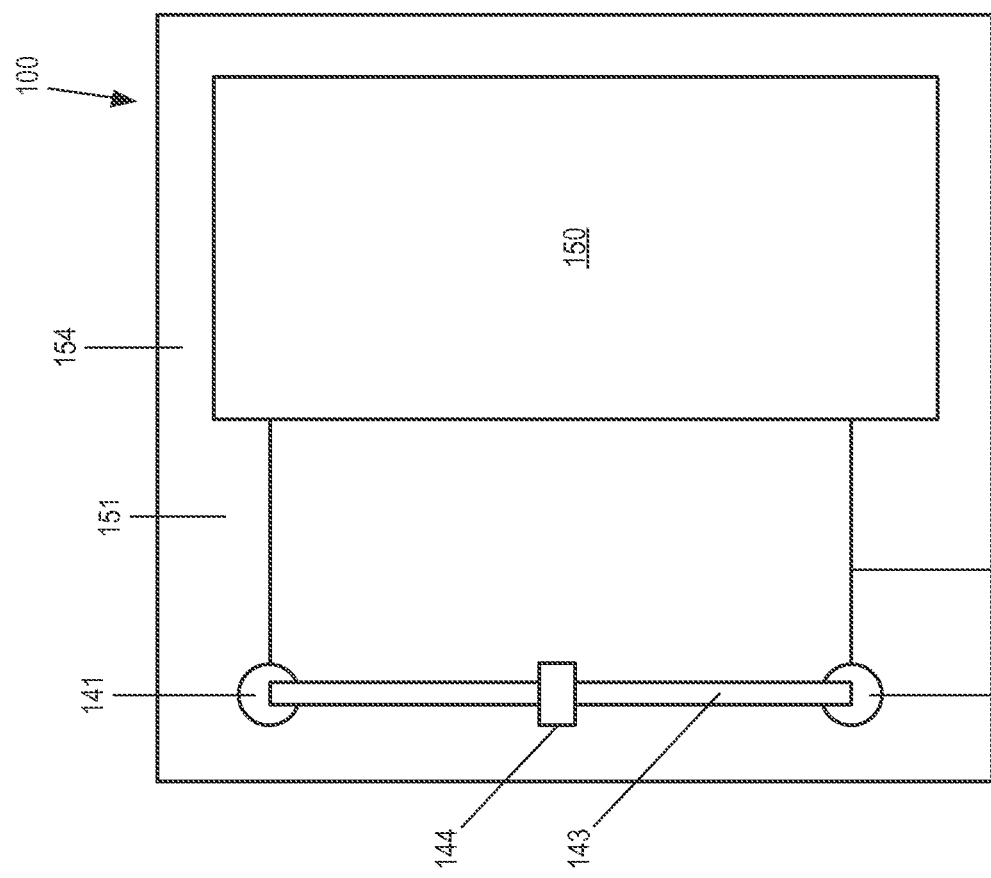
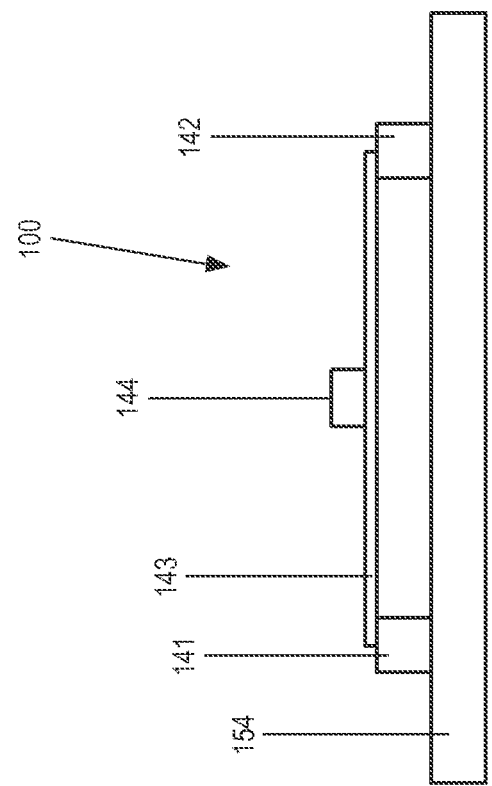
FIG. 1B
FIG. 1A

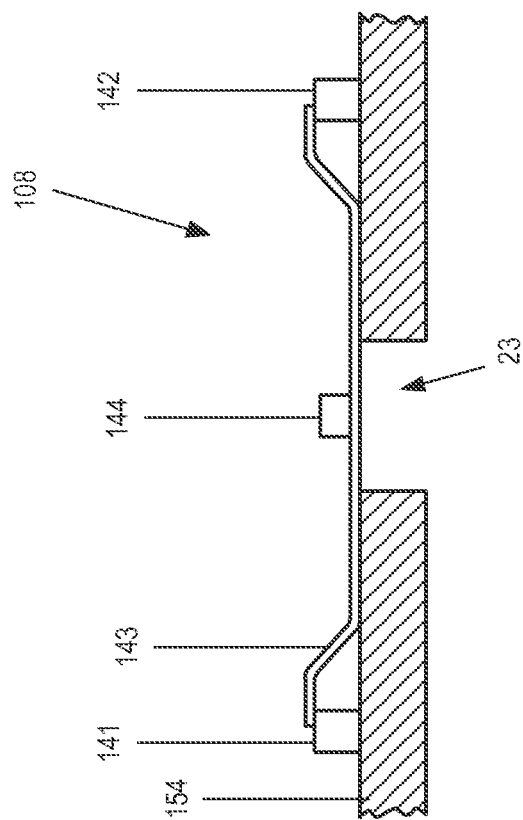
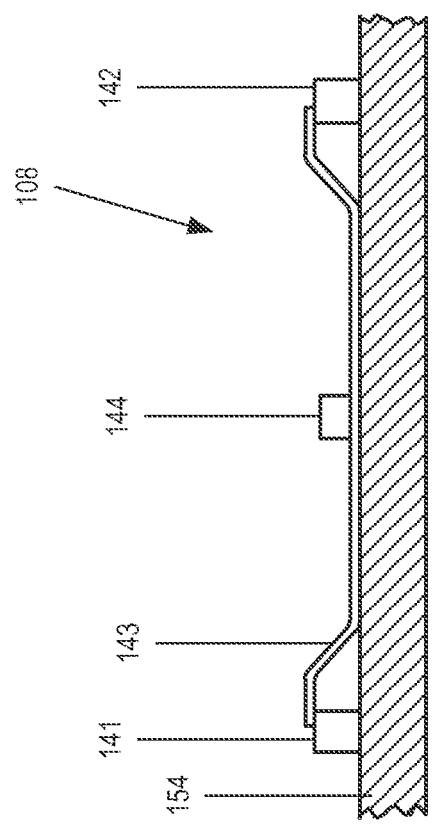
FIG. 12B
FIG. 12A

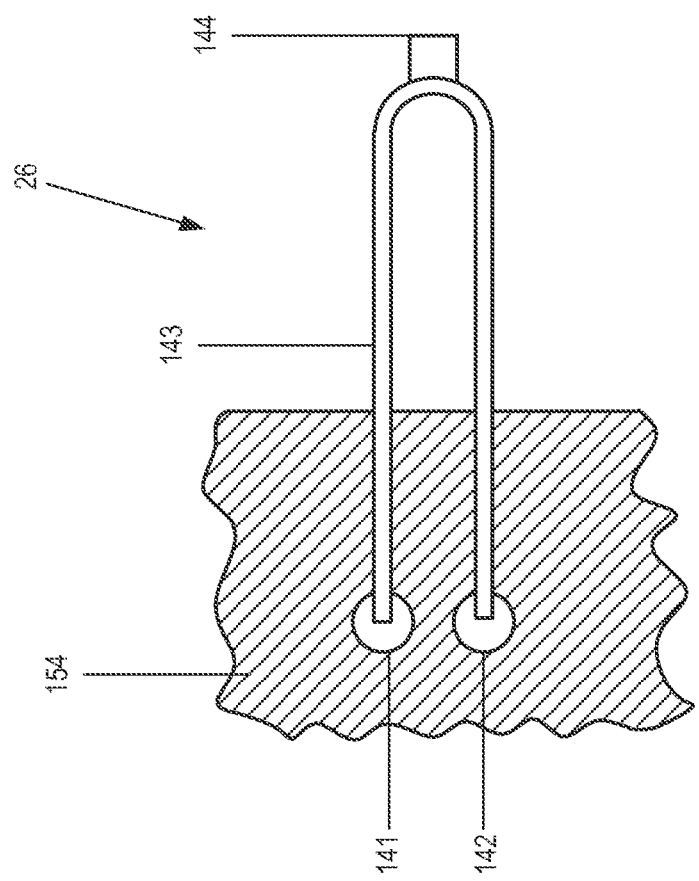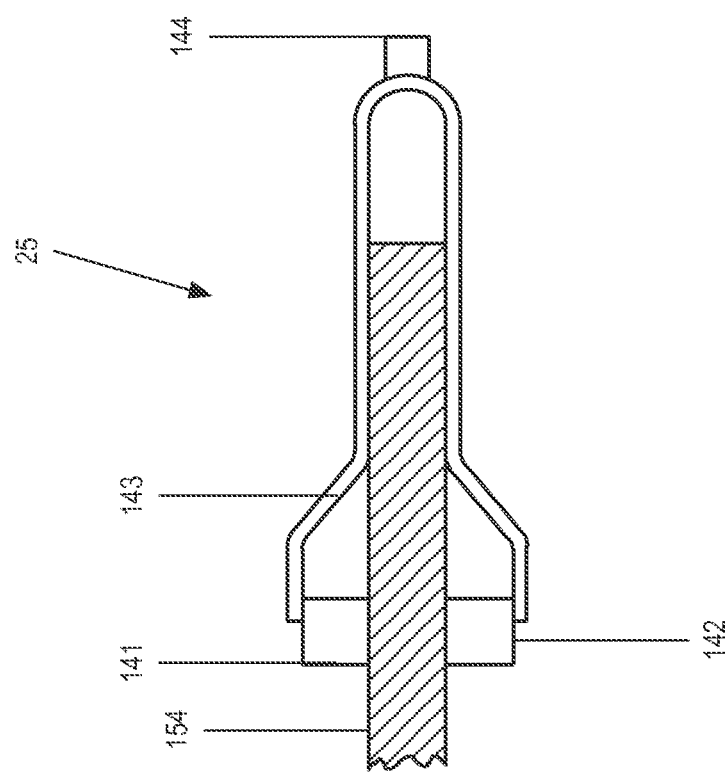
FIG. 12D
FIG. 12C

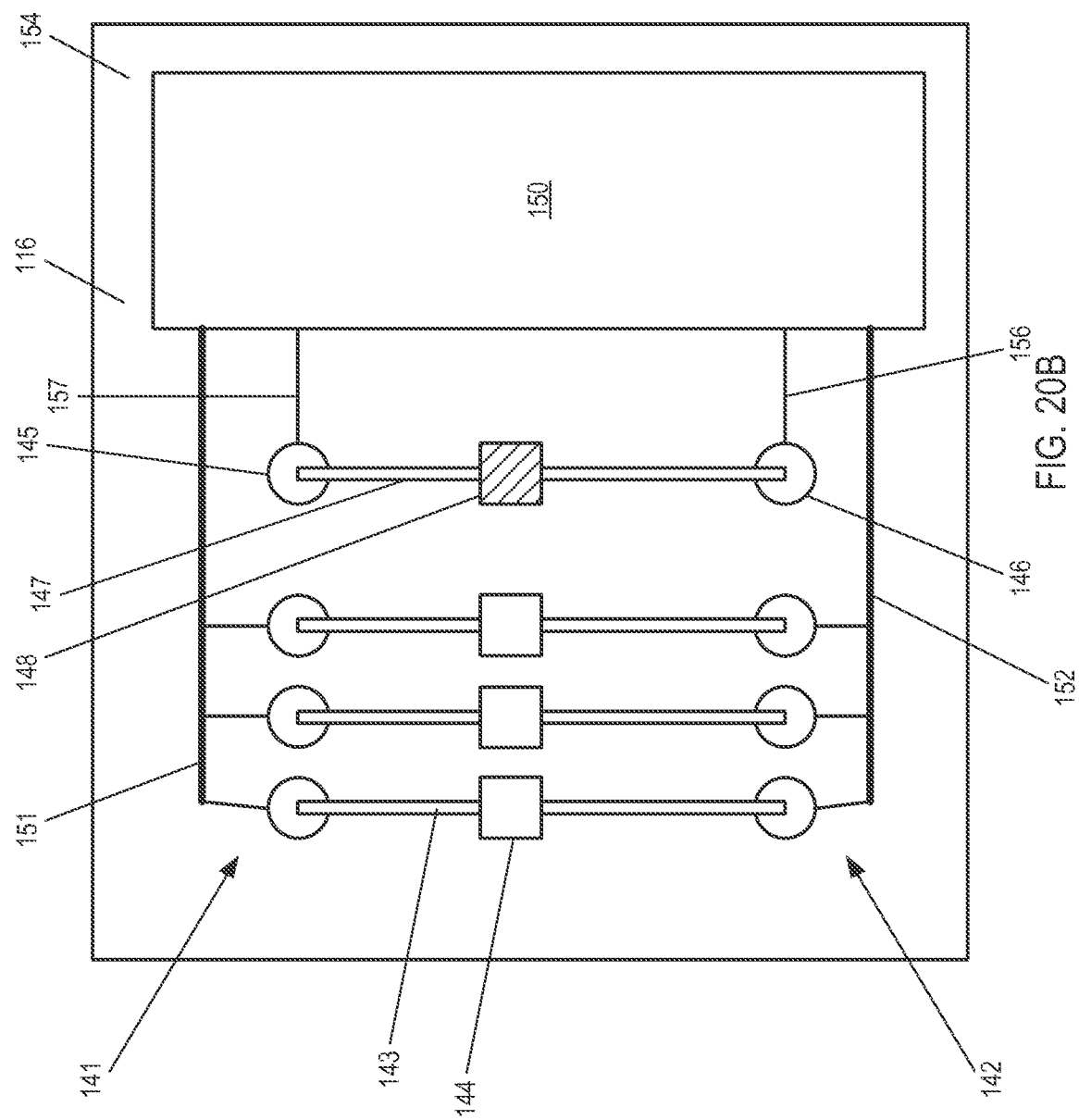

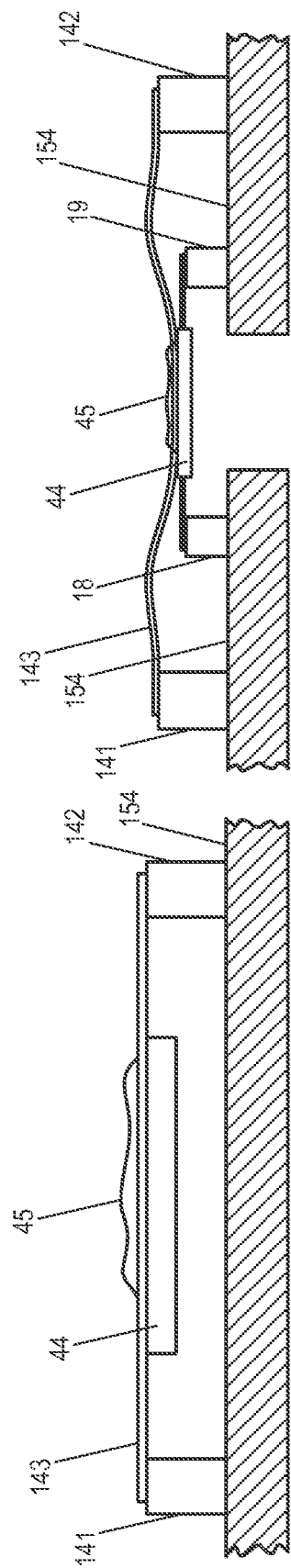

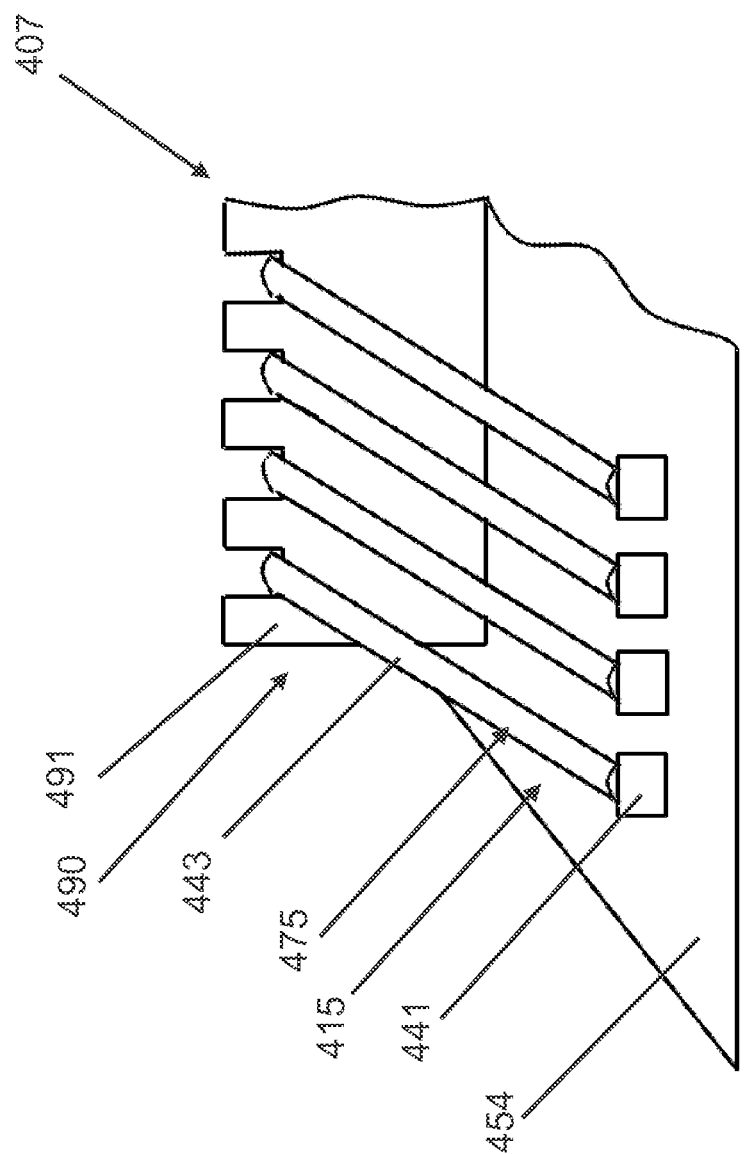

SYSTEMS AND METHODS FOR SELECTIVE SENSING AND SELECTIVE THERMAL HEATING USING NANOSTRUCTURES

If an Application Data Sheet (ADS) has been filed on the filing date of this application, it is incorporated by reference herein. Any applications claimed on the ADS for priority under 35 U.S.C. §§ 119, 120, 121, and/or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

None

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BACKGROUND

The present disclosure relates generally to methods of sensing, such as the sensing of thermal changes, or heating.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 1A is a side elevation view of an embodiment of a calorimetric sensor that includes a nanotube oriented between a pair of electrical contacts;

FIG. 1B is a plan view of the calorimetric sensor of FIG. 1A;

FIG. 12A is an elevation view of another embodiment of a calorimetric sensor that includes a substrate, wherein a portion of a nanotube contacts and is supported at least in part by the substrate;

FIG. 12B is an elevation view of another embodiment of a calorimetric sensor that includes a substrate with a gap near a reaction site;

FIG. 12C is an elevation view of another embodiment of a calorimetric sensor with a nanotube extending around an edge of a substrate and a reaction site positioned off of the substrate;

FIG. 12D is an elevation view of another embodiment of a calorimetric sensor with a nanotube and a reaction site extending off of an edge of a substrate;

FIG. 20B is a plan view of another embodiment that includes a first set of calorimetric sensors and a second, reference calorimetric sensor;

FIG. 24 is an elevation view of a portion of another embodiment that depicts nanostructures that comprise a V shape;

FIG. 29A is an elevation view of an embodiment of a sensor that includes a nanotube coupled with a thermal member;

FIG. 29B is an elevation view of an embodiment of a calorimetric sensor that includes a nanotube coupled with an isolated thermal member;

FIG. 33 is a perspective view of a portion of another embodiment of an array of nanotube sensors that includes an embodiment of a structure over which a plurality of nanostructures are oriented;

DETAILED DESCRIPTION

Figure 1D:
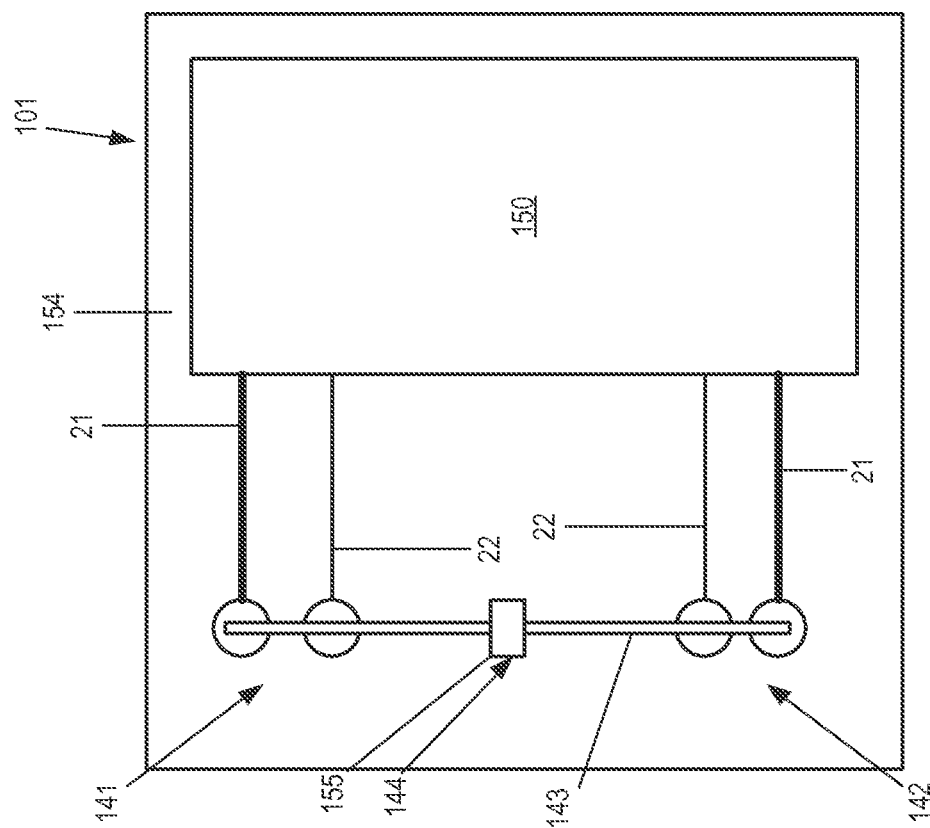
FIG. 1D is a plan view of a calorimetric sensor that includes separate current and voltage contacts.

The drawings herein are not necessarily to scale, unless specifically indicated, and are generally shown as schematic depictions. Accordingly, in many instances, relative dimensions may be inaccurately depicted for the sake of convenience.

With reference to FIGS. 1A and 1B, in certain embodiments, a calorimetric sensor 100 can include a first electrical contact 141, a second electrical contact 142 spaced from the first electrical contact 141, and a first nanotube 143 oriented between the first and second electrical contacts. The term "calorimetric sensor" is used in its ordinary sense, and includes sensors that are configured to detect the presence of heating or cooling and/or to determine an amount of heating or cooling; such presence of heating or cooling and/or determination of an amount of heating or cooling may be relative to, for example, a chemical reaction, a physical change, etc.

The nanotube 143 can be oriented between the first and second electrical contacts in any suitable manner, such as those discussed below. For example, in some embodiments, opposite ends of the nanotube 143 can be attached to the first and second electrical contacts 141, 142, respectively, and the nanotube 143 can extend between the contacts. In some embodiments, the nanotube 143 is taut. In other embodiments, the nanotube 143 may be slack. In some embodiments, the nanotube 143 can be electrically coupled with each of the first and second electrical contacts 141, 142. Suitable methods for orienting the nanotube 143 between the first and second electrical contacts 141, 142 are also described below.

The calorimetric sensor 100 can further include a first reaction site 144 for a first chemical or biological reaction. The reaction site 144 can be supported by the nanotube in any suitable manner, such as those discussed below.

The calorimetric sensor 100 can further include a circuit 150 coupled with the first and second electrical contacts 141, 142 in any suitable manner, such as via a pair of electrical leads 151, 152. The circuit 150 can be configured to detect a first thermal change of the reaction site 144 due to the chemical or biological reaction based on an effect of the thermal change on the nanotube 143.

In certain embodiments, the nanotube 143 can comprise a carbon nanotube. In other embodiments, the nanotube 143 can comprise an inorganic nanotube. In various embodiments, the nanotube 143 can comprise a single-walled nanotube or a multi-walled nanotube. For example, in some embodiments, the nanotube 143 can comprise two or more walls. As used herein, the term "nanotube" is to be understood and as being one or more of a singled-walled carbon nanotube, a multi-walled carbon nanotube, nanotubes made of other materials (e.g., BN), a nanotube mesh, a nanotube yard, one or more layers of graphene in any configuration (e.g., flat, cured, conformal, rolled, etc.), a conductive nanotube, a non-conductive nanotube, a semi-conductive nanotube. Nanotubes as described herein may generally carry a current and have a non-zero and non-infinite resistance.

Figure 2:
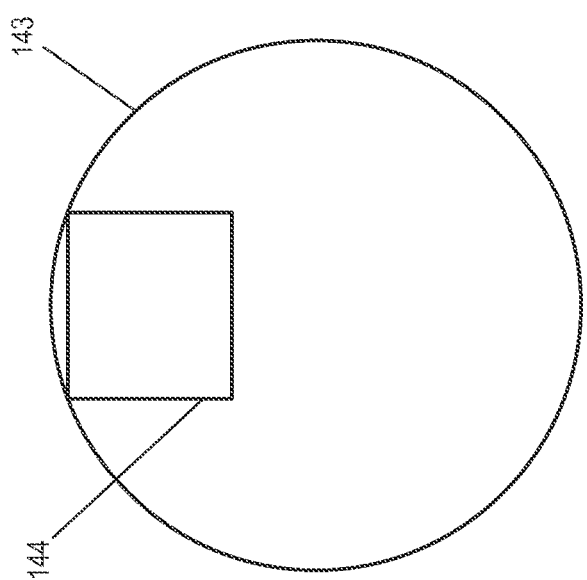
FIG. 2 is lateral cross-section of an embodiment of a nanotube that includes a reaction site.

In certain embodiments, the nanotube 143 is functionalized to support the reaction site 144. For example, in some embodiments, the nanotube 143 is exohedrally functionalized. The reaction site 144 can be at an exterior of the nanotube, as illustrated in FIGS. 1A and 1B. In some embodiments, the nanotube is endohedrally functionalized. The reaction site 144 can be at an interior of the nanotube 143, as schematically illustrated via the lateral cross-section depicted in FIG. 2.

Figure 1C:
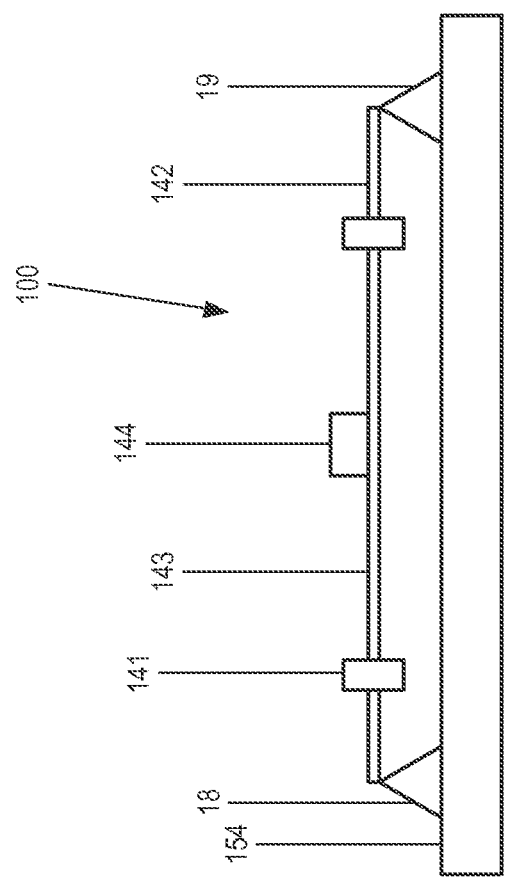
FIG. 1C is a side elevation view of another embodiment of a calorimetric sensor that includes a nanotube oriented between a pair of electrical contacts and supported by mechanical supports.

As illustrated in FIG. 1C, one or more mechanical supports 18, 19 may be independent from the electrical contacts 141, 142. For instance, triangular mechanical supports 18,19 may support the nanotube 143 independent of the electrical contacts 141, 142. Any of a wide variety of mechanical supports 18, 19, including various sizes, shapes, materials, and/or heights, may be utilized in conjunction with any of the various embodiments of calorimetric sensors described herein (e.g., calorimetric sensor 100).

FIG. 1D is a plan view of a calorimetric sensor that includes separate current 22 and voltage 21 sources. As illustrated, in certain embodiments the calorimetric system may utilize a four-wire configuration for independently passing current through the nanotube 143 and measuring a voltage across the nanotube 143. For example, a first set of wires 21 might be used for passing current through the nanotube 143 and a second set of wires 22 may be used for measuring voltage. The four-wire configuration may increase sensitivity to changes in the properties of the nanotube, and/or reduce sensitivity to changes in the properties of the connecting wires, contacts, substrate, etc. Although many electrical connections throughout the drawings are shown as two-wire configurations for ease of illustration, it should be understood that other embodiments can instead include a four-wire configuration, such as, for example, the four-wire configuration of FIG. 1D or 5. Either two-wire or four-wire measurements may be made using DC, pulsed DC, AC, or other current waveform. In particular, a DC signal may be used to measure the resistance of the nanotube while an AC signal is used to heat the nanotube or to measure the resistance of other portions of the sensing circuit, or vice versa.

Figure 3:
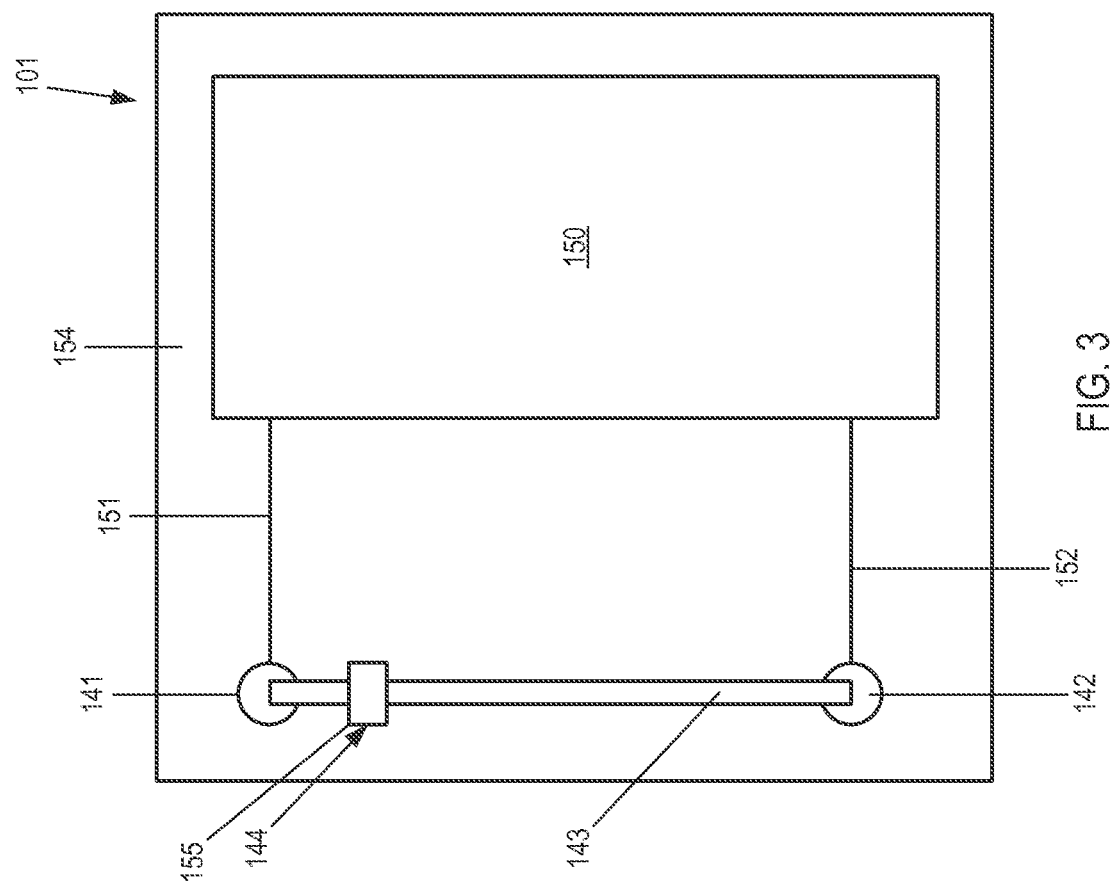
FIG. 3 is a plan view of another embodiment of a calorimetric sensor that includes a reaction site positioned at an end of a nanotube.
Figure 4:
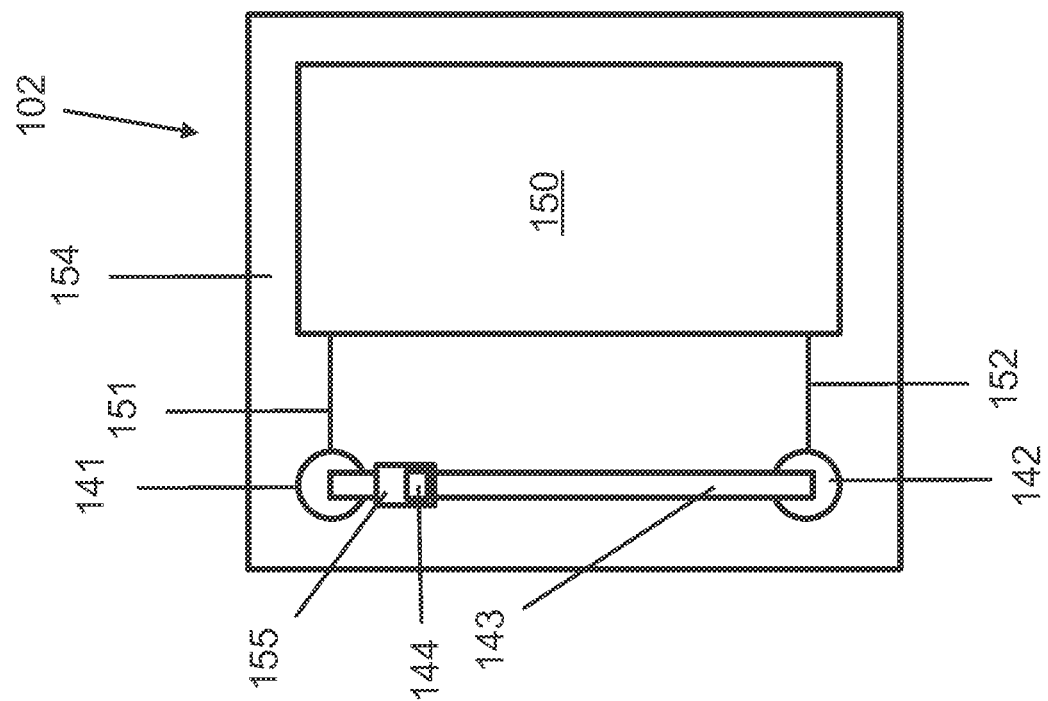
FIG. 4 is a plan view of another embodiment of a calorimetric sensor that includes a reaction site attached to a functional group.

In some embodiments, such as in the calorimetric sensor 101 schematically depicted in FIG. 3, a functional group 155 is attached to an end of the nanotube 143. In further embodiments, the reaction site 144 can be defined by the functional group 155. In still further embodiments, the reaction site 144 is attached to the functional group 155, as schematically depicted in the calorimetric sensor 102 of FIG. 4.

Figure 5:
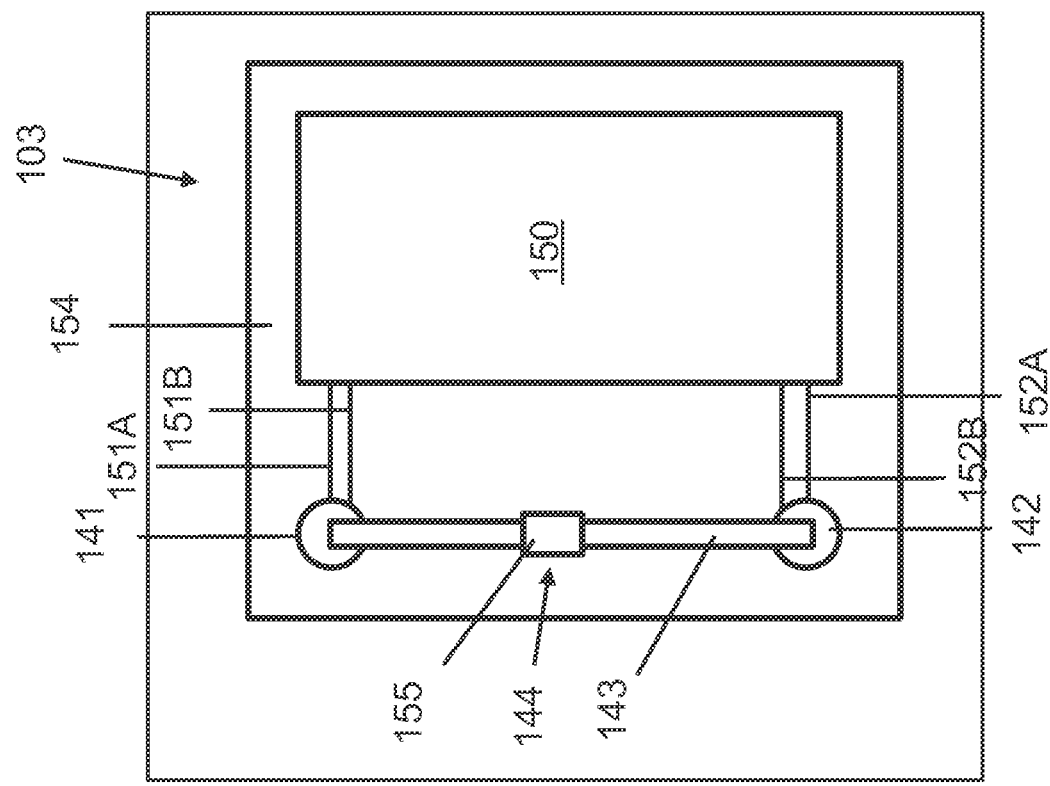
FIG. 5 is a plan view of another embodiment of a calorimetric sensor for which a functional group defines a reaction site.
Figure 6:
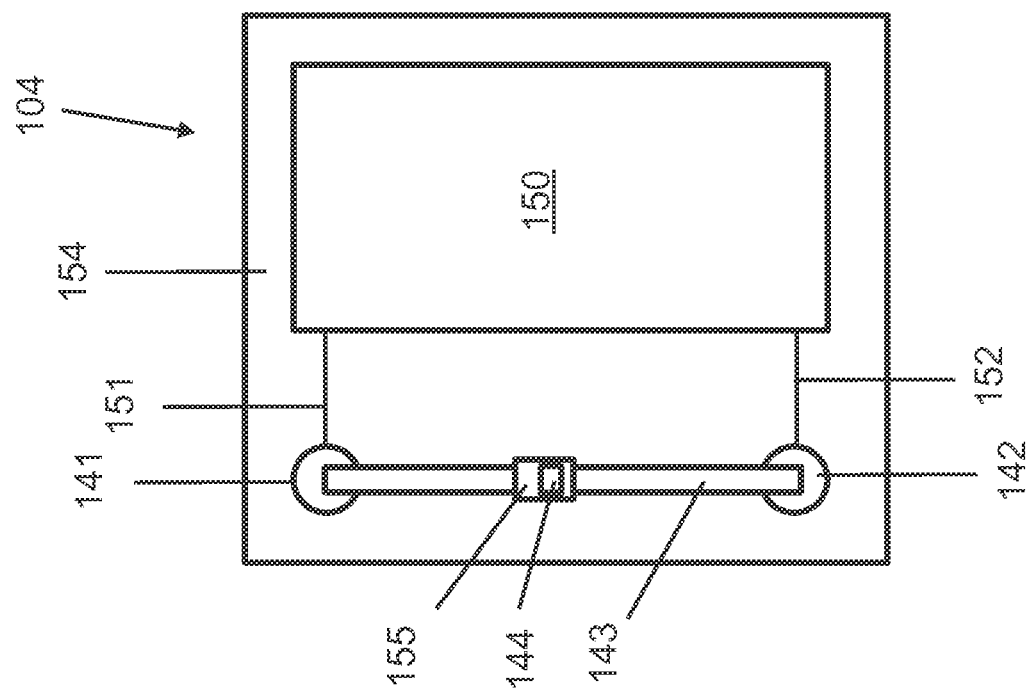
FIG. 6 is a plan view of another embodiment of a calorimetric sensor.

In some embodiments, a functional group 155 is attached to a sidewall of the nanotube 143, as depicted in the calorimetric sensor 103 of FIG. 5. In further embodiments, the reaction site 144 is defined by the functional group 155. In still further embodiments, such as in the calorimetric sensor 104 schematically depicted in FIG. 6, the reaction site 144 is attached to the functional group.

With reference to FIG. 5, certain embodiments may utilize a four-wire configuration for independently passing current through the nanotube 143 and measuring a voltage across the nanotube 143. For example, a first set of wires 151A, 152A might be used for passing current through the nanotube 143 and a second set of wires 151B, 152B may be used for measuring voltage. The four-wire configuration can increase sensitivity. Although many electrical connections throughout the drawings are shown as two-wire configurations for ease of illustration, it should be understood that other embodiments can instead include a four-wire configuration, such as, for example, the four-wire configuration of FIG. 5.

In some embodiments, the reaction site 144 is covalently boded to the nanotube 143, such as, for example, in an arrangement such as that depicted in FIG. 1B. In other embodiments, the reaction site 144 is attached to a functional group 155 that is covalently boded to the nanotube, such as, for example, in an arrangement such as that depicted in FIG. 4 or FIG. 6. In still other embodiments, the reaction site 144 is noncovalently bonded to the nanotube 143. Any of the foregoing arrangements can be formed in any suitable manner, as discussed further below.

In some embodiments, one or more polymers 149 are oriented about an exterior of the nanotube 143. For example, the one or more polymers 149 may be positioned about the nanotube 143 in a helical arrangement, such as that schematically depicted in FIG. 7. In some embodiments, the one or more polymers 149 are not chemically bonded to the nanotube 143, but rather, are physically or mechanically attached to the nanotube 143. Other suitable arrangements are also contemplated. In further embodiments, the reaction site 144 is defined by the one or more polymers 149. In other embodiments, the reaction site 144 is attached to the one or more polymers 149, such as schematically illustrated in FIG. 8.

In certain embodiments, the nanotube 143 is derivatized and/or functionalized to support the reaction site 144. In some embodiments, the reaction site 144 comprises an atom configured to chemically interact with a target material. In some embodiments, the reaction site 144 comprises a molecule configured to chemically interact with a target material. In certain of such embodiments, the molecule comprises a polymer.

In some embodiments, the reaction site 144 comprises a biological element configured to interact with an analyte. In various of such embodiments, the biological element comprises one or more of an enzyme, an antibody, an antigen, a nucleic acid, a protein, a cell receptor, an organelle, a microorganism, a tissue, a biologically derived material, or a biomimic/biomimetic component.

Figure 9:
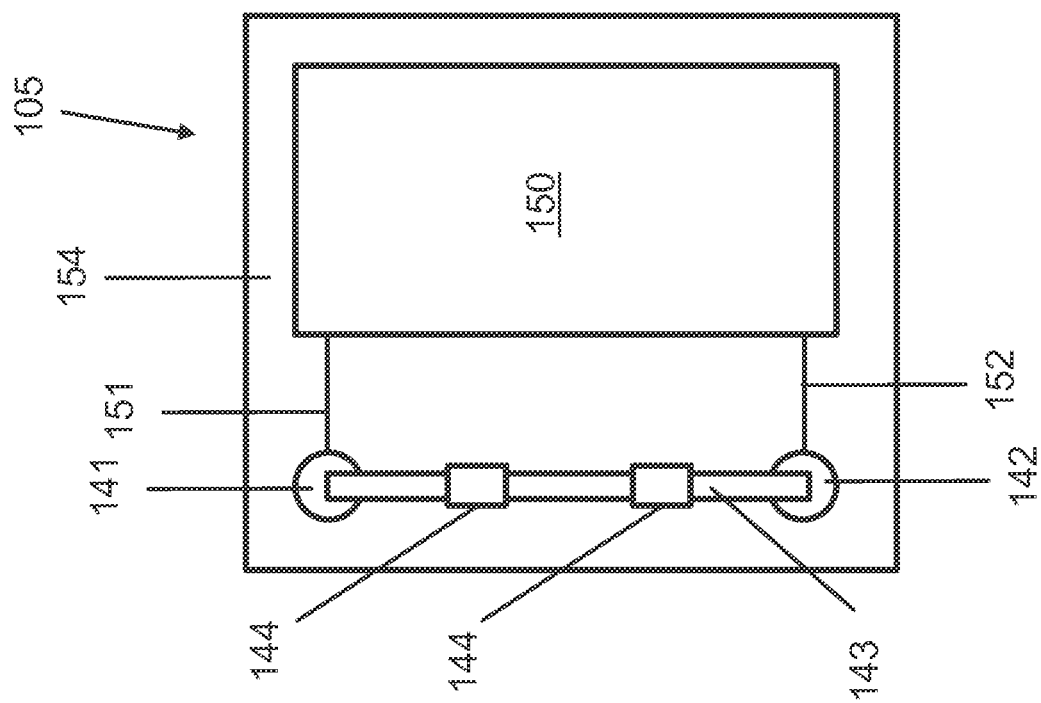
FIG. 9 is a plan view of another embodiment of a calorimetric sensor that includes a nanotube that supports multiple reaction sites.

In some embodiments, a calorimetric sensor 105 includes one or more additional reaction sites 144 that are each for a chemical or biological reaction are supported by the nanotube 143, as shown in FIG. 9. In certain embodiments, the circuit 150 is configured to detect a thermal change of one or more of the reaction sites 144 that are supported by the nanotube 143 due to the chemical or biological reaction at each of the one or more of the reaction sites. In the illustrated embodiment, the nanotube 143 supports two reaction sites 144. In further embodiments, the nanotube 143 can support more than two, more than three, more than four, etc. reaction sites 144.

Figure 10:
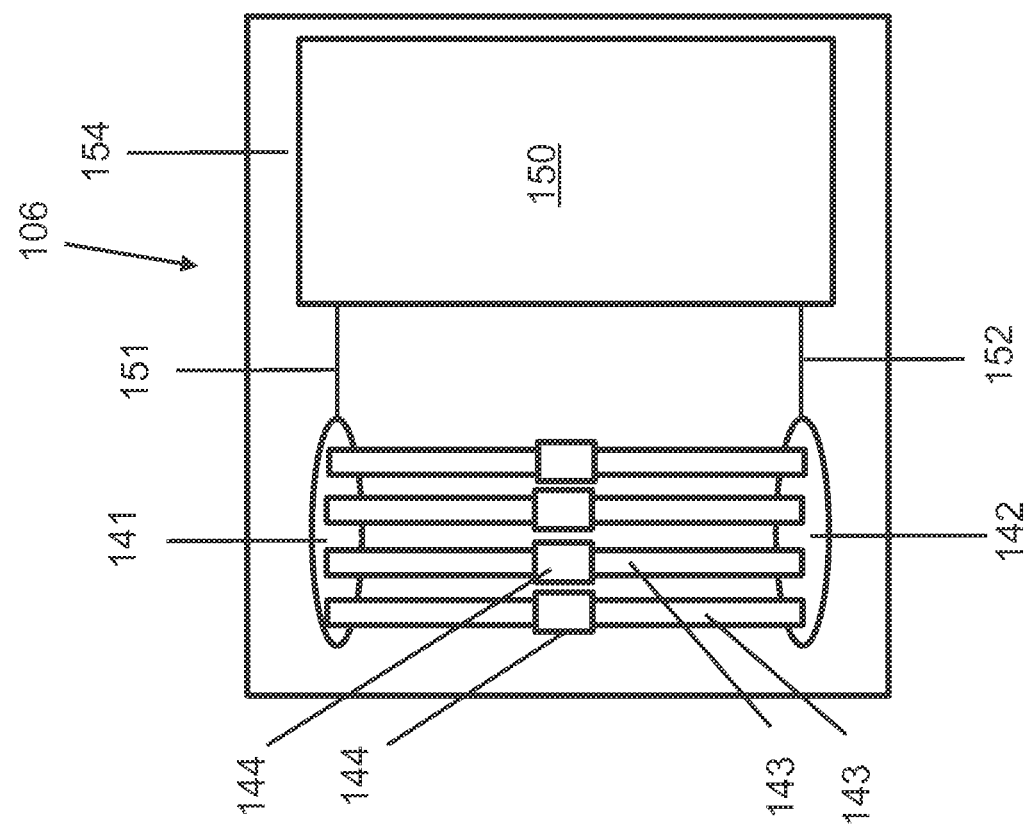
FIG. 10 is a plan view of another embodiment of a calorimetric sensor that includes a plurality of nanotubes oriented between a pair of electrical contacts.

With reference to FIG. 10, in some embodiments, a calorimetric sensor 106 includes a plurality of nanotubes 143 (e.g., two or more, three, four, five, 10, 50, 100, 500, 1,000, or more nanotubes) that are oriented between the first and second electrical contacts 141, 142. Each of the nanotubes can be electrically coupled with each of the first and second electrical contacts 141, 142. The calorimetric sensor 106 can include a plurality of reaction sites 144 (e.g., two or more, three or more, four or more reaction sites) for a chemical or biological reaction. Each of the reaction sites can be supported by one of the nanotubes 143.

The circuit 150 can be configured to detect a thermal change of any of the reaction sites 144 supported by any of the nanotubes 143 due to one or more chemical or biological reactions at one or more of the reaction sites 144 based on an effect of the thermal change on any of the nanotubes 143.

Figure 11:
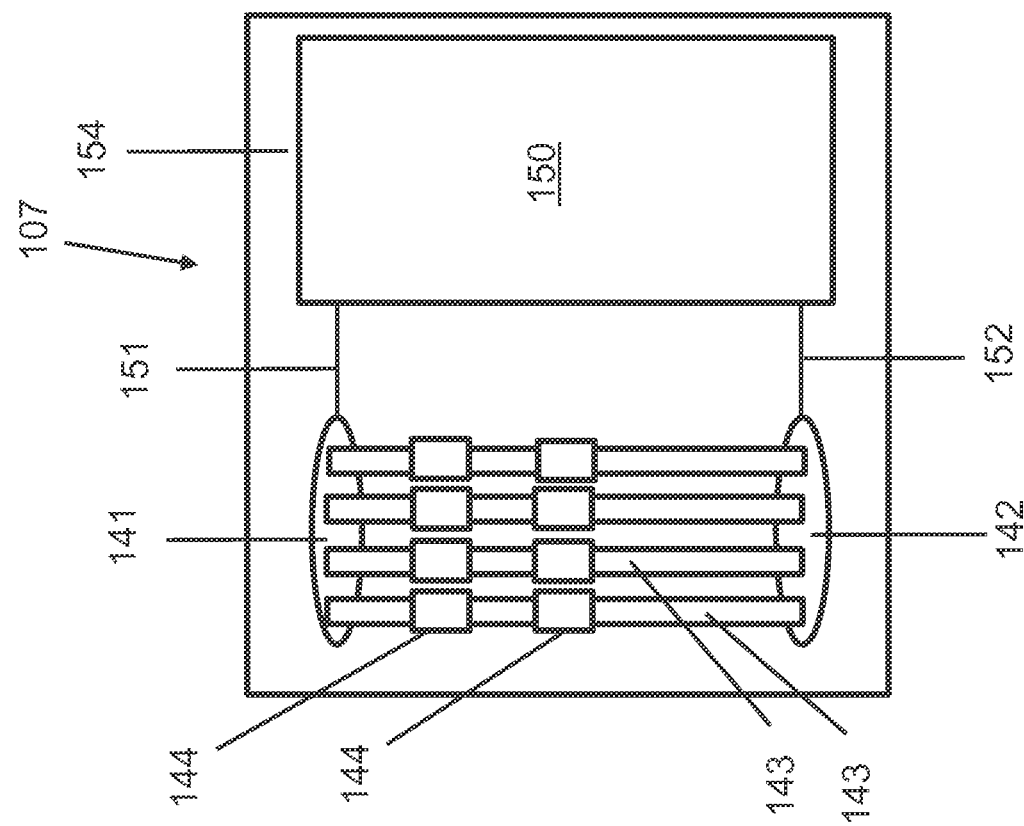
FIG. 11 is a plan view of another embodiment of a calorimetric sensor that includes a plurality of nanotubes oriented between a pair of electrical contacts, wherein each nanotube supports a plurality of reaction sites.

With reference to FIG. 11, in some embodiments of a calorimetric sensor 107, one or more of the plurality of nanotubes 143 each supports a plurality of reaction sites 144 that are each for a chemical or biological reaction.

With reference again to FIGS. 1A and 1B, in some embodiments, a nanotube 143 is suspended between the first and second electrical contacts 141, 142 in spaced relation from other portions of the calorimetric sensor 100. With reference to FIGS. 12A and 12B, in some embodiments, a calorimetric sensor 108 includes a substrate 154. In further embodiments, the nanotube 143 contacts and is supported at least in part by the substrate 154 at a position between the first and second electrical contacts 141, 142. In various embodiments, the substrate comprises one or more of silicon, SiO$_2$, SiNx, GaAs, GaN, plastic, or paper.

As shown in FIG. 12B, in some embodiments, substantially all of the nanotube 143 may be supported by the electrical contacts 141, 142 and/or the substrate 154, except for in the vicinity of the reaction site 144. For example, in the illustrated embodiment, the nanotube 143 is suspended over a cavity 23 in the substrate 154. Such an arrangement may increase the sensitivity of the system, as heat from a reaction at the reaction site 144 is not dissipated into the substrate 154.

FIG. 12C is an elevation view of another embodiment of a calorimetric sensor 25 with a nanotube 143 extending around an edge of a substrate 154 and a reaction site 144 positioned off of the substrate 154. The nanotube 143 may contact and/or supported at least in part by the substrate 154 at a position between the first and second electrical contacts 141, 142.

FIG. 12D is an elevation view of another embodiment of a calorimetric sensor 26 with a nanotube 143 and a reaction site 144 extending off of an edge of the substrate 154. The nanotube 143 may contact and/or supported at least in part by the substrate 154 at a position between the first and second electrical contacts 141, 142.

Figure 12E:
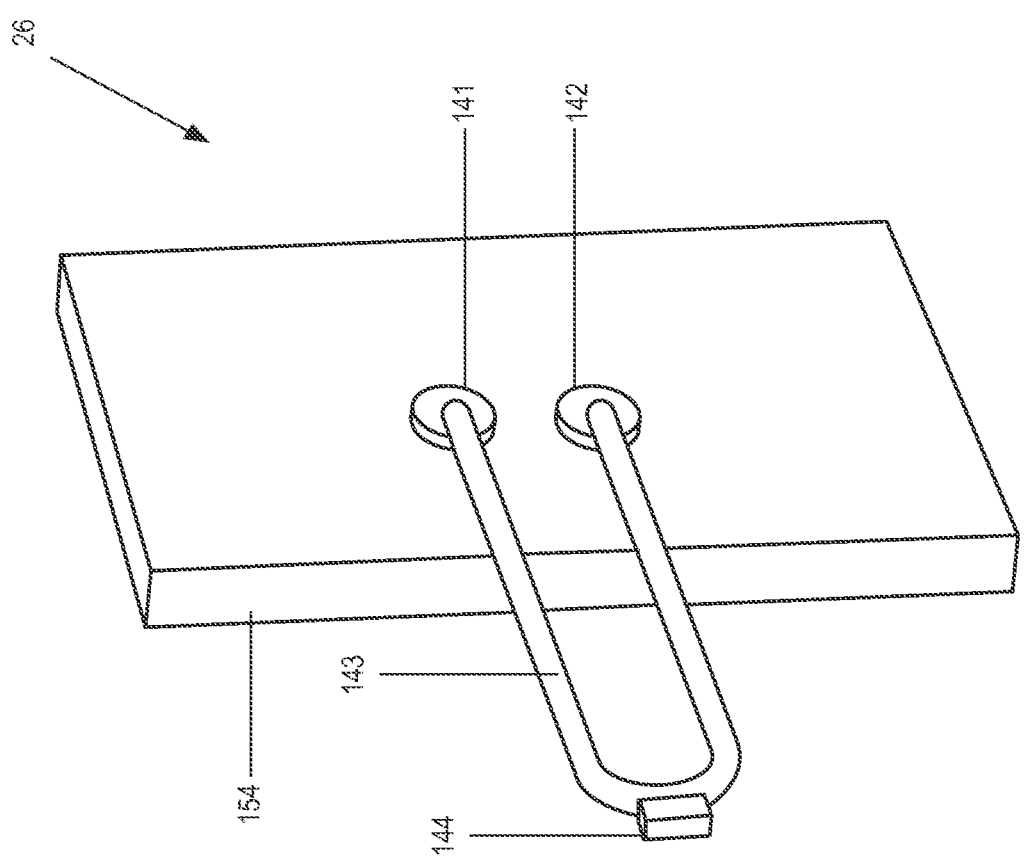
FIG. 12E is an embodiment of a perspective view of the calorimetric sensor of FIG. 12D.

FIG. 12E is an embodiment of a perspective view of the calorimetric sensor 26 of FIG. 12D. As illustrated, the nanotube 143 and reaction site 144 may extend off the edge of the substrate 154. The nanotube 143 may contact and/or supported at least in part by the substrate 154 at a position between the first and second electrical contacts 141, 142.

In various embodiments of the sensors described above, a thermal change of the reaction site 144 comprises an absorption of heat by the chemical or biological reaction. In other embodiments, the thermal change comprises a release of heat by the chemical or biological reaction. In some embodiments, the effect of the thermal change on the nanotube 143 comprises a change in a resistance of the nanotube 143 due to a change in temperature of the nanotube 143, whether that change is an increase in temperature or a decrease in temperature.

In some embodiments, the circuit 150 is configured to determine a magnitude of the change in the resistance of the nanotube 143 based on a change in voltage across the first and second electrical contacts 141, 142. In some embodiments, the circuit 150 is configured to determine whether or not a chemical or biological reaction at the reaction site 144 occurs by determining whether or not a voltage across the first and second electrical contacts 141, 142 changes.

In some embodiments, the circuit 150 is configured to determine a magnitude of the change in the resistance of the nanotube 143 based on a change in current passing through the nanotube 143. In some embodiments, the circuit 150 is configured to determine whether or not a chemical or biological reaction at the reaction site 144 occurs by determining whether or not a current passing through the nanotube 143 changes.

In some embodiments, the circuit 150 is configured to determine a magnitude of the change in resistance of the nanotube 143 based on a change in power dissipated in the circuit 150. In some embodiments, the circuit 150 is configured to determine whether or not a chemical or biological reaction at the reaction site 144 occurs by determining whether or not a level of power dissipated in the circuit 150 changes.

In certain embodiments, the circuit 150 is configured to counteract a change in the resistance of the nanotube 143 so as to maintain the nanotube 143 at a constant resistance. With reference to FIG. 13A, in some embodiments, a calorimetric sensor 109 includes a circuit 150 that has a feedback circuit 156 that is configured to counteract a change in the resistance of the nanotube 143 by controlling a current within the feedback circuit 156. In certain embodiments, a magnitude of the thermal change of the reaction is detected via a magnitude of a change in the current used to maintain the nanotube 143 at the constant resistance.

In some embodiments, the circuit 150 is configured to maintain a constant voltage across the nanotube 143. In further embodiments, changes in the circuit 150 that aid in maintaining the constant voltage are used to determine whether or not a chemical or biological reaction occurs at the reaction site 144. In some embodiments, changes in the circuit 150 that aid in maintaining the constant voltage are used to determine a magnitude of a chemical or biological reaction at the reaction site 144.

In some embodiments, the circuit 150 is configured to pass a constant current through the nanotube 143. In certain of such embodiments, changes in the circuit 150 that aid in maintaining the constant current are used to determine whether or not a chemical or biological reaction occurs at the reaction site 144. In some embodiments, changes in the circuit 150 that aid in maintaining the constant current are used to determine a magnitude of a chemical or biological reaction at the reaction site 144.

In some embodiments, the circuit 150 is configured to dissipate a constant power. In certain of such embodiments, changes in the circuit 150 that aid in maintaining the constant power are used to determine whether or not a chemical or biological reaction occurs at the reaction site 144. In some embodiments, changes in the circuit 150 that aid in maintaining the constant power are used to determine a magnitude of a chemical or biological reaction at the reaction site 144.

Figure 13B:
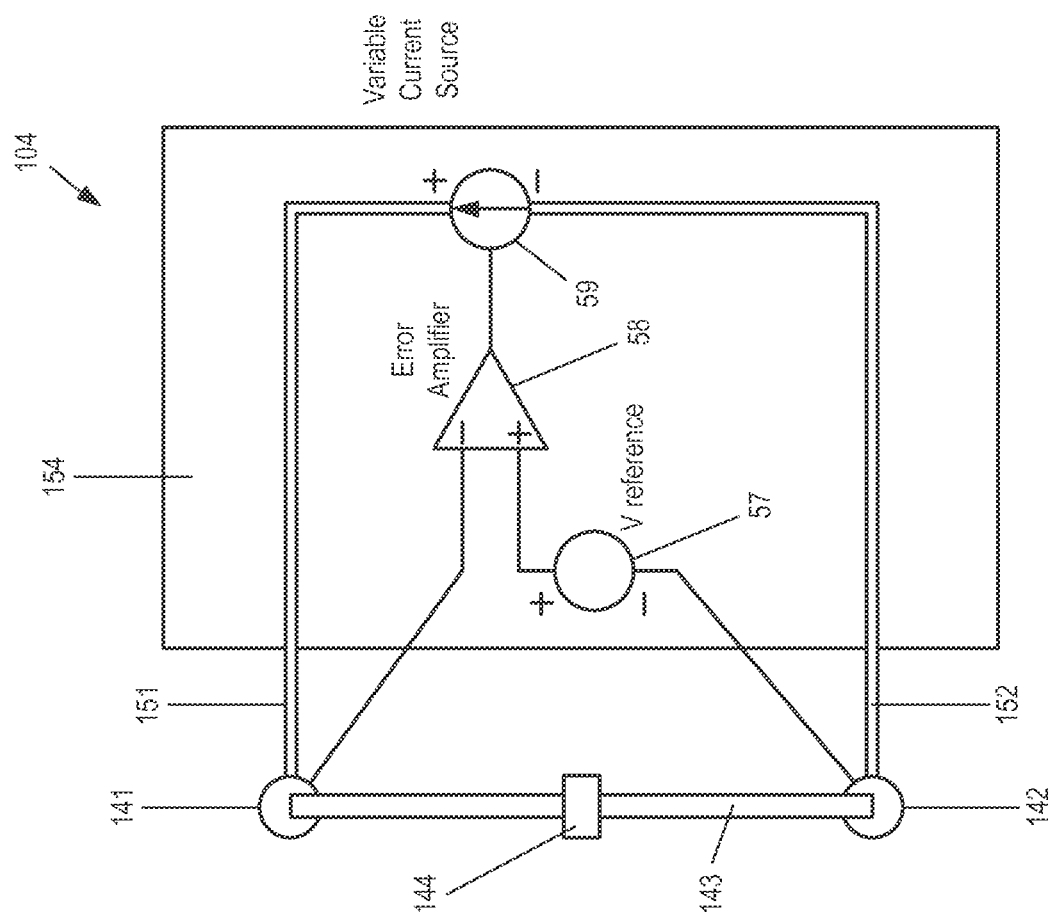
FIG. 13B is a plan view of another embodiment of a calorimetric sensor with a feedback circuit, including a current source and an amplifier.
Figure 13A:
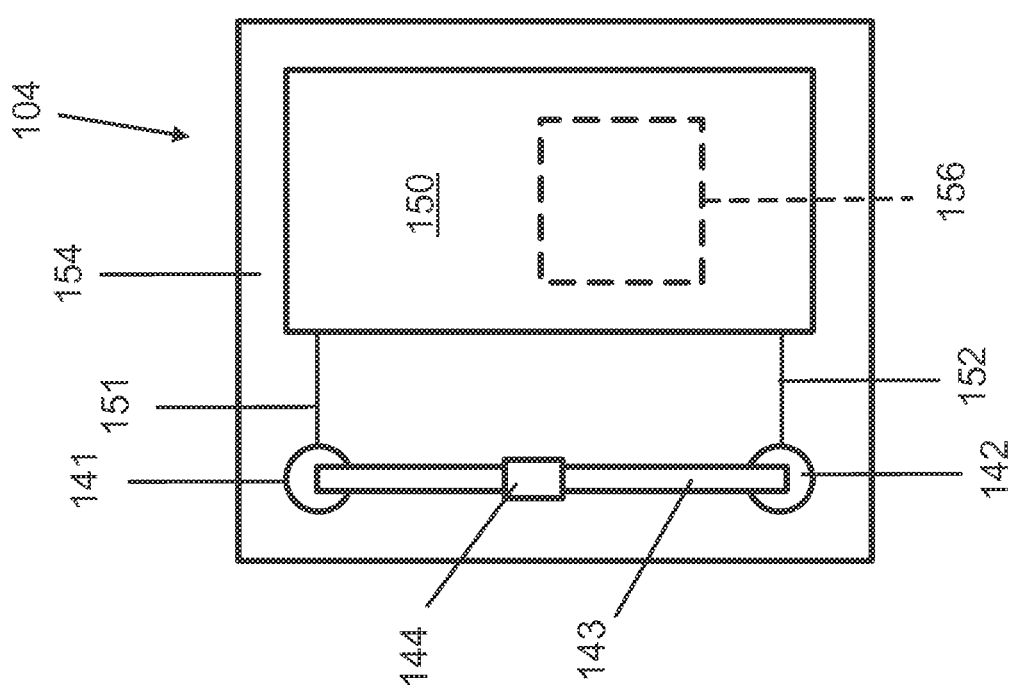
FIG. 13A is a plan view of another embodiment of a calorimetric sensor that includes a feedback circuit.

FIG. 13B is a plan view of an embodiment of the calorimetric sensor 104 shown in FIG. 13A, in which the feedback circuit 156 is shown as including a voltage reference 57, an error amplifier 58, and a current source 59. Additional and/or alternative circuit components may be utilized in a feedback circuit 156.

Figure 14:
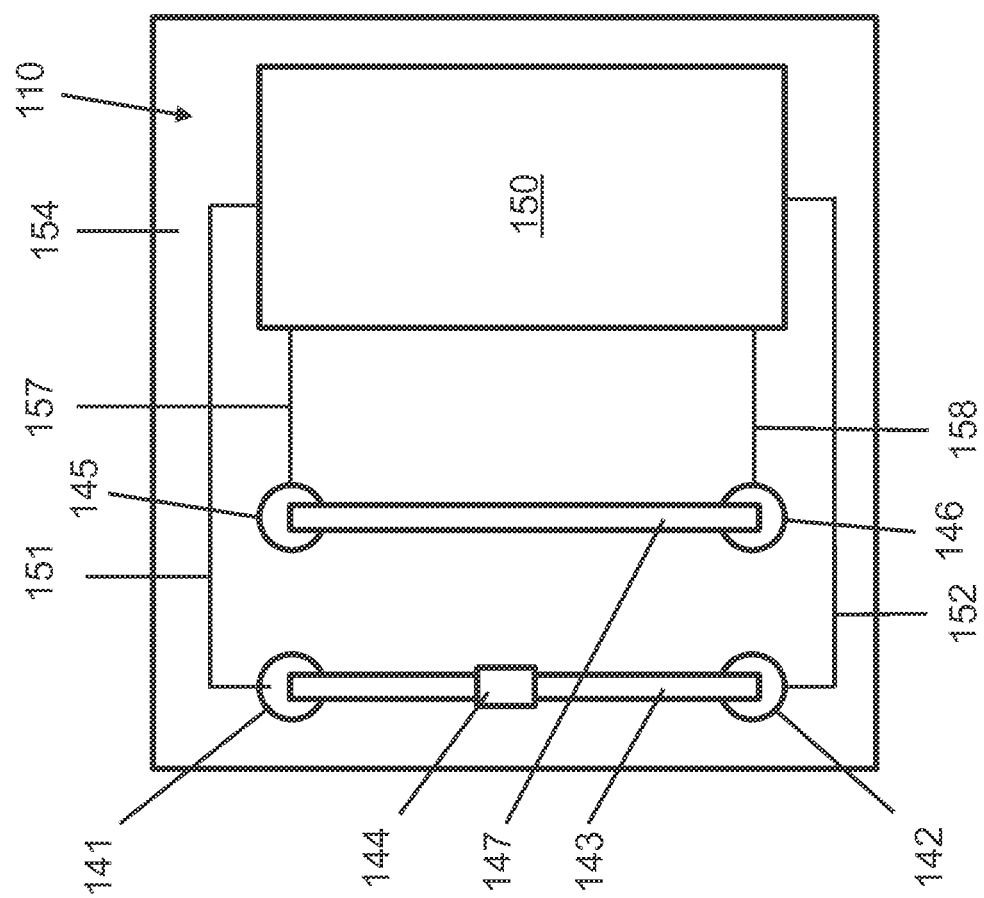
FIG. 14 is a plan view of an embodiment of a calorimetric sensor that includes multiple pairs of electrical contacts coupled with a circuit, with each pair of electrical contacts including a nanotube oriented between them.

With reference to FIG. 14, in some embodiments, a calorimetric sensor 110 includes a third electrical contact 145 and a fourth electrical contact 146 spaced from the third electrical contact 145. An additional or second nanotube 147 can be oriented between the third and fourth electrical contacts 145, 146. The second nanotube 147 can be electrically coupled with each of the third and fourth electrical contacts. The first and second nanotubes 143, 147 can comprise any suitable arrangement discussed herein. The first and second nanotubes 143, 147 can have the same arrangement or can have different arrangements. Although the embodiment depicted in FIG. 14 comprises two sets of nanotubes and electrical contacts, any suitable number of such sets of nanotubes and electrical contacts is contemplated (e.g., three, four, five, 10, 20, 30, 40, 50, 100, or more). In certain embodiments, the circuit 150 is coupled with each nanotube (e.g., 143, 147) via the electrical contacts (e.g., 141, 142, 146, 147), respectively.

In the illustrated embodiment, the circuit 150 is coupled with the electrical contacts 145, 156 via electrical leads 157, 158. In other embodiments, the electrical contacts 141, 142, 145, 146 can be omitted or replaced with non-conducting material, and the electrical leads 151, 152, 157, 158 can be connected to the nanotubes 143, 147 directly. Stated otherwise, the electrical leads 151, 152, 157, 158 may also be referred to as electrical contacts.

In some embodiments, the second nanotube 147 is devoid of any couplings to reaction sites for chemical or biological reactions of a variety that would be detectable via the first reaction site 144. In certain embodiments, the second nanotube 147 is non-functionalized.

Figure 15:
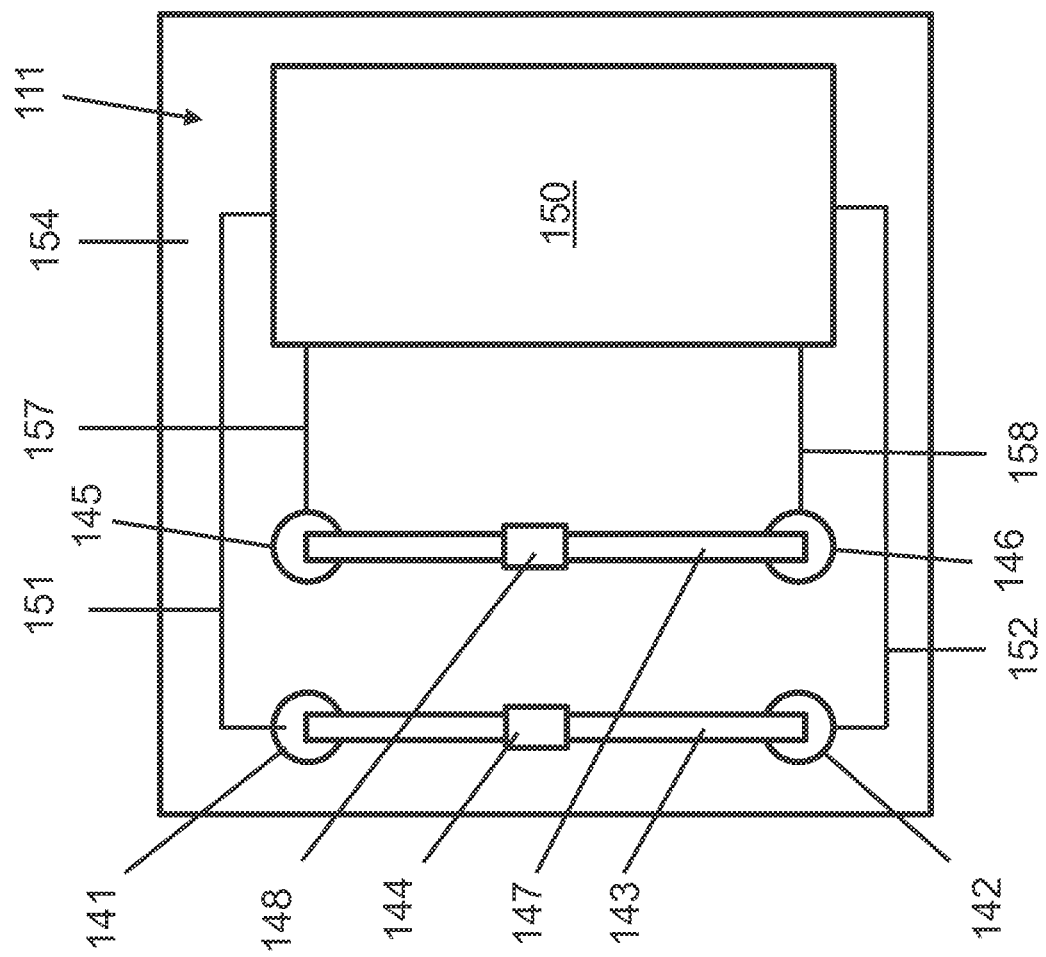
FIG. 15 is a plan view of another embodiment of a calorimetric sensor that includes multiple pairs of electrical contacts coupled with a circuit, with each pair of electrical contacts including a nanotube oriented between them.

With reference to FIG. 15, in some embodiments, a calorimetric sensor 111 includes a second nanotube 147 that is functionalized to support a second reaction site 148 for a second chemical or biological reaction. In some embodiments, the second reaction site is configured to be used to calibrate activity sensed via the first reaction site 144.

In certain embodiments of the calorimetric sensors 110, 111, the circuit 150 is configured to detect the thermal change of the first reaction site 144 based on a differential measurement of the first and second nanotubes 143, 147. In certain of such embodiments, the differential measurement compares a resistance of the first nanotube 143 with a resistance of the second nanotube 147. In some embodiments, the differential measurement compares a current flow through the first nanotube 143 with a current flow through the second nanotube 143. In some embodiments, the differential measurement compares a voltage across the first and second electrical contacts 141, 142 with a voltage across the third and fourth electrical contacts 145, 146.

In certain embodiments of the calorimetric sensors 110, 111, the circuit 150 is configured to counteract a change in a first resistance of the first nanotube 143 so as to maintain the first nanotube 143 at the first resistance and counteract a change in a second resistance of the second nanotube 147 so as to maintain the second nanotube 147 at the second resistance. In certain of such embodiments, the first resistance and the second resistance are the same prior to initiation of the chemical or biological reaction at the first reaction site 144. In some embodiments, the first resistance and the second resistance are different from each other prior to initiation of the chemical or biological reaction at the first reaction site 144.

Figure 16:
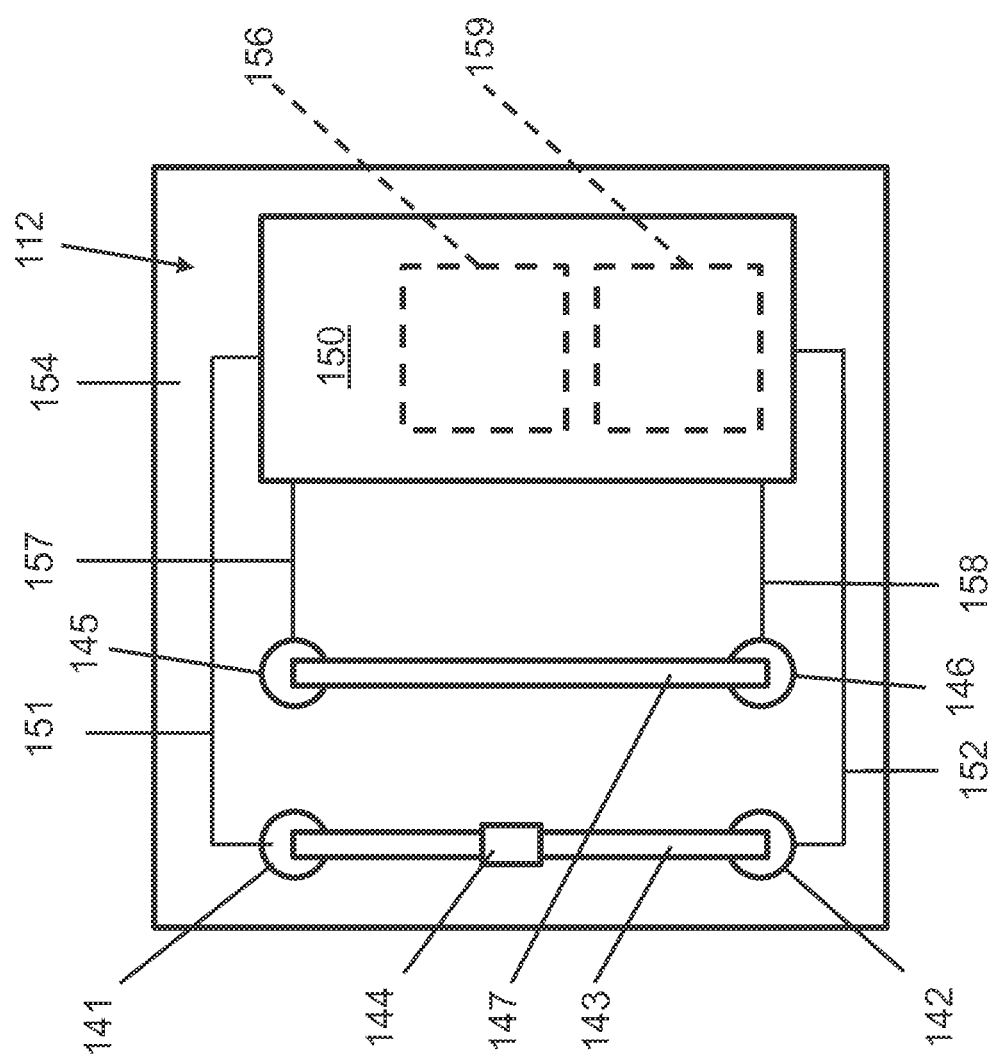
FIG. 16 is a plan view of another embodiment of a calorimetric sensor that includes multiple pairs of electrical contacts coupled with a circuit, with each pair of electrical contacts including a nanotube oriented between them.
Figure 17:
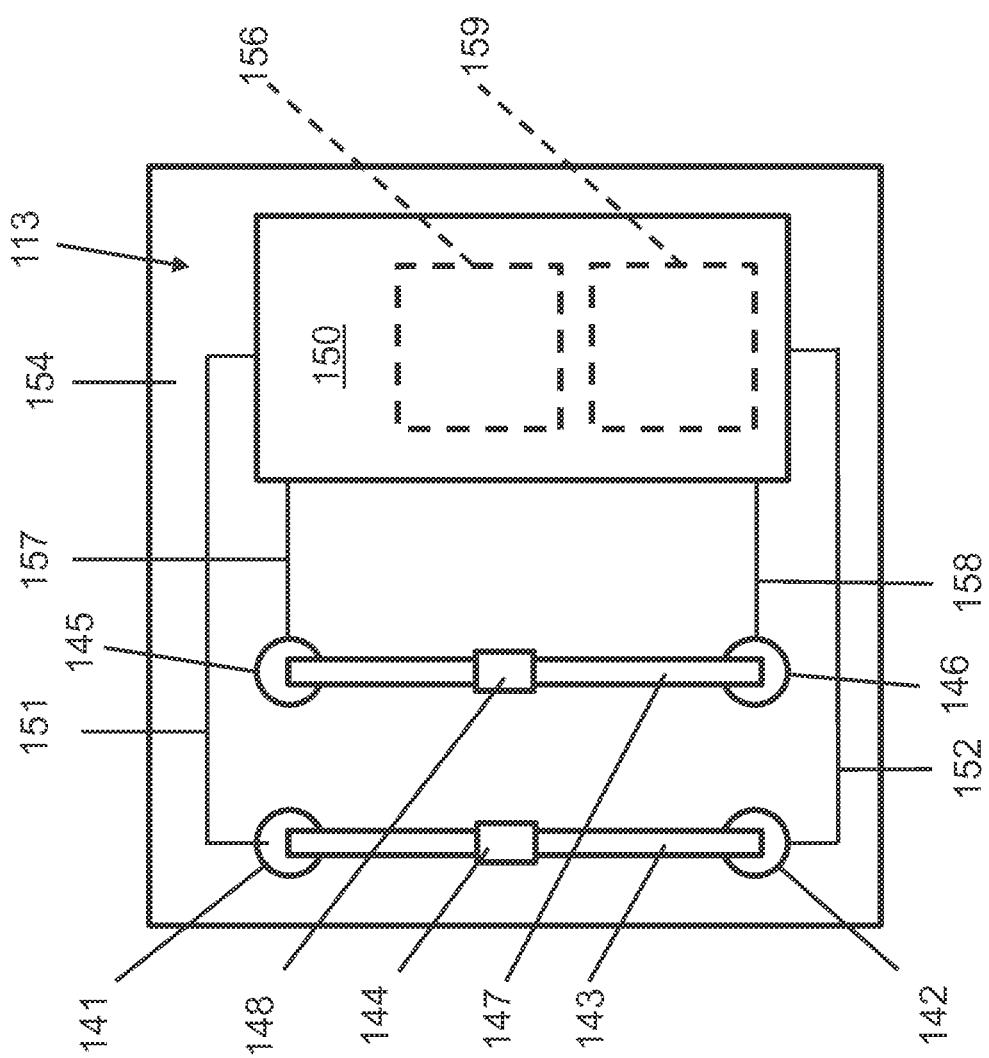
FIG. 17 is a plan view of another embodiment of a calorimetric sensor that includes multiple pairs of electrical contacts coupled with a circuit, with each pair of electrical contacts including a nanotube oriented between them.

With reference to FIGS. 16 and 17, in certain embodiments of calorimetric sensors 112, 113, which resemble the sensors 110, 111 described above in many respects, each circuit 150 includes a first feedback circuit 156 that is configured to counteract a change in the first resistance of the first nanotube 144 by controlling a first current within the first feedback circuit 156 and includes a second feedback circuit 159 that is configured to counteract a change in the second resistance of the second nanotube 147 by controlling a second current within the second feedback circuit 159. In certain of such embodiments, the differential measurement compares a magnitude of a change in the first current used to maintain the first nanotube 143 at the first resistance with a magnitude of a change in the second current used to maintain the second nanotube 147 at the second resistance.

In certain embodiments of the sensors 110, 111, 112, 113, the second nanotube 147 is non-functionalized. In certain of such embodiments, the first nanotube 143 is functionalized to support the first reaction site 144. In some embodiments, the circuit 150 is configured to detect the thermal change of the first reaction site 144 based on a differential measurement of the first and second nanotubes 143, 147. In certain of such embodiments, the differential measurement compares a resistance of the first nanotube 143 with a resistance of the second nanotube 147. In some embodiments, the differential measurement compares a current flow through the first nanotube 143 with a current flow through the second nanotube 147. In some embodiments, the differential measurement compares a voltage across the first and second electrical contacts 141, 142 with a voltage across the third and fourth electrical contacts 145, 146.

In some embodiments of the sensors 110, 111, 112, 113, the circuit 150 is configured to counteract a change in a first resistance of the first nanotube 143 so as to maintain the first nanotube 143 at the first resistance and counteract a change in a second resistance of the second nanotube 147 so as to maintain the second nanotube 147 at the second resistance. In certain of such embodiments, the first resistance and the second resistance are the same prior to initiation of the chemical or biological reaction at the first reaction site 144. In other embodiments, the first resistance and the second resistance are different from each other prior to initiation of the chemical or biological reaction at the first reaction site 144.

In certain embodiments, of the sensors 112, 113, the first feedback circuit 156 is configured to counteract a change in the first resistance of the first nanotube 144 by controlling a first current within the first feedback circuit 156 and the second feedback circuit 159 is configured to counteract a change in the second resistance of the second nanotube 147 by controlling a second current within the second feedback circuit 159. In certain of such embodiments, the differential measurement mentioned above compares a magnitude of a change in the first current used to maintain the first nanotube 143 at the first resistance with a magnitude of a change in the second current used to maintain the second nanotube 147 at the second resistance.

In certain embodiments of the sensors 111, 113, the second reaction site 148 is configured for a second chemical or biological reaction that is different from the first chemical or biological reaction of the first reaction site 144. The second reaction site 148 can be supported by the second nanotube 147. In certain of such embodiments, the circuit 150 is configured to detect a second thermal change of the second reaction site 148 due to the second chemical or biological reaction based on an effect of the thermal change on the second nanotube 147. In some embodiments, the circuit 150 is configured to detect one or more of the first and second thermal changes of one or more of the first and second reaction sites 144, 148, respectively, based on a differential measurement of the first and second nanotubes 143, 147. In some embodiments, the differential measurement compares a resistance of the first nanotube 143 with a resistance of the second nanotube 147. In some embodiments, the differential measurement compares a current flow through the first nanotube 143 with a current flow through the second nanotube 147. In some embodiments, the differential measurement compares a voltage across the first and second electrical contacts 141, 142 with a voltage across the third and fourth electrical contacts 145, 146.

In some embodiments of the sensors 111, 113, the circuit 150 is configured to counteract a change in a first resistance of the first nanotube 143 so as to maintain the first nanotube at the first resistance and counteract a change in a second resistance of the second nanotube 147 so as to maintain the second nanotube at the second resistance. In certain of such embodiments, the first resistance and the second resistance are the same prior to initiation of the first or second chemical or biological reactions at the first or second reaction sites 144, 148, respectively. In other embodiments, the first resistance and the second resistance are different from each other prior to initiation of the first or second chemical or biological reactions at the first or second reaction sites 144, 148, respectively.

In some embodiments of the sensor 113, the circuit 150 includes the first feedback circuit 156, which can be configured to counteract a change in the first resistance of the first nanotube 143 by controlling a first current within the first feedback circuit. The second feedback circuit 159 can be configured to counteract a change in the second resistance of the second nanotube 147 by controlling a second current within the second feedback circuit 159. In some embodiments, the differential measurement mentioned above compares a magnitude of a change in the first current used to maintain the first nanotube 143 at the first resistance with a magnitude of a change in the second current used to maintain the second nanotube 147 at the second resistance.

In various embodiments of the calorimetric sensors 110, 111, 112, 113, one or both of the first and second nanotubes 143, 147 each comprises a carbon nanotube, each comprises an inorganic nanotube, each comprises a single-walled nanotube, or each comprises a multi-walled nanotube.

In some embodiments, the first and second nanotubes 143, 147 are functionalized to support the first and second reaction sites, respectively. In certain embodiments, one or both of the first and second nanotubes 143, 147 are exohedrally functionalized. In some embodiments, one or both of the first and second reaction site are at an exterior of the first and second nanotubes 143, 147, respectively. In some embodiments, one or both of the first and second nanotubes 143, 147 are endohedrally functionalized. One or both of the first and second reaction sites can be at an interior of the first and second nanotubes 143, 147, respectively.

For any suitable embodiment, one or more separate functional groups 155 can be attached to an end of one or more of the first and second nanotubes 143, 147. In some embodiments, the first and second reaction sites 144, 148 are defined by the functional groups. In some embodiments, the first and second reaction sites 144, 148 are attached to the functional groups. In some embodiments, one or more separate functional groups are attached to a sidewall of one or more of the first and second nanotubes 143, 147, respectively.

In some embodiments, the first and second reaction sites 144, 148 are covalently boded to the first and second nanotubes 143, 147, respectively. In some embodiments, the first and second reaction sites 144, 148 are attached to separate functional groups that are covalently boded to the first and second nanotubes 143, 147, respectively. In other embodiments, the first and second reaction sites 144, 148 are noncovalently bonded to the first and second nanotubes 143, 147, respectively.

Any suitable arrangement for either of the first and second nanotubes 143, 147 is possible, such as those discussed above. Further, the first and second nanotubes 143, 147 can be of the same or different variety.

Figure 7:
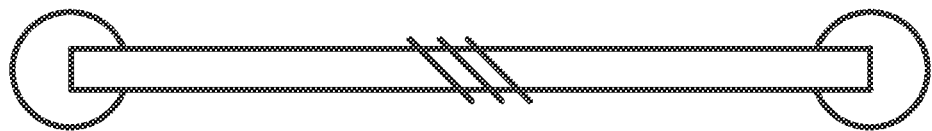
FIG. 7 is a plan view of an embodiment of a nanotube that has one or polymers positioned about it in a helical pattern.
Figure 8:
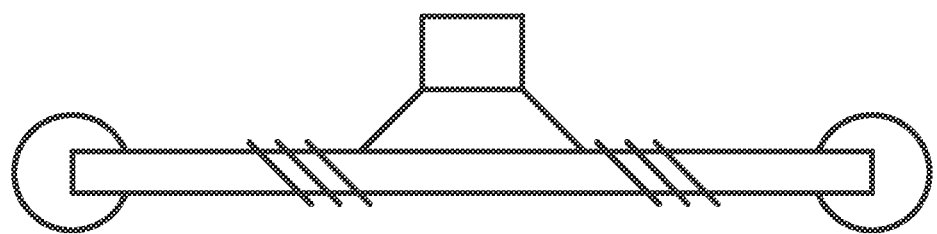
FIG. 8 is a plan view of another embodiment of a nanotube similar to that illustrated in FIG. 7 with a reaction site.

For example, in various embodiments, one or more polymers (such as shown in FIGS. 7 and 8) can be oriented about an exterior of each of the first and second nanotubes 144, 148. The first and second reaction sites 144, 148 can be defined by the one or more polymers. The first and second reaction sites 144, 148 can be attached to the one or more polymers.

The first and second nanotubes 143, 147 can be derivatized to support the first and second reaction sites 144, 148, respectively. One or more of the first and second reaction sites 144, 148 can each comprise an atom configured to chemically interact with a target material or a molecule configured to chemically interact with a target material. In some embodiments, the molecule comprises a polymer.

In various embodiments, one or more of the first and second reaction sites 144, 148 each comprises a biological element configured to interact with an analyte. In various embodiments, each biological element can comprise one or more of an enzyme, an antibody, an antigen, a nucleic acid, a protein, a cell receptor, an organelle, a microorganism, a tissue, a biologically derived material, or a biomimic component.

Figure 18:
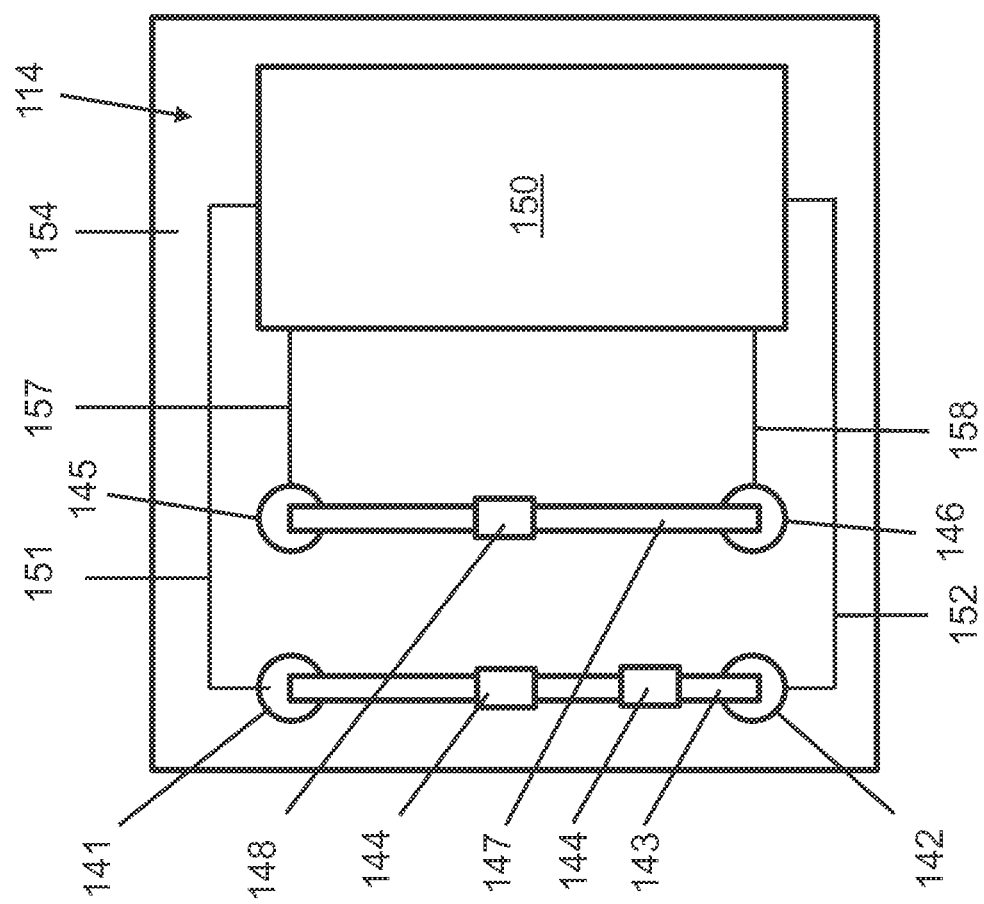
FIG. 18 is a plan view of another embodiment of a calorimetric sensor that includes multiple pairs of electrical contacts coupled with a circuit, with each pair of electrical contacts including a nanotube oriented between them.
Figure 19:
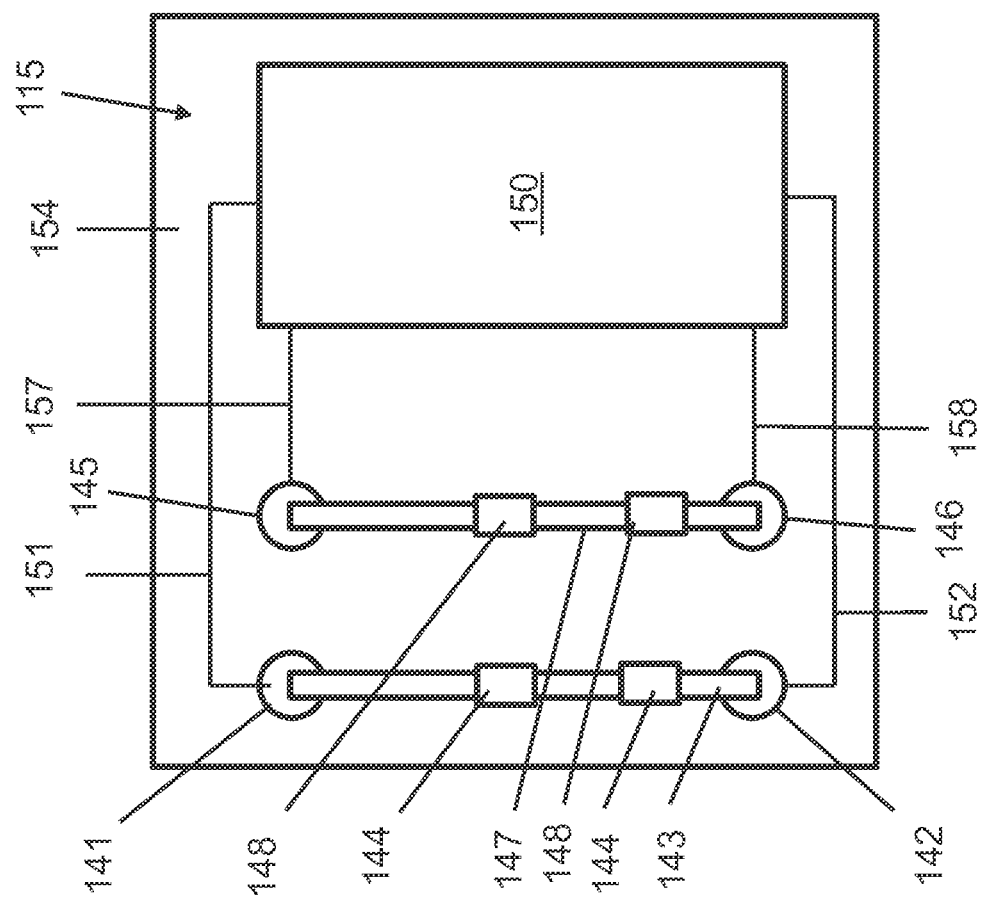
FIG. 19 is a plan view of another embodiment of a calorimetric sensor that includes multiple pairs of electrical contacts coupled with a circuit, with each pair of electrical contacts including a nanotube oriented between them.

With reference to FIGS. 18 and 19, in some embodiments of calorimetric sensors 114, 115, the first nanotube 143 can further support one or more additional first reaction sites 144 that are each for the first chemical or biological reaction. With reference to FIG. 19, in some embodiments, the second nanotube 147 further supports one or more additional second reaction sites 148 that are each for the second chemical or biological reaction.

Figure 20A:
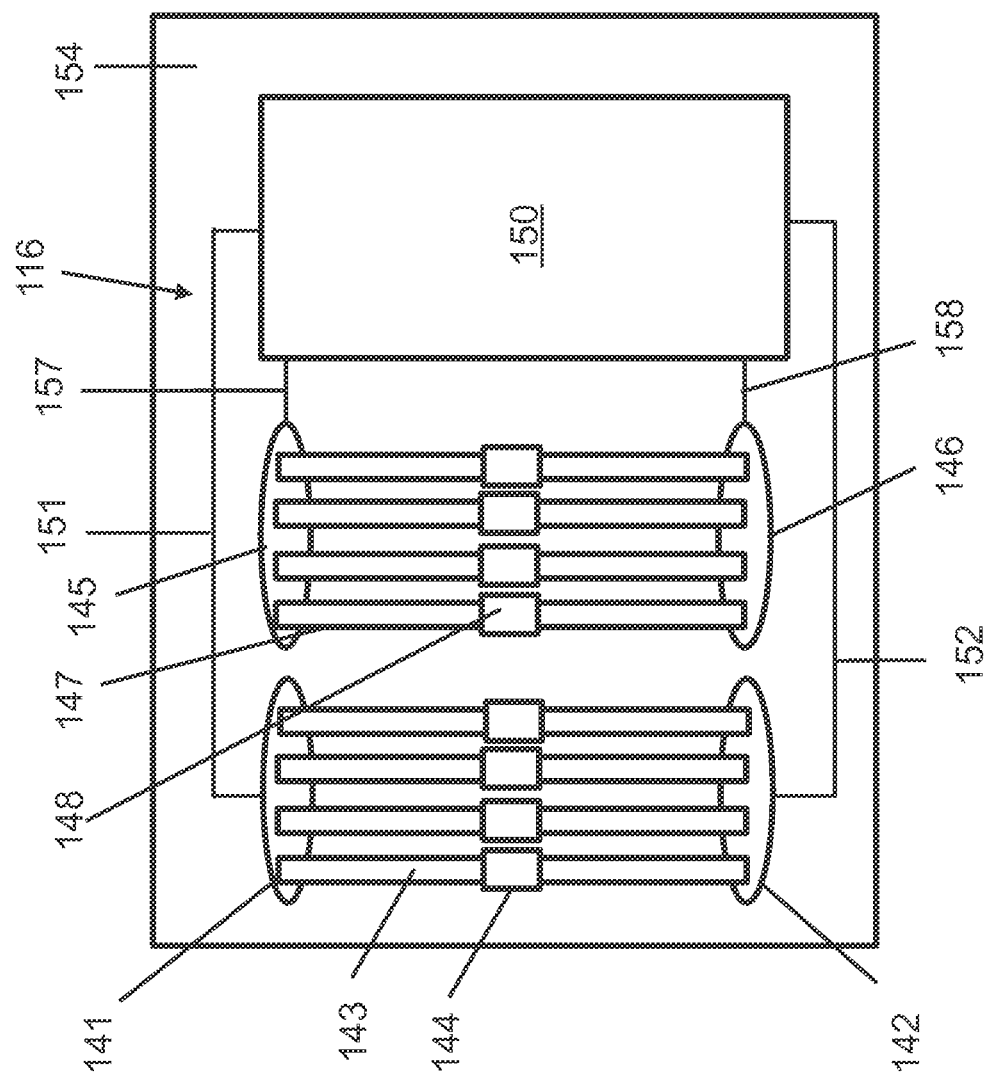
FIG. 20A is a plan view of another embodiment of a calorimetric sensor that includes multiple pairs of electrical contacts coupled with a circuit, with each pair of electrical contacts including multiple nanotubes oriented between them.

In some embodiments, features of the sensors 106, 107 can be combined with features of the sensors 110, 111, 112, 113, 114, 115 such that one or more additional first nanotubes 143 are oriented between the first and second electrical contacts 141, 142. One such embodiment is depicted in FIG. 20A. In certain embodiments, a calorimetric sensor 116 can include multiple first nanotubes 143 that can each be electrically coupled with each of the first and second electrical contacts 141, 142. Moreover, in some embodiments, one or more additional first reaction 144 sites for the first chemical or biological reaction can be present, and each of the one or more additional first reaction sites 144 can be supported by one of the one or more additional nanotubes 143.

Further, in some embodiments, one or more additional second nanotubes 147 can be oriented between the third and fourth electrical contacts 145, 146. The one or more additional second nanotubes 147 can each be electrically coupled with each of the third and fourth electrical contacts 145, 146.

In some embodiments, one or more additional second reaction sites 148 for the second chemical or biological reaction can supported by one of the one or more additional second nanotubes 147.

In some embodiments, the circuit 150 is configured to detect a thermal change of any of the reaction sites 144, 148 supported by any of the nanotubes 143, 147 due to one or more chemical or biological reactions at one or more of the reaction sites based on an effect of the thermal change on any of the nanotubes 143, 147. In certain of such embodiments, one or more of the nanotubes 143, 147 each supports a plurality of reaction sites 144, 148, respectively, that are each for a chemical or biological reaction.

In various embodiments of the sensors 110, 111, 112, 113, 114, 115, the first nanotube 143 is suspended between the first and second electrical contacts 141, 142 in spaced relation from other portions of the sensor and the second nanotube is suspended between the third and fourth electrical contacts 145, 146 in spaced relation from other portions of the sensor.

In some embodiments, at least one of the first and second nanotubes 143, 147 contacts and is supported by the substrate 154 at a position between the first and second electrical contacts 141, 142 or between the third and fourth electrical contacts 145, 146, respectively. The substrate may be of any suitable variety, such as those discussed above.

In various embodiments, one or more of the reaction sites 144, 148 can be resettable. In some embodiments, one or more of the chemical or biological reactions are reversible.

In some embodiments, one or more of the reaction sites 144, 148 are configured to be returned to a pre-reaction state via heating of the reaction site. In certain of such embodiments, the circuit 150 is configured to heat the first nanotube 143 to thereby heat the first reaction site 144. In certain of such embodiments, the circuit 150 is configured to heat the first nanotube 143 by passing a current through the first nanotube 143.

In some embodiments, the first reaction site 144 is configured to be returned to a pre-reaction state via immersion of the first reaction 144 site in a medium. In certain of such embodiments, the medium comprises a solvent. In some embodiments, the medium comprises an acid. In some embodiments, the medium comprises an alkali.

Any suitable method for manufacturing any of the foregoing calorimetric sensors is contemplated. In some embodiments, processes commonly used in microfabrication or semiconductor device fabrication can be used for at least a portion of some processes. For example, in some instances, the substrate 154, the electrical leads 151, 152, 157, 158, and/or the electrical contacts 141, 142, 145, 146 can be formed via any suitable methods of manufacture, such as one or more of thermal oxidation, chemical vapor deposition, physical vapor deposition, photolithography, shadow masking, or etching. The processes can further include suitable methods of electrically coupling the one or more nanotubes 143, 147 to the electrical contacts 141, 142, 145, 146.

Various methods, or portions thereof, that are described herein are not depicted in a step-by-step fashion in the drawings. Rather, one skilled in the art will understand such step-by-step methods from the written disclosure thereof and/or the drawings associated therewith. Moreover, to the extent a visual depiction of the methods described herein is desired, any suitable flow of method steps or stages may be depicted in a flow chart in which each recited step or stage is depicted in a separate box, and the boxes are connected via arrows showing an order of operations.

Some methods of manufacturing a calorimetric sensor 100-115 include electrically coupling a first nanotube 143 with each of a first electrical contact 141 and a second electrical contact 142 that are spaced from each other. The first nanotube 143 can include a first reaction site 144 for a first chemical or biological reaction. Some methods further include electrically coupling a circuit 150 with the first and second electrical contacts 141, 142. The circuit 150 can be configured to detect a first thermal change of the reaction site 144 due to the chemical or biological reaction based on an effect of the thermal change on the nanotube 143.

In various embodiments, the nanotube 143 is formed via arc-discharge evaporation, chemical vapor deposition, catalytic chemical vapor deposition, laser ablation, or template synthesis. Any suitable type of nanotube is contemplated, such as discussed above. For example, in various embodiments, the nanotube 143 comprises a carbon nanotube, an inorganic nanotube, a single-walled nanotube, or a multi-walled nanotube.

Some methods include functionalizing the nanotube 143 to support the reaction site 144. In various embodiments, functionalizing the nanotube comprises ion-beam functionalization or microwave-stimulated functionalization.

In various embodiments, the nanotube 143 is exohedrally functionalized. The reaction site 144 can be at an exterior of the nanotube 143. In some embodiments, the nanotube 143 is endohedrally functionalized. The reaction site 144 can be at an interior of the nanotube 143.

Some methods include attaching a functional group 155 to an end of the nanotube 143. The reaction site 144 can be defined by the functional group 155. Some methods include attaching the reaction site 144 to the functional group 155.

In some methods, the functional group 155 is attached to a sidewall of the nanotube 143. The reaction site 144 can be defined by the functional group 155. In some instances, methods include attaching the reaction site 144 to the functional group 155. In some methods, the reaction site 144 is covalently boded to the nanotube. Some methods include attaching the reaction site 144 to a functional group 155 that is covalently boded to the nanotube 143. In other methods, the reaction site is noncovalently bonded to the nanotube.

In like manner, any suitable method may be employed to achieve any of the arrangements for calorimetric sensors discussed above with respect to FIGS. 1-19. Thus, where a particular arrangement is described, a method may include forming the appropriate components to achieve the arrangement. As a further example, FIGS. 7 and 8 illustrate that in some embodiments, one or more polymers 149 are oriented about an exterior of the nanotube 143. Thus, some methods include orienting one or more polymers 149 about an exterior of the nanotube in any suitable manner.

Various methods of sensing a chemical or biological reaction are also possible. For example, in some methods, one or more of the calorimetric sensors discussed above with respect to FIGS. 1-19 are used in manners apparent from the foregoing descriptions. For example, in some instances, a method of sensing a chemical or biological reaction comprises exposing a first nanotube 143 to a first thermal change that takes place at a first reaction site 144 when the first reaction site undergoes a first chemical or biological reaction, wherein the first nanotube 143 is electrically coupled with a first electrical contact 141 and a second electrical contact 142. The method further comprises detecting that the first thermal change has had an effect on the nanotube 143.

In some instances, detecting that the first thermal change has had an effect on the nanotube is accomplished via a circuit 150 that is coupled with the first and second electrical contacts 141 142. The nanotube 143 may be of any suitable variety, such as those discussed above. In some embodiments, the reaction site 144 comprises a molecule configured to chemically interact with a target material, and the method can include detecting the chemical interaction of the target material with the molecule. In various embodiments, the molecule comprises a polymer.

In some embodiments, the reaction site 144 comprises a biological element configured to interact with an analyte, and the method can include detecting the interaction of the biological element with the analyte. In various embodiments, the biological element comprises one or more of an enzyme, an antibody, an antigen, a nucleic acid, a protein, a cell receptor, an organelle, a microorganism, a tissue, or a biologically derived material, a biomimic component.

In some methods, one or more additional reaction sites 144 that are each for a chemical or biological reaction are supported by the nanotube 143. Methods can include detecting a thermal change of one or more of the reaction sites 144 that are supported by the nanotube due to the chemical or biological reaction at each of the one or more of the reaction sites 144. In some methods, each of said detecting that the first thermal change has had an effect on the nanotube 143 and said detecting a thermal change of one or more of the reaction sites 144 that are supported by the nanotube 143 due to the chemical or biological reaction at each of the one or more of the reaction sites 144 is accomplished via the circuit 150.

In some embodiments, one or more additional nanotubes 147 are oriented between the first and second electrical contacts and one or more additional reaction sites 148 for a chemical or biological reaction are supported by one of the one or more additional nanotubes 147, as discussed above. In some embodiments, the second nanotube 147 is devoid of any couplings to reaction sites for chemical or biological reactions of a variety that would be detectable via the first reaction site 144. In various embodiments, the second nanotube is non-functionalized or supports a second reaction site 148 that is for a second chemical or biological reaction that is different from the first chemical or biological reaction for which the first reaction site 144 is configured.

Certain methods include detecting a thermal change of any of the reaction sites 144, 147 supported by any of the nanotubes 143, 147 due to one or more chemical or biological reactions at one or more of the reaction sites based on an effect of the thermal change on any of the nanotubes.

In some instances, detecting a thermal change of any of the reaction sites supported by any of the nanotubes due to one or more chemical or biological reactions at one or more of the reaction sites based on an effect of the thermal change on any of the nanotubes and said detecting that the first thermal change has had an effect on the nanotube is accomplished via the circuit 150.

Some methods include determining a magnitude of the change in the resistance of the nanotube 143 based on a change in voltage across the first and second electrical contacts. Some methods include determining a magnitude of the change in the resistance of the nanotube based on a change in current passing through the nanotube.

Some methods include counteracting a change in the resistance of the nanotube 143 so as to maintain the nanotube at a constant resistance. In some instances, each of said counteracting a change in the resistance of the nanotube so as to maintain the nanotube at a constant resistance and said detecting that the first thermal change has had an effect on the nanotube is accomplished via the circuit 150. In some embodiments, the circuit 150 comprises a feedback circuit 156. Some methods can include counteracting, via the feedback circuit 156, a change in the resistance of the nanotube 143 by controlling a current within the feedback circuit 156. Some methods include detecting a magnitude of the thermal change of the reaction via a magnitude of a change in the current used to maintain the nanotube 143 at the constant resistance.

Some methods include detecting a thermal change of the first reaction site 144 based on a differential measurement of the first and second nanotubes 144, 147. In certain of such methods, this is accomplished via a circuit 150. For example, the circuit 150 may be one of the circuits 150 depicted in FIGS. 15-18.

In some methods, the differential measurement compares a resistance of the first nanotube 143 with a resistance of the second nanotube 147. In some methods, the differential measurement compares a current flow through the first nanotube 143 with a current flow through the second nanotube 147. In some methods, the differential measurement compares a voltage across the first and second electrical contacts 141, 142 with a voltage across the third and fourth electrical contacts 145, 146.

Some methods include counteracting a change in a first resistance of the first nanotube 143 so as to maintain the first nanotube at the first resistance and counteracting a change in a second resistance of the second nanotube 144 so as to maintain the second nanotube at the second resistance. In some instances, the first resistance and the second resistance are the same prior to initiation of the chemical or biological reaction at the first reaction site 144. In other instances, the first resistance and the second resistance are different from each other prior to initiation of the chemical or biological reaction at the first reaction site 144.

In some instances, counteracting a change in the first resistance of the first nanotube 143 is accomplished by controlling a first current within a first feedback circuit 156. Counteracting a change in the second resistance of the second nanotube 144 can be accomplished by controlling a second current within a second feedback circuit 159.

In some methods, the differential measurement mentioned above compares a magnitude of a change in the first current used to maintain the first nanotube 143 at the first resistance with a magnitude of a change in the second current used to maintain the second nanotube 147 at the second resistance.

In some embodiments, multiple first nanotubes 143 are oriented between and are electrically coupled with each of the first and second electrical contacts 141, 142; multiple first reaction sites 144 for the first chemical or biological reaction are supported by one of the multiple first nanotubes; multiple second nanotubes 147 are oriented between and are electrically coupled with each of the third and fourth electrical contacts 145, 146; and multiple second reaction sites 148 for the second chemical or biological reaction are supported by one of the one or more additional second nanotubes 147, such as depicted, for example, in FIG. 20A. Certain methods can include detecting a thermal change of any of the reaction sites 144, 148 supported by any of the nanotubes 143, 147 due to one or more chemical or biological reactions at one or more of the reaction sites based on an effect of the thermal change on any of the nanotubes. In some embodiments, one or more of the nanotubes 143, 147 each supports a plurality of reaction sites 144, 148 that are each for a chemical or biological reaction.

In some instances, one or more of the first and second reaction site 144, 148 is resettable. For example, in some embodiments, the chemical or biological reaction is reversible. Some methods can include returning a reaction site 144, 148 to a pre-reaction state via heating. In some embodiments, the circuit 150 heats the first or second nanotube 143, 147 to thereby heat the reaction site 144, 148. For example, the circuit 150 may pass a current through the first and/or second nanotubes 143, 147.

In some embodiments, a reaction site 144, 148 can be configured to be returned to a pre-reaction state via immersion thereof in a medium. In various embodiments, the medium can comprise a solvent, an acid, or an alkali.

FIG. 20B is a plan view of another embodiment that includes a single reference sensor (reaction site 148) and a set of other sensors (reaction sites 144). By scaling the measurements made via reaction site 148, reaction site 148 can provide an accurate reference point for any number of corresponding reaction sites 144. Thus, any number of reference nanotube calorimetric sensors may be used with any number of measurement nanotube calorimetric sensors.

Figure 21:
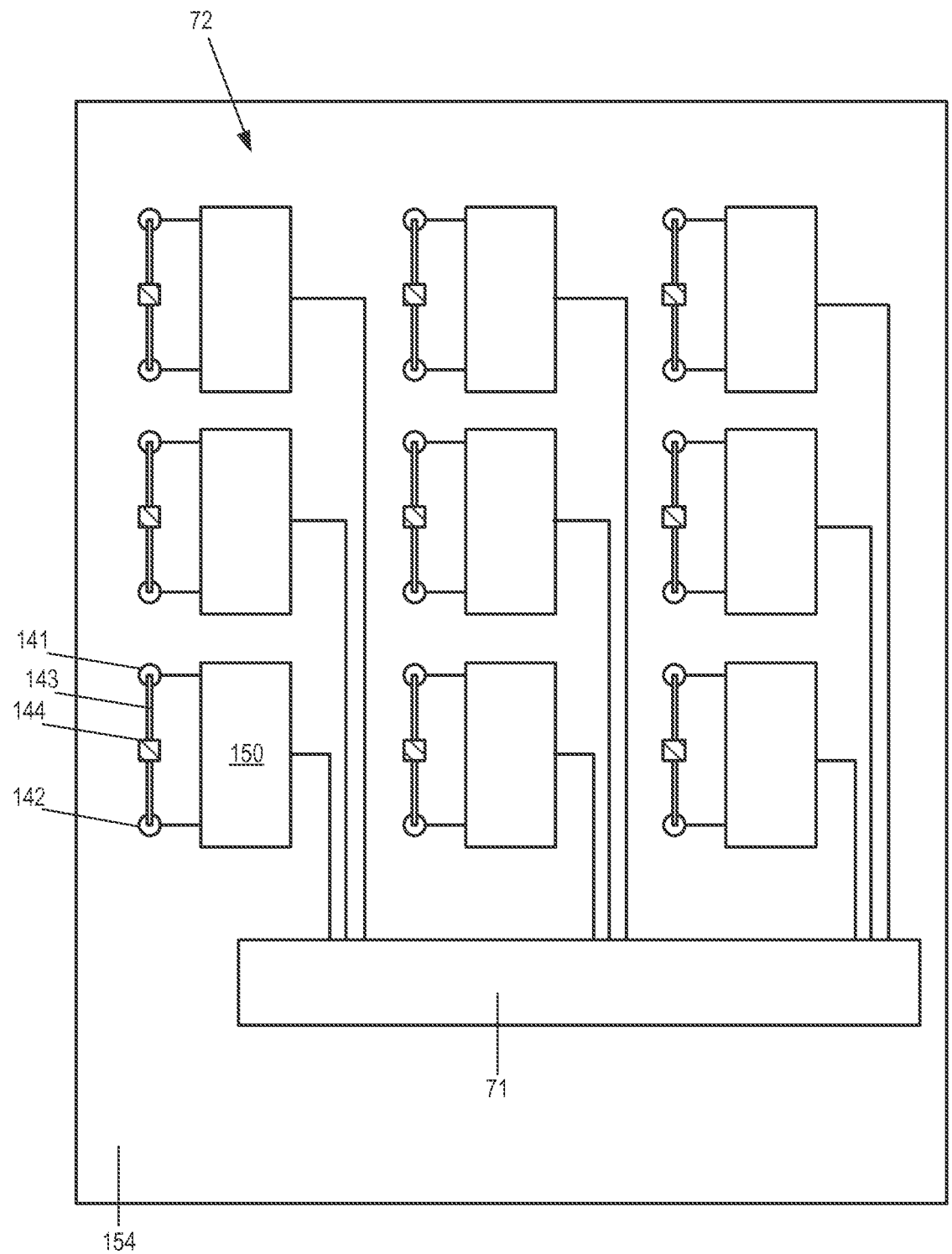
FIG. 21 is a plan view of an embodiment of a system that includes an array of calorimetric sensors coupled to readout electronics.

In certain embodiments, a system 200 that can be used for calorimetric sensing can include a plurality of any of the calorimetric sensors described above. In various embodiments, one or more of the varieties of sensors described herein may be used. The sensors 100 may be arranged in an array, such as the two-dimensional array illustrated in FIG. 21. In the illustrated embodiment, the plurality of sensors are oriented in a first direction to form a two-dimensional array. Readout electronics 171 may be in communication with each of the circuits 150 of each sensor. As in various embodiments, each sensor may include a nanotube 143, electrical contacts 141, 142, and a reaction site 144. In some embodiments, the entire array may be on a single substrate 154. In other embodiments, one or more of the sensor within the array may be on a different substrate.

As described herein, In some embodiments, a system for calorimetric sensing includes a plurality of sensors that are oriented in both a first direction and a second direction to form a two-dimensional array.

Figure 22:
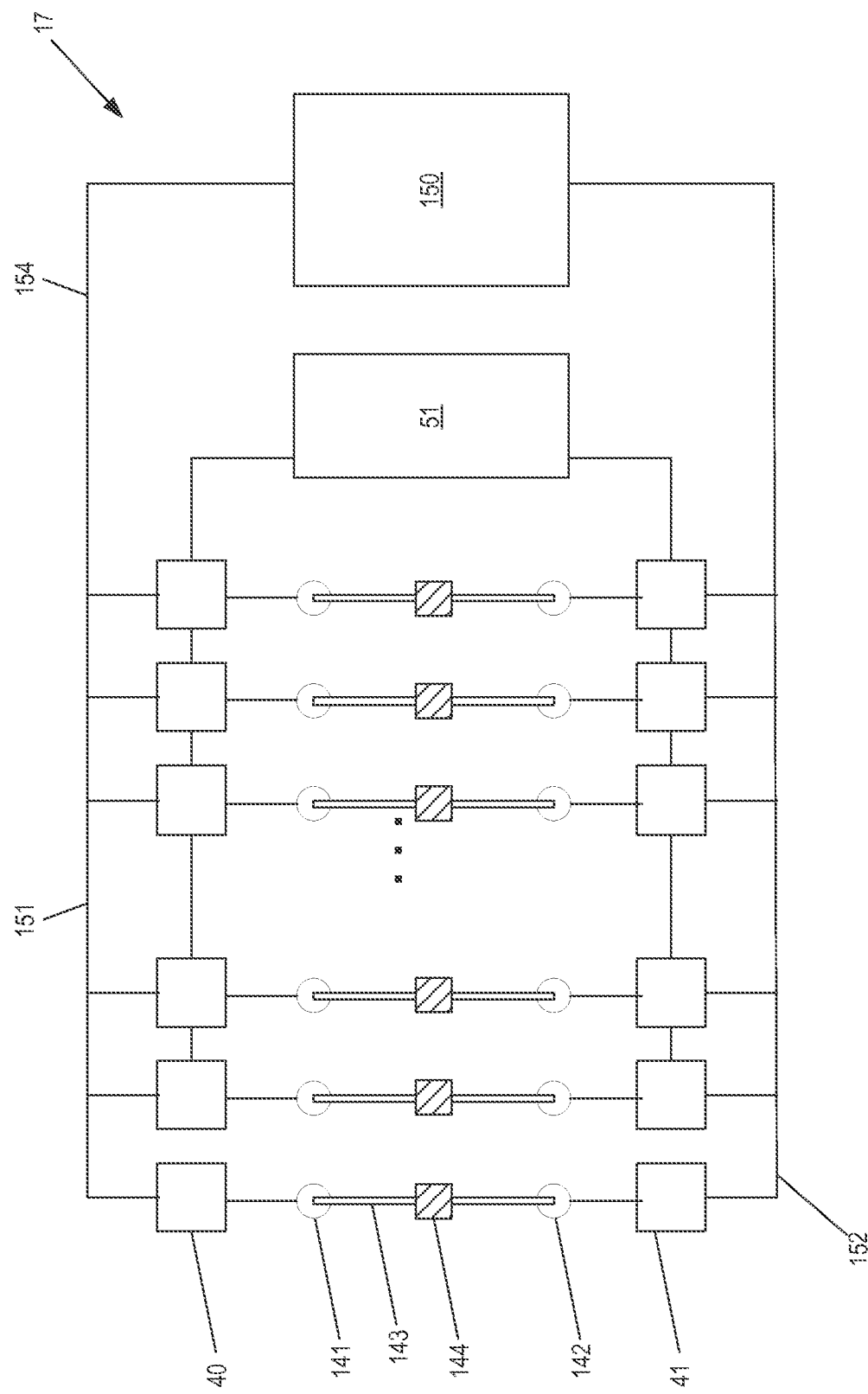
FIG. 22 is a plan view of an embodiment of a system that includes an array of switchable calorimetric sensors.

With reference to FIG. 22 a system may include an array of switchable calorimetric sensors. Sensor electronics 150 may be in communication with each of the various sensors, where each sensor includes a nanotube 143, electrical contacts 141, 142, and a reaction site 144. Switches 40, 41 may be controlled by a switch control 51. The switch control 51 may be in communication with sensor electronics and/or a separate controller (not shown), such as a readout electronic component. The switch control may selectively switch the switch 40, 41 to selectively control which of the sensors is used to provide data to the sensor electronics 150.

The switches may be used to sequentially read data from each of the sensors and/or selectively read data from only a subset of sensors. The number of sensors and corresponding switches may be increased or decreased. In some embodiments, each sensor has only one switch, instead of two switches as illustrated. In some embodiments, the switches may be implemented by selective control of a current and/or voltage provided to each of the sensors.

In some embodiments, a system for calorimetric sensing includes a plurality of sensors. A processor may be electrically coupled with the circuits of at least a plurality of the sensors. The sensors may be oriented in a first direction to form a one-dimensional array.

Figure 23B:
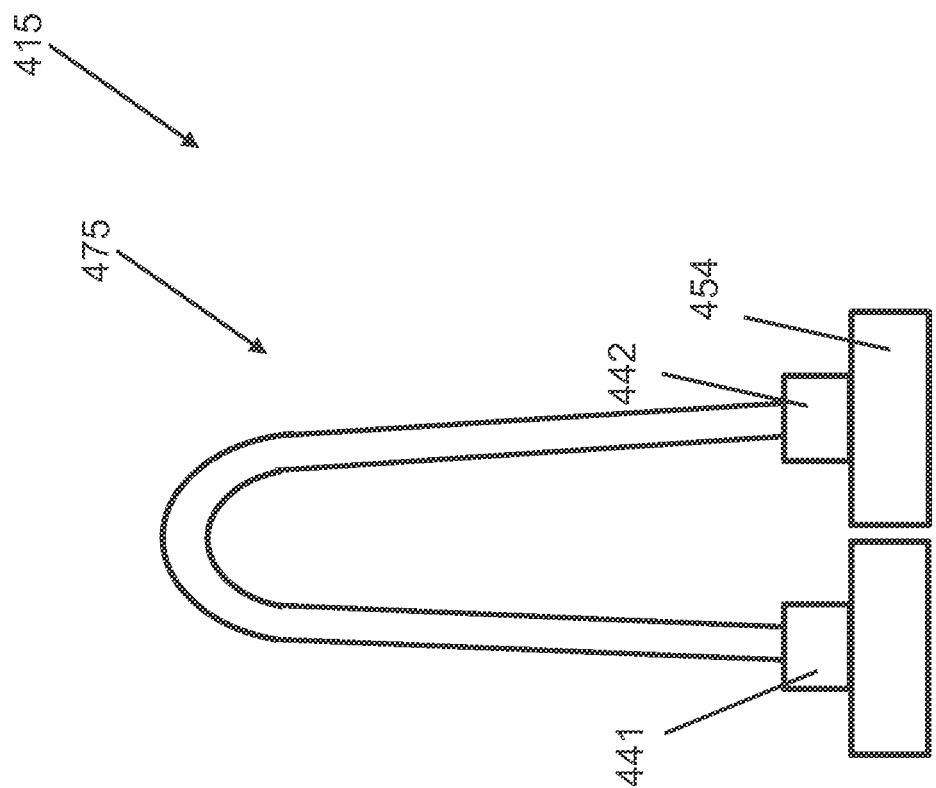
FIG. 23B is another elevation view of a portion of an embodiment that depicts a nanostructure that comprises an arc.
Figure 23A:
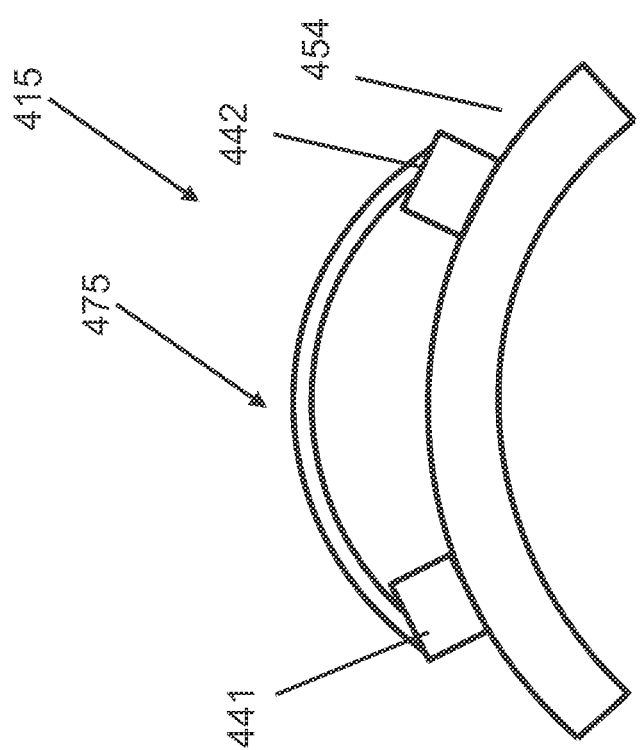
FIG. 23A is an elevation view of a portion of an embodiment that depicts a nanostructure that comprises an arc.

With reference to FIGS. 23A and 23B, in certain embodiments, for at least one of the sensor elements 415, the nanostructure 475 defines an arc between the first and second electrical contacts 441, 442. In some embodiments, such as that depicted in FIG. 23A, the arc shape may be achieved by bending the substrate. In other embodiments, such as that depicted in FIG. 23B, the arc shape may be achieved by moving portions of the substrate toward each other.

In some embodiments, the substrate and/or nanotube(s) may be made to project or curve outward. In some embodiments, the nanostructure may comprises an S shape or other shape that allows the sensors on a nanotube to be spaced closer together than the spacing of the electrical contacts for each respective sensor. For instances, the nanotubes may curve or be bent such that that the sensors are clustered or grouped near a center location, while the electrical contacts are spaced (evenly or unevenly) farther apart.

With reference to FIG. 24, in some embodiments, for at least one of the sensor elements 415, the nanostructure 475 comprises a V-shape. In some instances, the V-shape is formed by buckling the nanostructure 475. For example, the buckling is achieved via a damage process, such as, for example, an ion beam process. In some embodiments, the buckling is achieved at a functionalized portion of the nanostructure 475. Similar shapes and/or configuration are possible for heaters and/or sensor/heater combinations.

Figure 25:
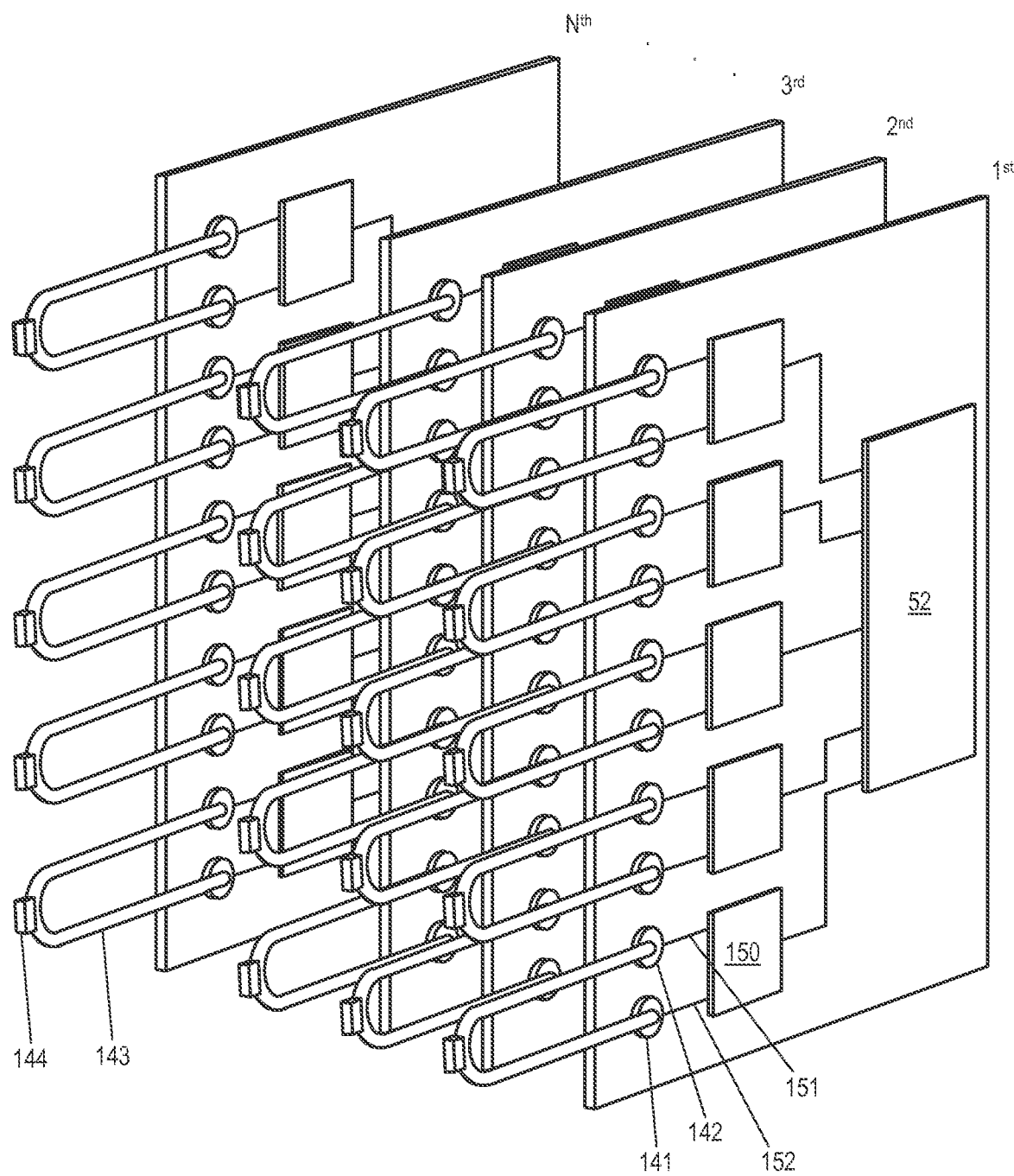
FIG. 25 is a perspective view of a two-dimensional array of calorimetric sensors, according to one exemplary embodiment.

With reference to FIG. 25, a plurality of reaction sites 144 connected to nanotubes 143 may be formed in an array. As illustrated, each of the reaction sites 144 may extend off of the substrate. The array may be two-dimensional, as illustrated, or the array may be one-dimensional. Each of the sensors may include a nanotube 143, electrical contacts 141, 142, and/or electrical leads 151, 152. Various sensor circuitry 150 and possibly unifying controller circuitry 52 may be used to gather sensor data from the array of calorimetric sensors.

Figure 26:
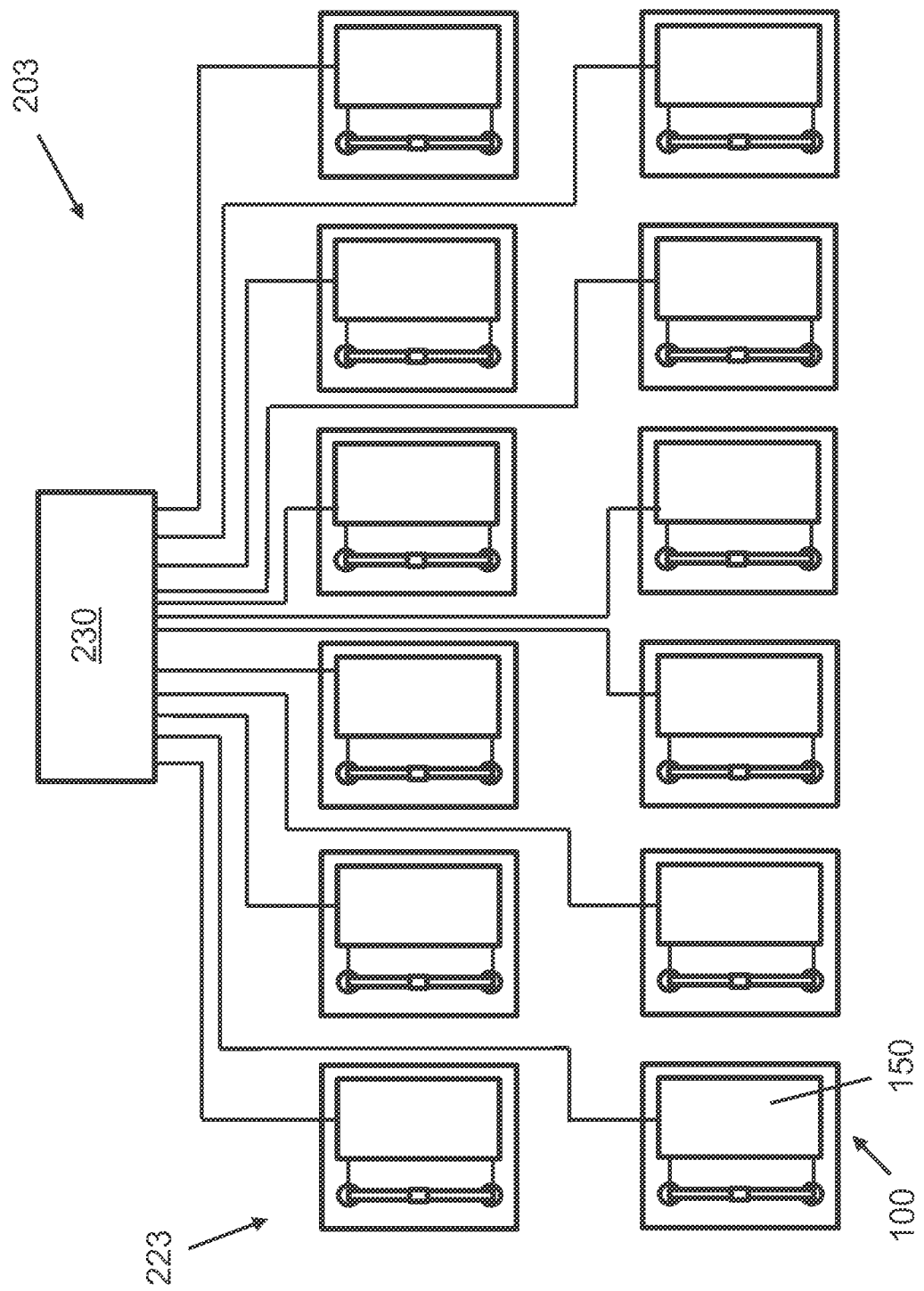
FIG. 26 is a plan view of another embodiment of a system that includes a two-dimensional array of calorimetric sensors.

With reference to FIG. 26, in some embodiments, a system 203 for calorimetric sensing includes a plurality of sensors 100. A processor 230 is electrically coupled with the circuits 150 of at least a plurality of the sensors 100. In the illustrated embodiment, the sensors 100 are oriented in both a first direction and a second direction to form a two-dimensional array 223.

In certain embodiments, a system can include an array of sensors. The circuits of the sensors can be electrically coupled with the processor. The system can further include a display that can provide a pictorial representation of the array via a computer system. Other or further suitable readout or user interface mechanisms may be coupled with the processor.

For the sake of brevity, conventional techniques for computing, data entry, data storage, networking, and/or the like may not be described in detail herein. Furthermore, the connecting lines shown in various figures contained herein are intended to represent exemplary functional relationships and/or communicative, logical, and/or physical couplings between various elements. A skilled artisan will appreciate, however, that many alternative or additional functional relationships, physical connections, wireless connections, or the like may be present in a practical implementation of the systems or methods described.

Additionally, principles of the present disclosure may be reflected in a computer program product on a computer-readable storage medium having computer-readable program code means embodied in the storage medium. Any suitable tangible, non-transitory computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a computer-readable memory that can direct a computer or other programmable data processing apparatus to function in a particular manner, such that the instructions stored in the computer-readable memory produce an article of manufacture including implementing means which implement the function specified. The computer program instructions may also be loaded onto a computer or other programmable data processing apparatus to cause a series of operational steps to be performed on the computer or other programmable apparatus to produce a computer-implemented process, such that the instructions which execute on the computer or other programmable apparatus provide steps for implementing the functions specified.

Figure 27:
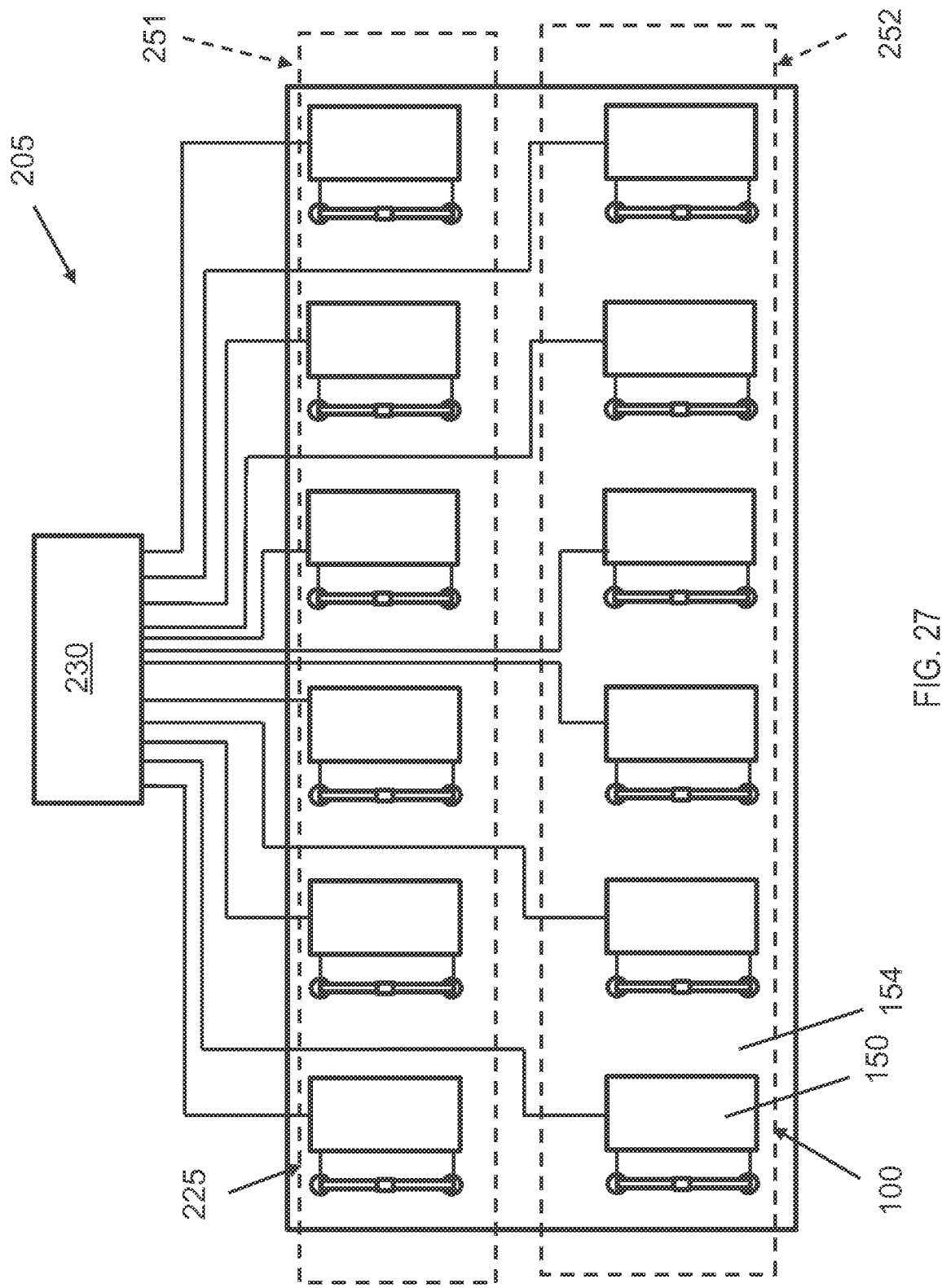
FIG. 27 is a plan view of another embodiment of a system that includes an array of calorimetric sensors.

With reference to FIG. 27, certain embodiments, a system 205 can include an array 225 of sensors 100. The circuits 150 of the sensors 100 can be electrically coupled with the processor 230. In some embodiments, the array 225 of sensors 100 is formed on a single substrate 154 that is common to all of the sensors 100. In the illustrated embodiment, the processor 230 is shown separate from the substrate 154. In other embodiments, the processor 230 may also be formed on the substrate 154. In the illustrated embodiment, each sensor 100 includes a dedicated circuit 150.

Figure 28:
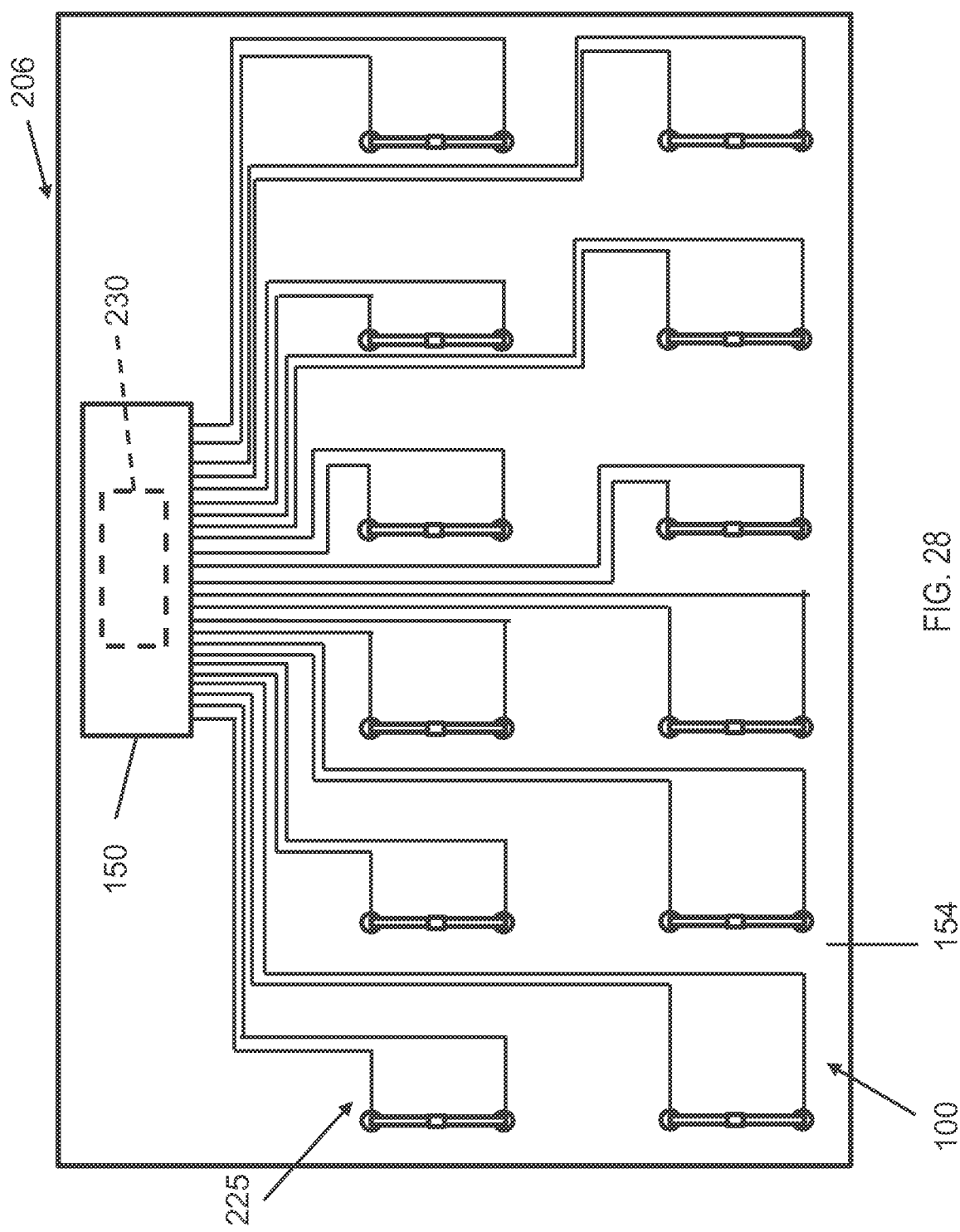
FIG. 28 is a plan view of another embodiment of a system that includes an array of calorimetric sensors.

With reference to FIG. 28, in some embodiments, a system 206 may include multiple sensors 100, and each sensor 100 may be electrically coupled with a circuit 150 that is common to all of the sensors 100 within the array 225. It may be said that each sensor 100 within the array comprises a circuit, given that each sensor 100 is separately connected to the circuit 150 via different electrical leads and thus may be said to have a different circuitous path relative to the circuit 150. In some embodiments, the circuit 150 can include a processor 230, such as discussed elsewhere herein.

In some embodiments, any of the systems 200, 201, 202, 203, 204, 205, 206 are configured to determine whether one or more reactions occur at one or more of the sensors 100, respectively, to determine one or more positions within the respective array 220, 221, 222, 223, 224, 225 at which the one or more reactions occur. In some embodiments, a system 200, 201, 202, 203, 204, 205, 206 is configured to determine one or more times at which one or more reactions occur at one or more of the sensors 100, respectively. In some embodiments, a system 200, 201, 202, 203, 204, 205, 206 is configured to determine information regarding one or more of the position, reaction status, or reaction timing for each sensor 100.

In certain embodiments, a system 200, 201, 202, 203, 204, 205, 206 is configured to determine a gradient of an intensive property. For example, the intensive property can be one or more of the concentration of a reactant, the concentration of a catalyst, the concentration of an enzyme, or the concentration of a catalyst.

In certain embodiments, a system 200, 201, 202, 203, 204, 205, 206 is configured to determine a distribution of an intensive property. In some embodiments, the system is configured to determine an absolute value of the distribution. In some embodiments, the distribution is a relative distribution. In various embodiments, the intensive property can be one or more of the concentration of a reactant, the concentration of a catalyst, the concentration of an enzyme, the concentration of a catalyst, temperature, or pH.

In various embodiments, a system 200, 201, 202, 203, 204, 205, 206 is configured to determine one or more of a probability of reaction or a rate of reaction. In some embodiments, each nanotube supports a plurality of reaction sites 144 and/or 148, as discussed above, and the system can be configured to determine a probability of reaction at one or more of the sensors 100. In some embodiments, each nanotube supports a plurality of reaction sites, and the system is configured to determine a rate of reaction at one or more of the sensors.

In various embodiments, the processor 230 performs one or more of the functions described above. For example, in various embodiments, it is the processor 230 that is configured to determine whether one or more reactions occur at one or more of the sensors 100, respectively, to determine one or more positions within the array at which the one or more reactions occur. As a further example, the processor 230 may be configured to determine one or more times at which one or more reactions occur at one or more of the sensors, respectively. In some embodiments, the processor 230 is configured to determine information regarding one or more of the position, reaction status, and reaction timing for each sensor. The processor 230 can be configured to determine a gradient based on the information.

As previously mentioned, the systems 200, 201, 202, 203, 204, 205, 206 can include any of the sensors 100-116 discussed above. In some embodiments, each nanotube of the sensors within an array supports a plurality of reaction sites. The processor 230 can be configured to determine a magnitude of reactions that occur at one or more of the sensors.

In some embodiments of the systems 200, 201, 202, 203, 204, 205, 206 each sensor comprises a nanotube electrically coupled with and oriented between a first electrical contact and a second electrical contact, and the nanotube supports a reaction site for a chemical or biological reaction. A circuit coupled with the first and second electrical contacts can be configured to detect a first thermal change of the reaction site due to the chemical or biological reaction based on an effect of the thermal change on the nanotube. The reaction sites of the sensors can be configured for use in the same variety of chemical or biological reaction.

In some embodiments of the systems 200, 201, 202, 203, 204, 205, 206 each sensor comprises a nanotube electrically coupled with and oriented between a first electrical contact and a second electrical contact, wherein the nanotube supports a reaction site for a chemical or biological reaction. A circuit coupled with the first and second electrical contacts can be configured to detect a first thermal change of the reaction site due to the chemical or biological reaction based on an effect of the thermal change on the nanotube. The reaction site of each sensor can be configured for use in a different variety of chemical or biological reaction, as compared with at least one of the remaining sensors.

In some embodiments of the systems 200, 201, 202, 203, 204, 205, 206 each sensor comprises a nanotube electrically coupled with and oriented between a first electrical contact and a second electrical contact, and the nanotube supports a reaction site for a chemical or biological reaction. A circuit coupled with the first and second electrical contacts can be configured to detect a first thermal change of the reaction site due to the chemical or biological reaction based on an effect of the thermal change on the nanotube. A first group that includes one or more sensors can be configured for use in a first variety of chemical or biological reaction and a second group that includes one or more sensors is configured for use in a second variety of chemical or biological reaction that is different from the first variety. In certain of such embodiments, the first group of sensors does not include any sensors that are in the second group of sensors. An illustrative example of first and second groups 251, 252 of sensors 100 is depicted in FIG. 27. Other patterns of the first and second groups 251, 252 are possible.

Various methods of sensing a chemical or biological reaction can utilize any of the systems 200, 201, 202, 203, 204, 205, 206 discussed above, including the examples thereof depicted in the drawings. Some methods include the exposing of a first nanotube of a first sensor within a sensor array to a first thermal change that takes place at a first reaction site when the first reaction site undergoes a first chemical or biological reaction. The methods can further include detecting that the first thermal change has had an effect on the first nanotube.

Some methods include determining whether one or more reactions occur at one or more reaction sites within the sensor array, respectively, to determine one or more positions within the sensor array at which the one or more reactions occur. Other or further methods include one or more of determining one or more times at which one or more reactions occur at one or more of the sensors of the sensor array, respectively; determining information regarding one or more of the position, reaction status, or reaction timing for each sensor of the sensor array; determining a gradient based on the information; determining a probability of reaction at one or more of the sensors of the sensor array; or determining a rate of reaction at one or more of the sensors of the sensor array.

In certain embodiments, each sensor within the sensor array comprises one or more nanotubes that are oriented between a pair of electrical contacts, wherein each nanotube supports a reaction site configured for the first chemical or biological reaction, and wherein the reaction site of each sensor in the array is configured for use in the same variety of chemical or biological reaction, as compared with the remaining sensors. Some methods include detecting a plurality of instances of the first chemical or biological reaction via a plurality of the sensors.

In some embodiments, each sensor within the sensor array comprises one or more nanotubes that are oriented between a pair of electrical contacts, wherein each nanotube supports a reaction site configured for a different variety of chemical or biological reaction, as compared with at least one of the remaining sensors. Some methods include detecting different chemical or biological reactions via a plurality of the sensors within the sensor array.

In some embodiments, each sensor within the sensor array comprises one or more nanotubes that are oriented between a pair of electrical contacts, wherein each nanotube supports a reaction site, wherein a first group that includes one or more sensors is configured for use in a first variety of chemical or biological reaction, and wherein a second group that includes one or more sensors is configured for use in a second variety of chemical or biological reaction that is different from the first variety. Some methods can include detecting one or more instances of the first chemical or biological reaction via the first group of sensors and detecting one or more instances of the second chemical or biological reaction via the second group of sensors. In further embodiments, the first group of sensors does not include any sensors that are in the second group of sensors.

In certain embodiments, a sensor may comprise a substrate, a thermal member spaced from the substrate, and a first nanotube oriented between the substrate and the thermal member. The first nanotube may be in thermal contact with the thermal member. The sensor may further comprises a circuit coupled with the first nanotube. The circuit can be configured to detect a thermal change in the thermal member via a change relative to the nanotube. In certain embodiments, the first nanotube may further be in thermal contact with the substrate.

In some embodiments, the sensor may include one or more electrical leads that electrically couple the nanotube to the circuit. The electrical leads may be electrically coupled to opposite ends of the nanotube. One of the electrical leads may be substantially parallel to a surface of the substrate. The other electrical lead may include a portion that is supported by a support structure. The support structure may be formed in any suitable manner, such as via any suitable microfabrication technique discussed above. In some embodiments, the support structure may be an extension of the substrate. The support structure may be in close proximity or in contact with the nanotube. For example, in some embodiments, the support structure may support the nanotube. Other suitable arrangements are possible.

In some embodiments, the first nanotube assists in suspending the thermal member relative to the substrate to maintain spacing between the thermal member and the substrate. For example, the thermal member may be at a position below the substrate, with gravitational forces pulling the thermal member downwardly away from the substrate in the illustrated orientation. At least a portion of the nanotube can be in tension and counteract the gravitational forces to suspend the thermal member.

In various embodiments, a thermal member may be at a position above the substrate, with gravitational forces pulling the thermal member downwardly toward the substrate in the illustrated orientation. At least a portion of the nanotube can be in compression and counteract the gravitational forces to suspend the thermal member above the substrate. In various embodiments, either the upward suspension or downward suspension orientation is possible. In some embodiments, one orientation may be preferable over the other. In still further embodiments, only one of the orientations may function properly.

In some embodiments, the first nanotube fully suspends the thermal member relative to the substrate to maintain spacing between the thermal member and the substrate. In other embodiments, one or more support structures may assist the first nanotube in suspending the thermal member. For example, rather than having a spacing between the support structure and the thermal member, at least a portion of the thermal member may contact and be supported by the support structure.

In certain embodiments, the circuit is configured to detect a change in resistance of nanotube due to a heat-related change to the thermal member. In certain of such embodiments, the heat-related change is a heat input to the thermal member. In other or further embodiments, the heat-related change is a heat removal from the thermal member.

In various embodiments, the thermal member comprises a platform, a bead, etc. In other or further embodiments, the thermal member comprises an etched element. In various embodiments, the thermal member comprises one or more of silicon or silicon dioxide.

In some embodiments, the thermal member comprises an absorptive element. In some embodiments, the sensor is configured to function as a bolometer. In some embodiments, the sensor is configured to function as a calorimeter.

In some embodiments, thermal member has a maximum dimension that is no less than about 10, 100, or 1,000 times greater than a maximum dimension of the first nanotube. For example, the maximum dimension of the thermal member may be its width, and the maximum dimension of the first nanotube may be its length.

In some embodiments, the change relative to the nanotube mentioned above comprises a change in a resistance of the nanotube due to a change in temperature of the nanotube. The change may be an increase or a decrease in temperature. In some embodiments, the circuit is configured to determine a magnitude of the change in the resistance of the nanotube based on a change in voltage. In certain embodiments, the circuit is configured to determine whether or not any change in the thermal member occurs by determining whether or not a voltage across the nanotube changes.

In some embodiments, the circuit is configured to determine a magnitude of the change in the resistance of the nanotube based on a change in current passing through the nanotube. In certain embodiments, the circuit is configured to determine whether or not any change in the thermal member occurs by determining whether or not a current passing through the nanotube changes.

In some embodiments, the circuit is configured to determine a magnitude of the change in resistance of the nanotube 343 based on a change in power dissipated in the circuit. In certain embodiments, the circuit is configured to determine whether or not any change in the thermal member occurs by determining whether or not a level of power dissipated in the circuit changes.

In some embodiments, the circuit is configured to counteract a change in the resistance of the nanotube so as to maintain the nanotube at a constant resistance.

FIG. 29A is an elevation view of an embodiment of a sensor that includes a nanotube 143 coupled with a thermal or absorptive member 44. A coating 45 may attach the nanotube to the absorptive member 44. Supports and/or electrical contacts 141, 142 may connect the sensor to a substrate 154. The thermal or absorptive member 44 may comprise an absorptive element to allow the sensor to function as a bolometer.

For example, the absorptive member 44 may be a thermally absorptive material and/or a material sensitive to some type of radiation, such as electromagnetic radiation like ultraviolet or infrared. For instance, the absorptive material may convert electromagnetic radiation to heat, and an increased temperature may be communicated by the sensor to readout electronics.

FIG. 29B is an elevation view of an embodiment of a calorimetric sensor that includes a nanotube 143 that is coupled to an absorptive material 44, and optionally includes a coating member 45. In the illustrated embodiment, the absorptive material 44 is supported by thermally isolating mechanical supports 18. A gap in the substrate 154 may allow for increased exposure to the absorptive material 44 from both above and below.

Figure 29C:
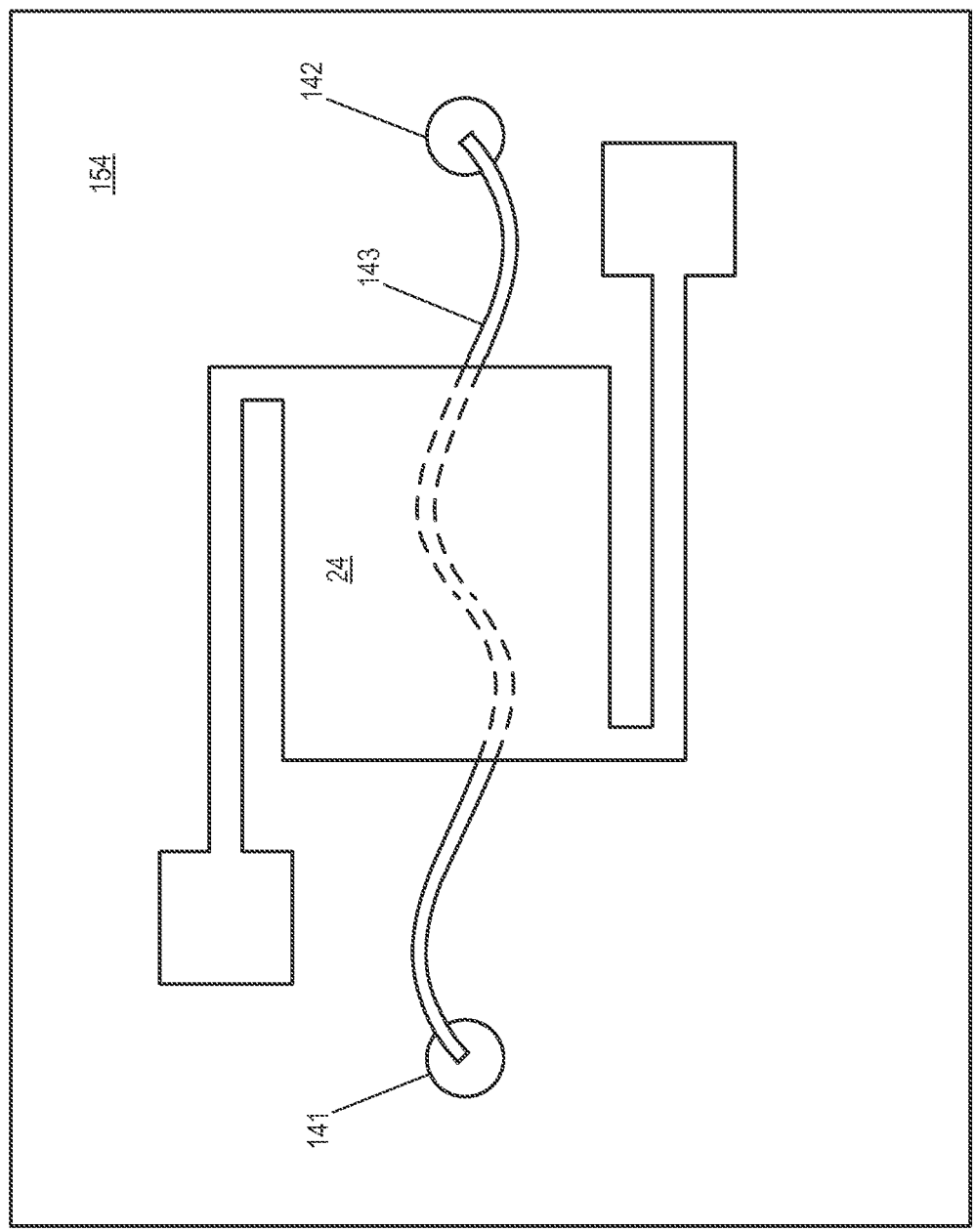
FIG. 29C is a plan view of a nanotube coupled with an isolated thermal member.

FIG. 29C is a plan view of a nanotube 143 connected to electrical and/or supporting contacts 141, 142. The nanotube 13 may span a cutout 24 in a substrate 154.

In some embodiments, a sensor includes a circuit that comprises a feedback circuit. The feedback circuit can be configured to counteract a change in the resistance of the nanotube by controlling a current within the feedback circuit. In some embodiments, a magnitude of the thermal change in the thermal member is detected via a magnitude of a change in the current used to maintain the nanotube at the constant resistance.

In some embodiments, the circuit is configured to maintain a constant voltage across the nanotube. For example, in some arrangements, this can be accomplished via the electrical leads that are positioned at opposite ends of the nanotube. In other embodiments, the electrical leads may be positioned at other regions of the nanotube and/or additional electrical leads at positioned at additional regions are possible. In some embodiments, changes in the circuit that aid in maintaining the constant voltage are used to determine whether or not a thermal change in the thermal member occurs. In some embodiments, changes in the circuit that aid in maintaining the constant voltage are used to determine a magnitude of the thermal change in the thermal member.

In some embodiments, the circuit is configured to pass a constant current through the nanotube. In certain of such embodiments, changes in the circuit that aid in maintaining the constant current are used to determine whether or not a thermal change in the thermal member occurs. In some embodiments, changes in the circuit that aid in maintaining the constant current are used to determine a magnitude of the thermal change in the thermal member.

In some embodiments, the circuit is configured to dissipate a constant power. In certain of such embodiments, changes in the circuit that aid in maintaining the constant power are used to determine whether or not a thermal change in the thermal member occurs. In some embodiments, changes in the circuit that aid in maintaining the constant power are used to determine a magnitude of the thermal change in the thermal member.

In some embodiments, a sensor includes a conducting lead in thermal contact with the thermal member, and the circuit is coupled with the conducting lead. In some embodiments, the conducting lead comprises the electrical lead, which is also electrically coupled with the first nanotube. In some embodiments, a portion of the conducting lead is electrically and thermally coupled with the thermal member.

In some embodiments, the conducting lead comprises a second nanotube that has different thermoelectric properties than those of the first nanotube. In some embodiments, a single electrical lead may connect the second nanotube with the circuit. In other embodiments, a portion (e.g., an end) of the second nanotube may be electrically coupled with the circuit directly. In still other embodiments, two electrical leads may couple the second nanotube to the circuit. In some embodiments, the electrical leads may be at opposite ends of the second nanotube.

In some embodiments, the conducting lead comprises a silicon bridge. In some embodiments, the silicon bridge may also serve as a support structure.

In some embodiments, the conducting lead can comprise a metallic conductor, such as, for example the electrical lead. In the illustrated embodiment, the electrical lead is supported by the support structure such that a portion thereof is supported in thermal contact with the support structure.

In various embodiments of the sensors, the circuit is configured to detect a change in thermoelectric voltage. In some embodiments, the circuit is configured to detect a change in voltage between the first nanotube and the conducting lead. In some embodiments, the change in thermoelectric voltage is proportional to a temperature difference between the thermal member and the substrate.

The conducting lead can be in thermal contact with the substrate. In some embodiments, the conducting lead is electrically coupled to the first nanotube.

In various embodiments of the sensors, the thermal change in the thermal member comprises heat input due to an absorption of one or more photons by the thermal member. In other or further embodiments, the thermal change in the thermal member comprises heat removal due to an emission of one or more photons by the thermal member.

In various embodiments, the thermal change in the thermal member comprises heat input due to an adsorption of one or more atoms onto a surface of the thermal member. In other or further embodiments, the thermal change in the thermal member comprises heat removal due to an adsorption of one or more atoms onto a surface of the thermal member.

In various embodiments, the thermal change in the thermal member comprises heat input due to an adsorption of one or more molecules onto a surface of the thermal member. In other or further embodiments, the thermal change in the thermal member comprises heat removal due to an adsorption of one or more molecules onto a surface of the thermal member.

In various embodiments, the thermal change in the thermal member comprises heat input due to chemical binding of one or more atoms to the thermal member. In other or further embodiments, the thermal change in the thermal member comprises heat removal due to chemical binding of one or more atoms to the thermal member.

In various embodiments, the thermal change in the thermal member comprises heat input due to chemical binding of one or more molecules to the thermal member. In other or further embodiments, the thermal change in the thermal member comprises heat removal due to chemical binding of one or more molecules to the thermal member.

In some embodiments, a sensor includes a thermal member that comprises a reaction site. In some embodiments, the reaction site is configured for a chemical reaction and includes an atom configured to chemically interact with a target material. In some embodiments, the reaction site is configured for a chemical reaction and includes a molecule configured to chemically interact with a target material.

In some embodiments, the reaction site is configured for a biological reaction. In certain of such embodiments, the reaction site comprises a biological element configured to interact with an analyte. In various embodiments, the biological element comprises one or more of an enzyme, an antibody, an antigen, a nucleic acid, a protein, a cell receptor, an organelle, a microorganism, a tissue, a biologically derived material, or a biomimic component.

Certain embodiments of a sensor include one or more additional thermal members spaced from the substrate that are each in thermal contact with an additional nanotube, respectively. Each thermal member comprises a reaction site such that the sensor comprises a plurality of reaction sites. In some embodiments, the circuit comprises and/or is connected to a processor that can function in manners such as described above. In certain embodiments, the plurality of reaction sites are arranged in an array. In the illustrated embodiment, the plurality of reaction sites are oriented in a first direction to form a one-dimensional array. In other embodiments of a sensor, a plurality of reaction sites are oriented in both a first direction and a second direction to form a two-dimensional array. The sensors can be configured to determine whether one or more reactions occur at one or more of the reaction sites, respectively, to determine a proportion of the reaction sites at which a reaction occurs.

In some embodiments, a sensor is configured to determine a probability of reaction. In other or further embodiments, a sensor is configured to determine a rate of reaction.

Any suitable method for manufacturing any of the foregoing sensors is contemplated. Some methods include orienting a first nanotube between a substrate and a thermal member that are spaced from each other. The methods further include thermally contacting the first nanotube to the thermal member and coupling a circuit with the first nanotube. The circuit can be configured to detect a thermal change in the thermal member via a change relative to the nanotube. Certain methods include placing the first nanotube in thermal contact with the substrate.

Various methods can include arranging the various components of the sensors in any of the arrangements discussed above. Further, any suitable materials may be used in the processes, including those discussed above.

For example, some methods include placing a conducting lead in thermal contact with the thermal member and coupling the circuit with the conducting lead. In some instances, the conducting lead comprises a second nanotube that has different thermoelectric properties than those of the first nanotube. In some instances, the conducting lead comprises a silicon bridge. In some instances, the conducting lead comprises a metallic conductor.

Certain methods are now described for detecting a calorimetric or bolometric change. In some instances one or more of the sensors described herein may be used in the methods. Any process or function for which one or more components of the sensors are configured can be achieved during the course of the methods.

Some methods for detecting a calorimetric or bolometric change include subjecting a thermal member to a thermal change. The thermal member can be spaced from a substrate. The first nanotube can be oriented between the thermal member and the substrate, and the first nanotube can be in thermal contact with the thermal member. The methods can include detecting a thermal change in the thermal member via a change relative to the nanotube.

Some methods also include detecting a change in resistance of nanotube due to a heat-related change to the thermal member. The heat-related change can be a heat input to the thermal member or a heat removal from the thermal member.

Some methods include determining a magnitude of the change in the resistance of the nanotube based on a change in voltage. Some methods include determining whether or not any change in the thermal member occurs by determining whether or not a voltage across the nanotube changes. Some methods include determining a magnitude of the change in the resistance of the nanotube based on a change in current passing through the nanotube. Some methods include determining whether or not any change in the thermal member occurs by determining whether or not a current passing through the nanotube changes. Some methods include determining a magnitude of the change in resistance of the nanotube based on a change in power dissipated in the circuit. Some methods include determining whether or not any change in the thermal member occurs by determining whether or not a level of power dissipated in the circuit changes.

Some methods include counteracting a change in the resistance of the nanotube so as to maintain the nanotube at a constant resistance. In some instances, the sensor comprises a feedback circuit, the method further includes counteracting a change in the resistance of the nanotube by controlling a current within the feedback circuit. In some instances, a magnitude of the thermal change in the thermal member is detected via a magnitude of a change in the current used to maintain the nanotube at the constant resistance.

In some embodiments, the sensor comprises a circuit, and methods can include maintaining a constant voltage across the nanotube via the circuit. Some methods include using changes in the circuit that aid in maintaining the constant voltage to determine whether or not a thermal change in the thermal member occurs. Some methods include using changes in the circuit that aid in maintaining the constant voltage to determine a magnitude of the thermal change in the thermal member.

In some embodiments in which the sensor comprises a circuit, some methods can include passing a constant current through the nanotube via the circuit. Some methods include using changes in the circuit that aid in maintaining the constant current to determine whether or not a thermal change in the thermal member occurs. Some methods include using changes in the circuit that aid in maintaining the constant current to determine a magnitude of the thermal change in the thermal member.

In some embodiments in which the sensor comprises a circuit, some methods can include dissipating a constant power via the circuit. Some methods include using changes in the circuit that aid in maintaining the constant power to determine whether or not a thermal change in the thermal member occurs. Some methods include using changes in the circuit that aid in maintaining the constant power to determine a magnitude of the thermal change in the thermal member.

In some embodiments, the sensor includes a conducting lead in thermal contact with the thermal member and a circuit electrically coupled with the conducting lead. The conducting lead can comprise one or more of a second nanotube that has different thermoelectric properties than those of the first nanotube, a silicon bridge, or a metallic conductor in various embodiments. Some methods include detecting a change in thermoelectric voltage via the circuit. The circuit may be configured to detect a change in voltage between the first nanotube and the conducting lead. The change in thermoelectric voltage may be proportional to a temperature difference between the thermal member and the substrate.

In some methods, the thermal change in the thermal member comprises heat input due to an absorption of one or more photons by the thermal member and/or heat removal due to an emission of one or more photons by the thermal member. In some methods, the thermal change in the thermal member comprises heat input due to an adsorption of one or more atoms onto a surface of the thermal member. In some methods, the thermal change in the thermal member comprises heat removal due to an adsorption of one or more atoms onto a surface of the thermal member. In some methods, the thermal change in the thermal member comprises heat input due to an adsorption of one or more molecules onto a surface of the thermal member. In some methods, the thermal change in the thermal member comprises heat removal due to an adsorption of one or more molecules onto a surface of the thermal member. In some methods, the thermal change in the thermal member comprises heat input due to chemical binding of one or more atoms to the thermal member. In some methods, the thermal change in the thermal member comprises heat removal due to chemical binding of one or more atoms to the thermal member. In some methods, the thermal change in the thermal member comprises heat input due to chemical binding of one or more molecules to the thermal member. In some methods, the thermal change in the thermal member comprises heat removal due to chemical binding of one or more molecules to the thermal member.

In some embodiments, a plurality of thermal members include a plurality of reaction sites. The plurality of reaction sites can be arranged in an array (e.g., one-dimensional or two-dimensional). Some methods include determining whether one or more reactions occur at one or more of the reaction sites, respectively, to determine a proportion of the reaction sites at which a reaction occurs. Some methods include determining a probability of reaction via the sensor. Some methods include determining a rate of reaction via the sensor.

Figure 30:
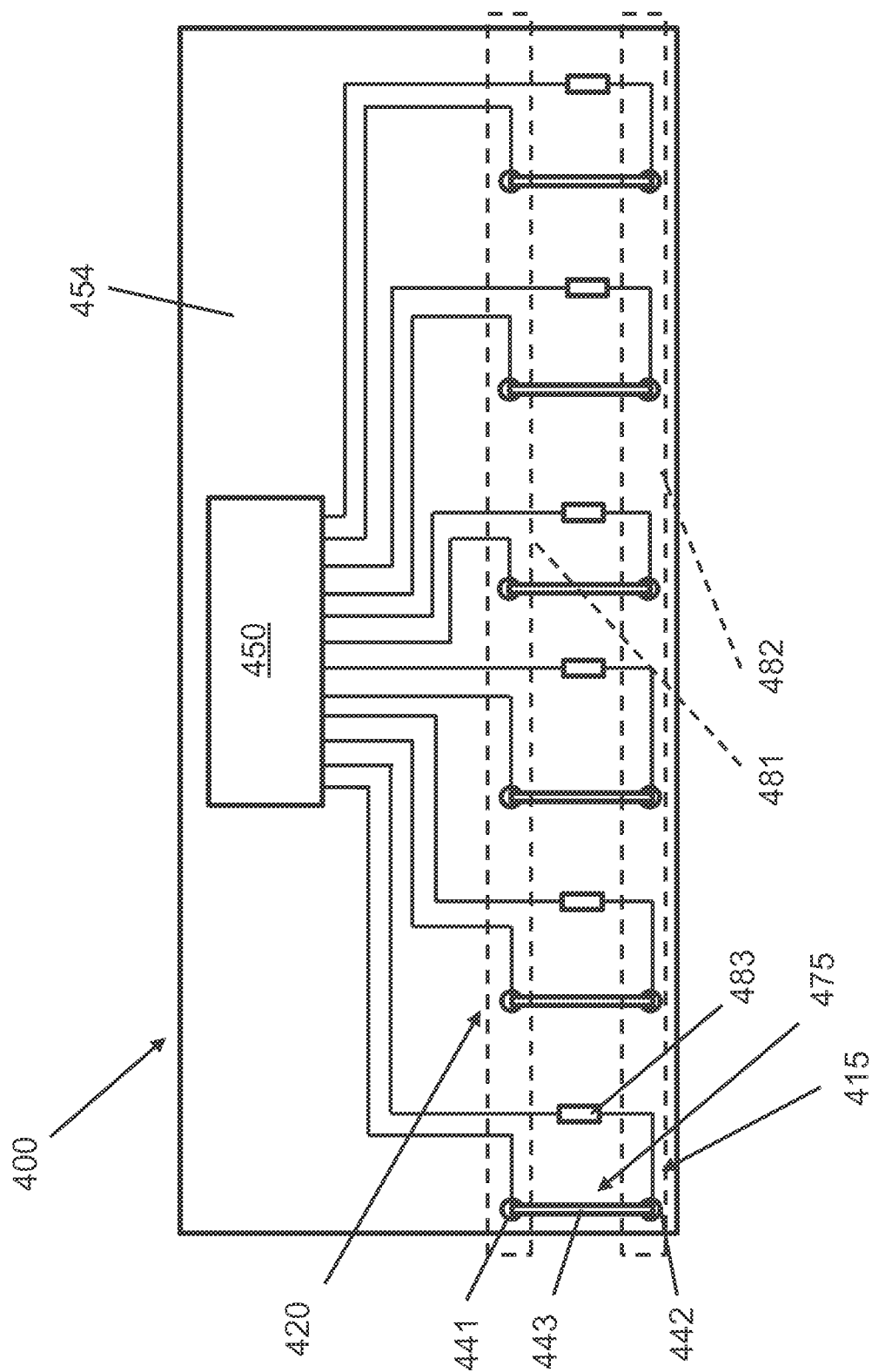
FIG. 30 is a plan view of an embodiment of a heater and/or sensor that includes an embodiment of a one-dimensional array of heating and/or sensing elements.

With reference to FIG. 30, in certain embodiments, a heater can include an array 420 of heating elements 415. In some embodiments, each heating element 415 can include a first electrical contact 441, a second electrical contact 442 spaced from the first electrical contact 441, and a nanostructure 475 electrically coupling the first electrical contact 441 to the second electrical contact 442. The nanostructure 475 can be of any suitable variety, such as, for example, a nanotube or a nanotube mesh. This is true of the nanostructure 475 described in any of the embodiments of heaters discussed herein. A circuit 450 can be coupled with the array 420 of heating elements 415 to selectively address one or more heating elements 415 within the array. In some embodiments, the heating elements 415 can be closely spaced. For example, the heating elements 415 can be much closer together than is illustrated in FIG. 30. In some embodiments, the heating elements 415 and the circuit 450 are formed on a substrate 454 of any suitable variety, such as those discussed above.

In the illustrated embodiment, the first and second electrical contacts 441, 442 of the array 420 of heating elements 415 are arranged in a first row 481 and a second row 482, respectively. In some embodiments, the first and second rows 481, 42 are parallel to each other. In some embodiments, the array 420 of heating elements 415 comprises a one-dimensional array.

A heater can include an array of heating elements that is arranged as a two-dimensional array. In some embodiments, a heater can include an isolating element to isolate at least one of the sensing elements from one or more of the remaining heating elements of the array. In various embodiments, the isolating element comprises one or more of a diode, a transistor, a resistor, a non-linear element, or a switch.

In some embodiments, a heater may include multiple arrays of heating elements. Each heating element can include a first electrical contact, a second electrical contact spaced from the first electrical contact, and a nanostructure electrically coupling the first electrical contact to the second electrical contact. A circuit can be coupled with both arrays of heating elements. Each array of heating elements may comprise a one-dimensional array and the arrays may be oriented in two dimensions. In some embodiments, each array is oriented in a different direction relative to the other array. Some embodiments may include a single row and a single column of heating elements. Other embodiments have multiple rows and/or columns of heating elements.

In certain embodiments of a heater, for at least one of the heating elements in an array, the nanostructure 475 that electrically couples the first electrical contact to the second electrical contact consists of a single nanotube that is oriented between the first and second electrical contact. For each heating element in the array, the nanostructure 475 may comprise a single nanotube that is oriented between the first and second electrical contacts.

Figure 31:
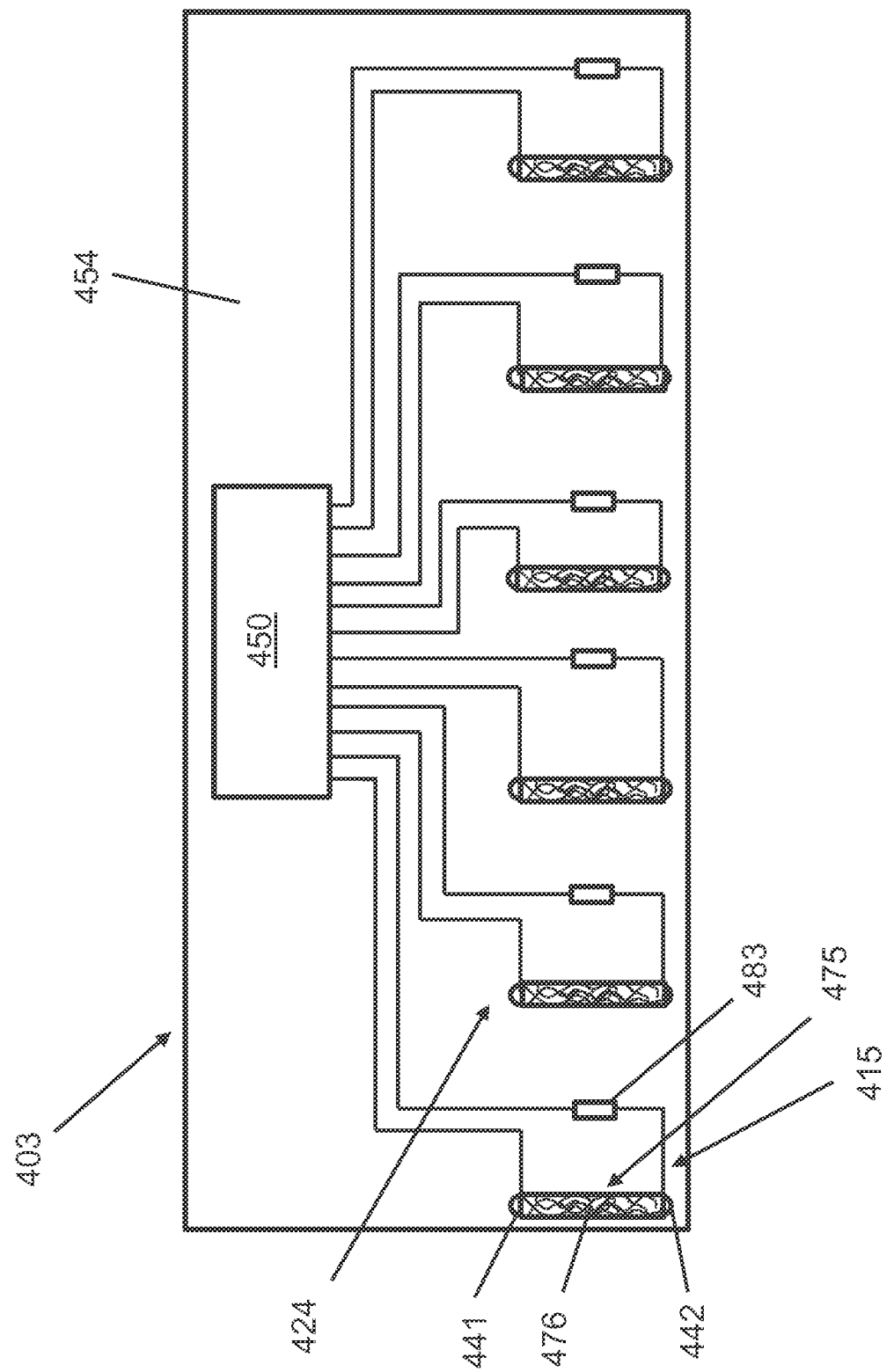
FIG. 31 is a plan view of another embodiment of a heater and/or sensor that includes an embodiment of a conducting lead.

With reference to FIG. 31, in some embodiments of a heater 403, for at least one of the heating elements (and/or sensor elements) 415 in an array 424, the nanostructure 475 comprises a nanotube mesh 476 that is oriented between the first and second electrical contacts 441, 442. In the illustrated embodiment, the nanostructure 475 of each heating element 415 comprises a separate nanotube mesh 476 that is oriented between the first and second electrical contacts.

Figure 32:
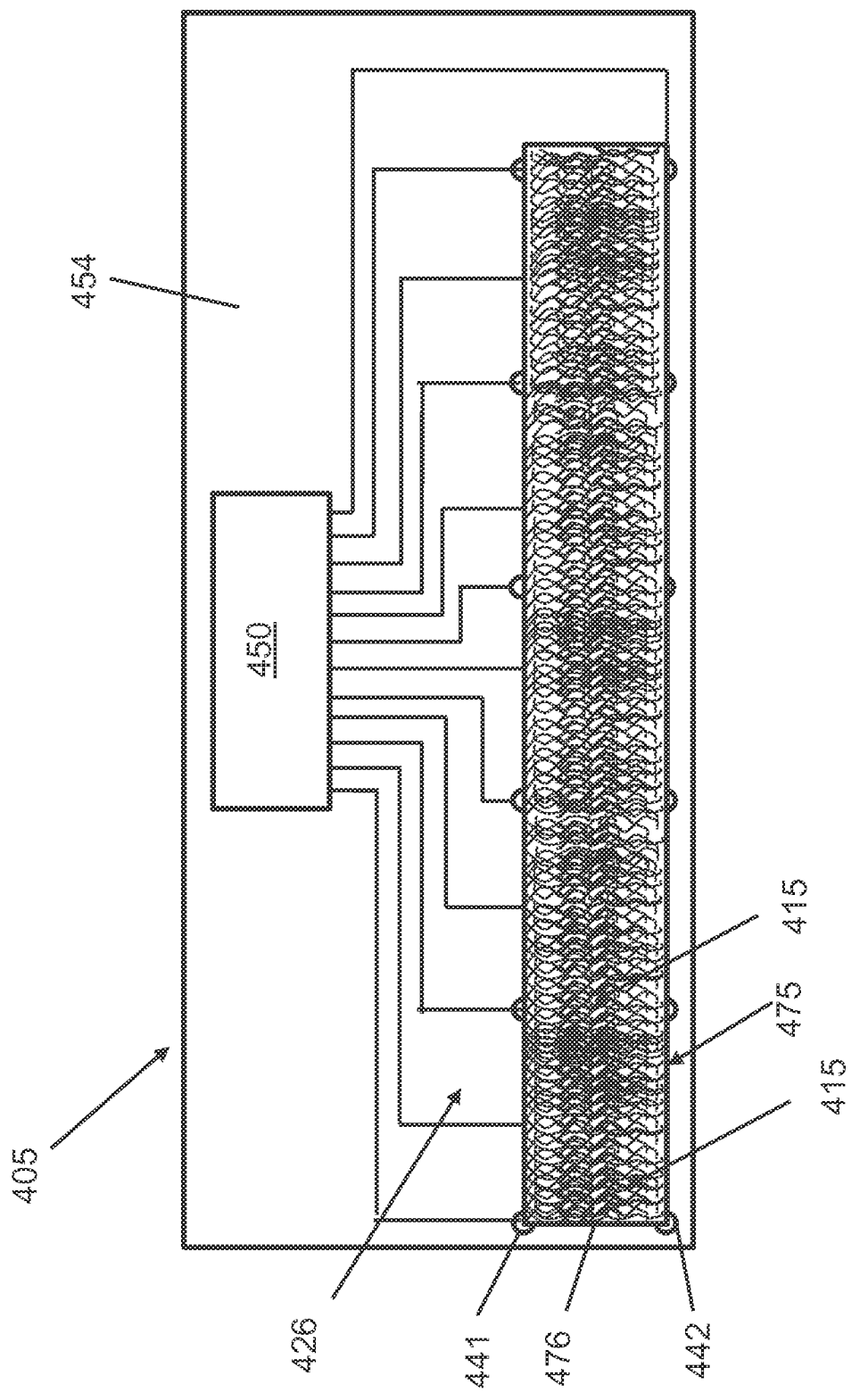
FIG. 32 is a plan view of another embodiment of a heater and/or sensor that includes another embodiment of a conducting lead.

With reference to FIG. 32, in some embodiments of a heater/sensor 405, a single nanotube mesh 476 is oriented between the first and second electrical contacts 441, 442 of a plurality of the heating elements 415 in an array 425 of heating elements 415. For example, the nanostructure of each of the plurality of heating elements can comprise the nanotube mesh. Other heating elements may have other nanostructures situated between the first and second electrical contacts thereof.

In some embodiments of a heater, a single nanotube mesh is oriented between the first and second electrical contacts of each of the heating elements in an array of heating elements.

In some embodiments, for at least one of the heating elements in the array, the nanostructure comprises multiple individual nanotubes that are oriented between the first and second electrical contacts. For example, an arrangement of a plurality of nanotubes can be oriented between the first and second electrical contacts in a manner such as that in which the nanotubes are oriented between the first and second electrical contacts.

In certain embodiments, for at least one of the heating elements, the nanostructure defines an arc between the first and second electrical contacts.

In some embodiments of a heater, for at least one of the heating elements, the nanostructure comprises an S-shape. Each nanostructure may define an S-shape over a full length thereof. In other embodiments, only some of the nanostructures and/or only a portion of each nanostructure defines an S-shape. The first and second electrical contacts may be on separate portions of a substrate that are moveable relative to one another. As discussed further below, in some instances, the S-shapes can be formed by situating the nanostructure between the electrical contacts, such as in a substantially linear orientation, and moving the substrate portions toward one another and transversely relative to one another. In the illustrated embodiment, the nanostructures can be electrically coupled with a circuit in any suitable manner. The electrical leads can resemble other electrical leads disclosed and discussed herein.

In some embodiments, for at least one of the heating elements, the nanostructure comprises a V-shape. In some instances, the V-shape is formed by buckling the nanostructure. For example, the buckling is achieved via a damage process, such as, for example, an ion beam process. In some embodiments, the buckling is achieved at a functionalized portion of the nanostructure.

In various embodiments, for at least one of the heating elements, the nanostructure comprises one or more nanotubes that are bent. In some embodiments, for at least one of the heating elements, the nanostructure comprises one or more nanotubes that are twisted. Such twisted nanotubes may be present in a nanotube mesh.

In some embodiments, the nanostructures for at least a plurality of the heating elements are coplanar. In some embodiments, the first and second electrical contacts of a heating element are spaced from each other by a separation distance SD. The nanostructure of the heating element can comprise one or more individual nanotubes, and an unsupported length of each nanotube that is oriented between the first and second electrical contacts is greater than the separation distance SD. In some embodiments, the length of each nanotube is no less than 1.5 times the separation distance SD.

In some embodiments, the nanostructures of adjacent heating elements are spaced from each other by a first amount D1 at a position at which the nanostructures are connected to the first electrical contacts of the adjacent heating elements. The nanostructures can be spaced from each other by a second amount D2 that is smaller than the first amount D1 at a position that is between the first and second electrical contacts of the adjacent heating elements. In some embodiments, the nanostructures are spaced from each other by the second amount D2 that is smaller than the first amount D1 at a position that is midway between the first and second electrical contacts of the adjacent heating elements 415.

In at least one embodiment, at least one of the heating elements has a longitudinal axis LA oriented between the first and second electrical contacts. The nanostructure can comprise one or more individual nanotubes of which at least a portion is oriented at an angle relative to the longitudinal axis LA.

Figure 34:
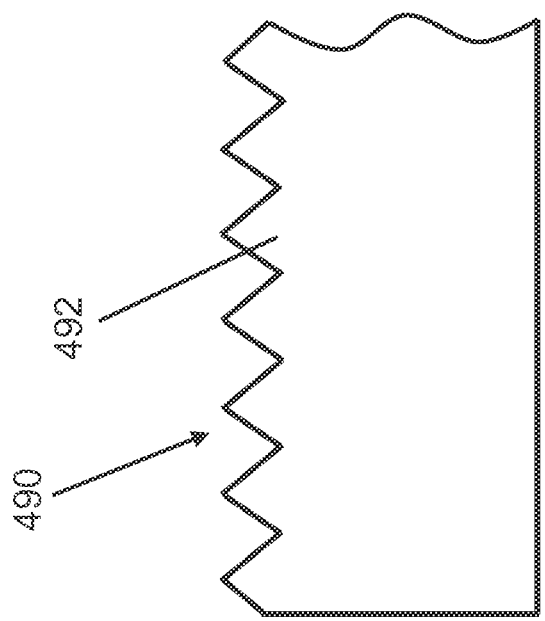
FIG. 34 is an elevation view of another embodiment of a structure over which a plurality of nanostructures can be oriented.

With reference to FIG. 33, in some embodiments, for at least one of the heating elements 415, the nanostructure 475 is oriented over or through a separate structure 490 to achieve a predetermined spacing and/or a predetermined configuration relative to one or more nanostructures 475 of one or more adjacent heating elements 415. In various embodiments, the separate structure 490 comprises a microfabricated or nanofabricated element. In some embodiments, such as that illustrated in FIG. 33, the separate structure 490 comprises a comb structure 491. With reference to FIG. 34, in some embodiments, the separate structure 490 comprises a sawtooth structure 492. In some embodiments, the separate structure 490 comprises a grooved structure, such as, for example, a structure that includes rectangular or triangular grooves such as those depicted in FIGS. 33 and 34.

Figure 35:
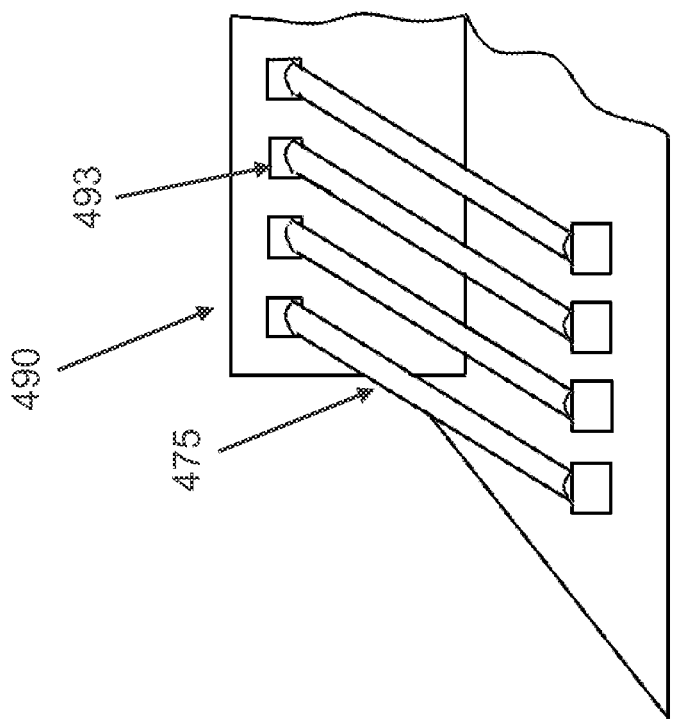
FIG. 35 is a perspective view of a portion of another embodiment of an array of nanotube sensors that includes another embodiment of a structure through which a plurality of nanostructures are oriented.

With reference to FIG. 35, in some embodiments, the separate structure 490 comprises one or more openings 493. The nanotructures 475 can be oriented through the openings 493.

Figure 36:
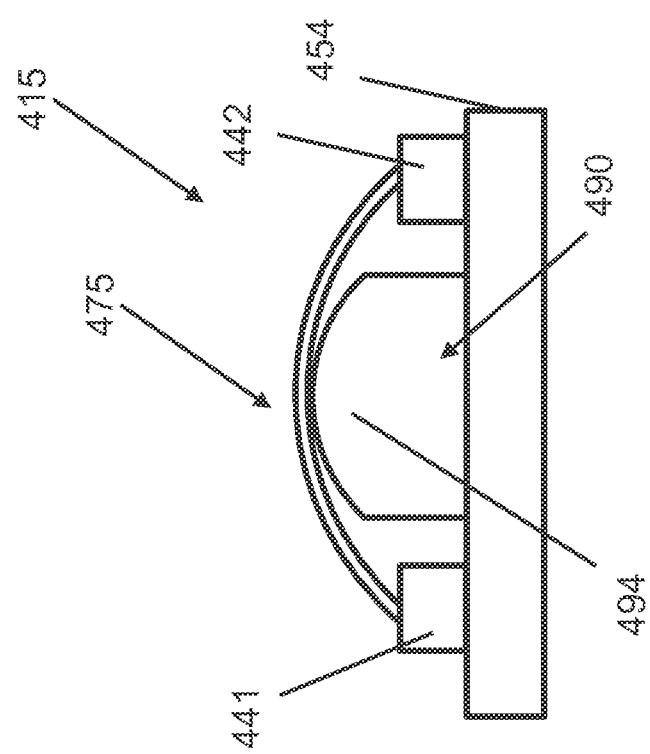
FIG. 36 is an elevation view of a portion of another embodiment of an array of nanotube heater and/or sensor that includes another embodiment of a structure over which one or more nanostructures can be oriented.

With reference to FIG. 36, in some embodiments, the separate structure 490 comprises a cylindrically surfaced structure 494. In certain of such embodiments, the structure 490 can be configured to support a bowed or arced nanostructure 475. The structures 490 may be formed of any suitable material, such as, for example, a material from which the substrate 454 is formed.

In some embodiments, the predetermined configuration achieved via assistance from the separate structure 490 comprises an S-shape or a V-shape. For example, one or more of the structures 490 depicted in FIGS. 33-35 can be used to achieve an arrangement of nanostructures 475 such as that depicted in FIG. 24.

In some embodiments, the predetermined configuration achieved via assistance from the separate structure 490 comprises an arc. For example, an arrangement such as that depicted in FIG. 36 may be achieved via the structure 494.

Certain of the arrangements described herein permit a portion of the nanostructures to project outwardly from the contacts and or the substrate. This may permit an active region of the heaters to come into closer proximity to a region that is being targeted for heating. In other or further embodiments, a higher concentration of heating portions of the nanostructures is achieved, such as when the distance D2 is less than the distance D1. Such an arrangement may provide for more efficient heating at a specific region of the nanostructure, or more generally, at a specific region of the heaters.

Figure 37:
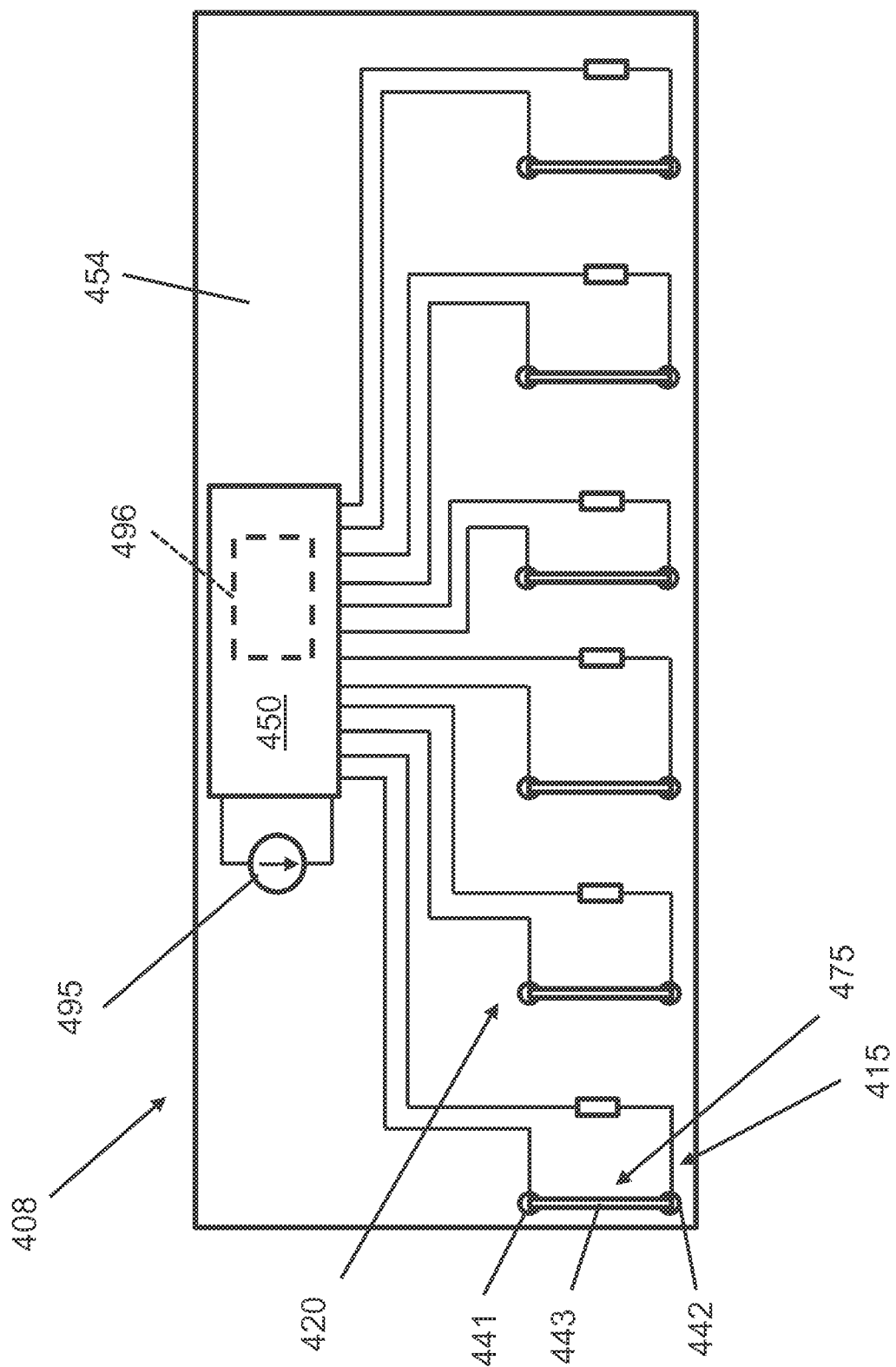
FIG. 37 is a plan view of another embodiment of a heater and/or sensor that includes one or more current sources.

In some embodiments of the heaters 400-407, each nanostructure 475 may be accessed individually. In certain embodiments, each nanostructure 475 is sufficiently isolated from the remaining nanostructures so as to be individually addressable and/or controllable via one or more of the first and second contacts 441, 442 to which it is electrically coupled. In some embodiments, each nanostructure 475 is configured to be individually addressable and/or controllable via one or more current sources of any suitable variety. For example, as depicted in FIG. 37, some embodiments of a heater 408 include one or more current sources 495 that can be used to individually address and/or control any of the nanostructures 475. In some instances, the circuit 450 may be used to control delivery of current from the current source 495. In some embodiments, each nanostructure 475 is configured to be individually addressed via one or more measurement circuits. For example, with continued reference to FIG. 37, in some embodiments, the circuit 450 can include one or more measurement circuits 496 that are configured to measure specific properties of the heating elements 415. In some embodiments, each nanostructure 475 is configured to be individually controlled to characterize one or more properties thereof. In some instances, the one or more properties comprise a resistance of a nanostructure 475.

Figure 38:
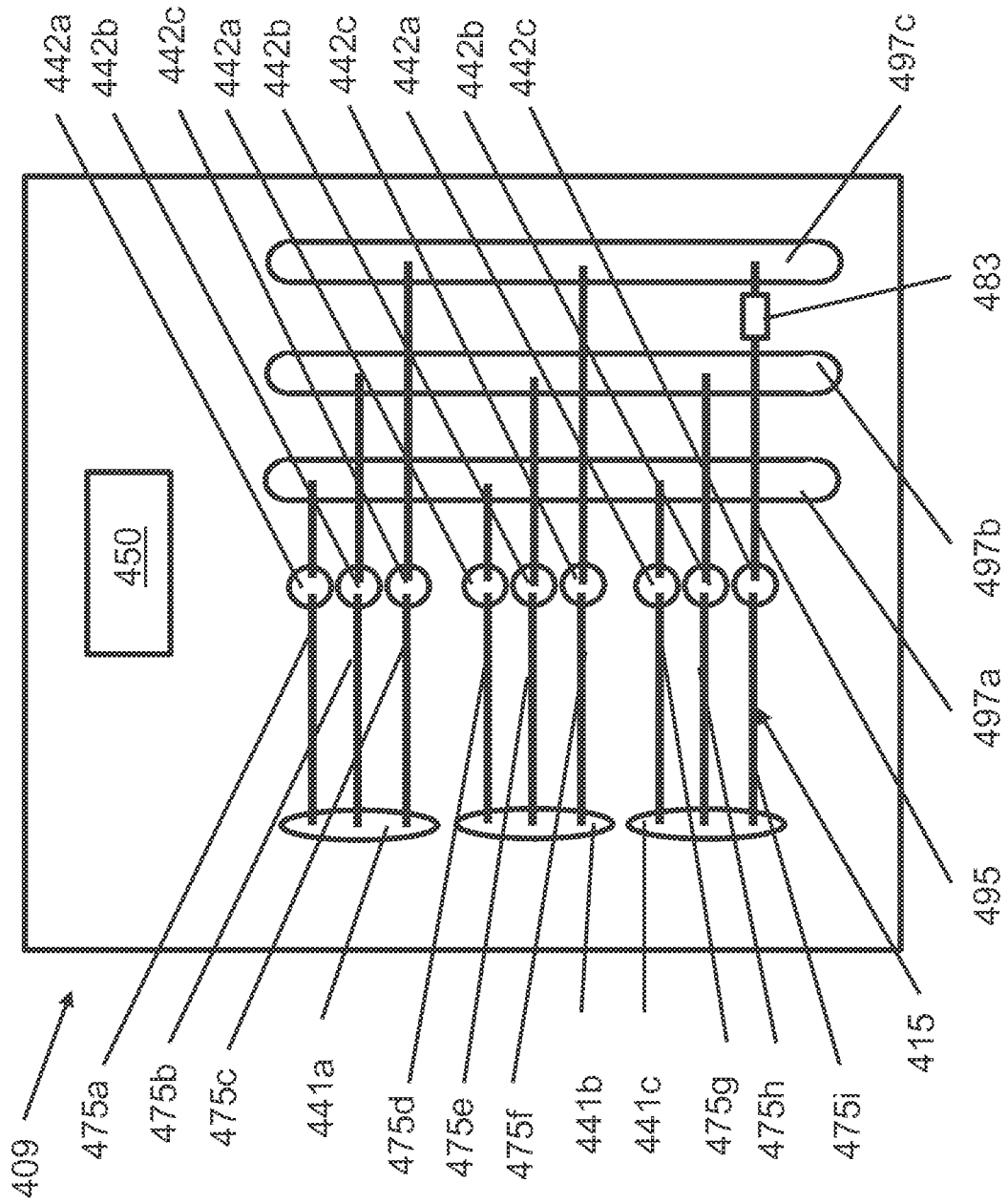
FIG. 38 is a plan view of another embodiment of an array of nanotube heater and/or sensor that includes an embodiment of a 2-dimensionally addressable matrix.
Figure 39:
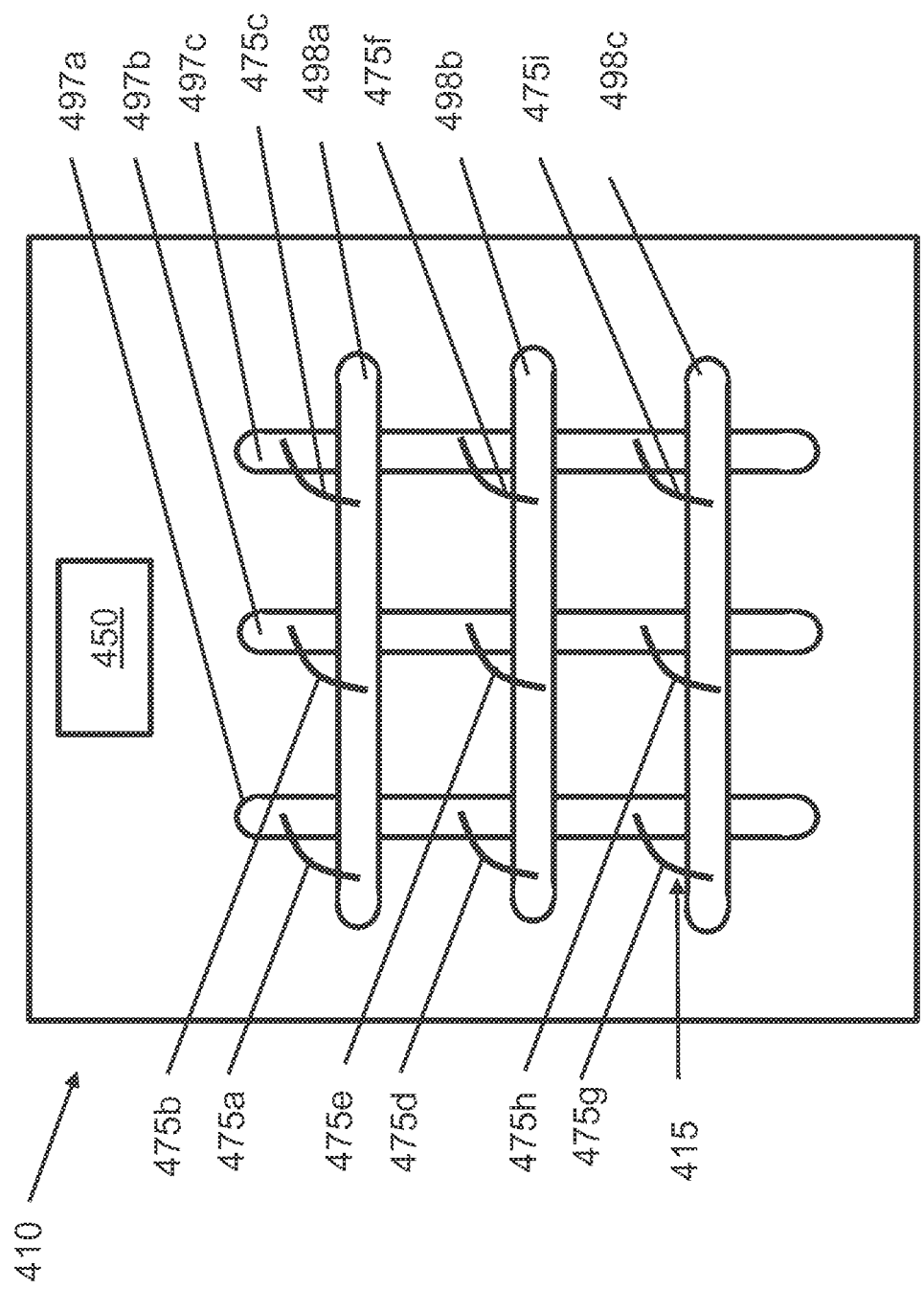
FIG. 39 is a plan view of another embodiment of an array of nanotube heater and/or sensor that includes another embodiment of a 2-dimensionally addressable matrix.

With reference to FIGS. 38-39, in various embodiments, a heater 409, 410, 411 comprises an array of heating elements 415 that comprises a matrix arrangement for facilitating the selective addressing of one or more heating elements 415 within the array. In some embodiments, for a first subset of the heating elements 415 of the array, the first electrical contact 441 of each heating element comprises a common electrical contact with which the nanostructure 475 of each heating element is electrically coupled. For example, in FIG. 52, a subset of heating elements 415 includes the nanostructures 475a, 475b, 475c, which are connected to a common electrical contact 441a. Similarly, in FIG. 53, a subset of heating elements 415 includes the nanostructures 475a, 475b, 475c, which are connected to a common electrical contact 498a. A subset of heating elements may include nanostructures connected to a common electrical contact.

With reference to FIG. 38, in some embodiments, for the first subset of the heating elements 415 of the array, the second electrical contact 442 of each heating element comprises a separate electrical contact that is electrically isolated from the second electrical contact of each remaining heating element of the first subset. For example, for the first subset of heating elements 415 that includes the nanostructures 475a, 475b, 475c, the second electrical contacts include the separate contacts 442a, 442b, 442c, respectively. Further, in the illustrated embodiment, each second electrical contact of the heating elements of the first subset is electrically coupled with an additional electrical contact 497a, 497b, 497c that is electrically coupled with one or more heating elements that are not within the first subset. For example, the electrical contacts 497a, 497b, 497c are electrically coupled with the nanostructures 475d, 475g; 475e, 475h; and 475f, 475i, respectively.

With continued reference to FIG. 38, each of the second electrical contacts of the heating elements of the first subset is electrically coupled with the corresponding additional electrical contact 497a, 497b, 497c via an electrical interconnector 498. In various embodiments, the electrical interconnector 498 for one or more of the heating elements 415 of the first subset comprises a nanotube.

In some embodiments, the electrical interconnector 498 for one or more of the heating elements 415 of the first subset comprises an isolating element 483 to prevent sneak paths for current flow. In some embodiments, the isolating element 483 comprises a diode.

With continued reference to FIG. 38, for a second subset of the array of heating elements that is different from the first subset, the second electrical contact of each heating element within the second subset comprises a second common electrical contact with which the nanostructure of each heating element within the second subset is electrically coupled. For example, a second subset of the heating elements 415 could include the nanostructures 475a, 475d, 475g. The second electrical contact for each of these nanostructures can comprise the electrical contact 497a, which is electrically coupled with the electrical contacts 442a.

In the illustrated embodiment, the first common electrical contact (e.g., the contact 441a) and the second common electrical contact (e.g., the electrical contact 497a) are oriented substantially parallel to each other.

In FIG. 39, the first common electrical contact (e.g., 498a) and a second common electrical contact (e.g., 497a) are oriented substantially perpendicular to each other. In various embodiments, the first common electrical contact (e.g., 498a) and the second common electrical contact (e.g., 497a) are oriented at a nonparallel, non-perpendicular angle relative to each other.

As shown in each of FIGS. 38-39, various matrix arrangements each comprise a plurality of electrical contacts that are each coupled with a plurality of the nanostructures of the heating elements 415 of the array. At least a portion of the plurality of electrical contacts can be oriented in one or more columns or in one or more rows.

As shown in FIG. 39, in some embodiments, the plurality of electrical contacts 497a, 497b, 497c and 498a, 498b, 498c are oriented in a plurality of columns and rows, respectively. In some embodiments, the plurality columns and rows are overlapping.

As shown in FIG. 39, in some embodiments, the plurality of electrical contacts 497, 498 comprise subsets that overlap each other. The overlapping subsets can be electrically isolated from each other in any suitable manner.

With reference generally to the heaters 400-411, in some embodiments, the circuit 450 comprises one or more current sources 495 that are coupled with the first and second contacts 441, 442 (and 498, 497) of the heating elements 415 to selectively pass current from the first electrical contacts 441 (and 498) to the second electrical contacts 442 (and 497), or vice versa.

In some embodiments, the circuit 450 is configured to measure one or more electrical properties of each nanostructure 475. In various embodiments, the electrical property comprises one or more of a voltage across the nanostructure 475 and a resistance of the nanostructure 475.

In some embodiments, the circuit 450 is configured to measure one or more electrical properties of each pair of first and second electrical contacts 441, 442. In various embodiments, the electrical property comprises one or more of a voltage between the electrical contacts and a resistance between the electrical contacts 441, 442. In some of the drawings discussed above, electrical leads that couple the circuit 450 with other components of the heaters are not shown, but such lead arrangements can be understood from those drawings in which the electrical leads are shown.

Any suitable method for manufacturing any of the foregoing heaters is contemplated. Some methods include forming an array of heating elements 415 such that each heating element 415 comprises a first electrical contact 441 (or 498), a second electrical contact 442 (or 497), and a nanostructure 475 electrically coupling the first electrical contact to the second electrical contact. The methods include coupling a circuit 450 with the array of heating elements 415 such that the circuit 450 is configured to selectively address one or more heating elements 415 within the array.

Various methods can include arranging the various components of the heaters in any of the arrangements discussed above. Further, any suitable materials may be used in the processes, including those discussed above.

In some methods, forming an array of heating elements 415 comprises manipulating one or more nanotubes 443 to be oriented between a first and a second electrical contact 441, 442. In some methods, the manipulating comprises direct manipulation via one or more nanoprobes. For example, in some instances, the one or more nanoprobes comprise a nanotube having a movable tip. In some instances, the one or more nanoprobes comprise nanotweezers.

In some methods, manipulating the one or more nanotubes 443 comprises orienting a plurality of nanotubes between the first and a second electrical contact via dielectrophoretic assembly. In certain of such methods, forming the array comprises isolating an individual nanotube that is oriented between the first and second electrical contacts. Said isolating can comprise isolating an individual nanotube from at least one adjacent nanotube. In some instances, isolating an individual nanotube comprises selective removal of nanotubes via an etching process. For example, the etching process can comprise one or more of electron beam etching and ion beam etching.

Some methods include reshaping one or more nanostructures after they have been coupled to the first and second electrical contacts 441, 442. For example, the reshaping can comprise changing a relative position of a set of the first contacts 441 relative to a set of second contacts 442. In some instances, changing a relative position of the first and second contacts 441, 442 comprises moving the contacts closer together. For example, the bent shapes in FIGS. 23 and 24 may be achieved by approximating the substrate portions 454 to which the contacts 441, 442 are attached toward one another at a time after the nanostructures 475 have been attached to the contacts 441, 442.

In some instances, changing a relative position of the first and second contacts 441, 442 comprises rotating the contacts and moving the contacts closer to each other. In some instances, the first and second contacts are spaced from each other along a longitudinal axis, and changing a relative position of the first and second contacts comprises displacing the first and second contacts relative to each other along the longitudinal axis.

In some methods, the first and second contacts 441, 442 are spaced from each other in a longitudinal direction. Changing a relative position of the first and second contacts 441, 442, can include displacing the first and second contacts 441, 442 relative to each other along a direction that is transverse to the longitudinal direction. In some instances, displacing the first and second contacts 441, 442 in this manner moves the first and second contacts 441, 442 closer together.

In some methods, displacement of the first and second contacts 441, 442 reshapes the nanostructures into arc shapes, such as depicted in FIGS. 23A and 23B. In some embodiments, the nanostructures are reshaped into "V" shapes, as depicted, for example, in FIG. 24.

Certain methods for heating are now described. In some instances, one or more of any suitable heaters described herein may be used in these methods. Any process or function for which one or more components of the heaters are configured can be achieved during the course of the methods.

In some methods, a heater comprises an array of heating elements 415, and each heating element comprises a first electrical contact 441, a second electrical contact 442, and a nanostructure 475 electrically coupling the first electrical contact 441 to the second electrical contact 442. The methods include selectively addressing one or more individual heating elements 415 within the array by driving an electrical current from one electrical contact 441 to another contact 442 for each heating element 415 thus addressed.

In further embodiments, each nanostructure 475 is sufficiently isolated from the remaining nanostructures 475 so as to be individually addressable and/or controllable via one or more of the first and second contacts 441, 442 to which it is electrically coupled. In some embodiments, the heater further comprises one or more current sources 495, and certain methods can further comprise individually accessing and/or controlling one or more of the nanostructures 475 via the one or more current sources 495. In other or further embodiments, the heater further comprises one or more measurement circuits 496, and some methods include individually accessing and/or controlling one or more of the nanostructures 475 via the measurement circuits 496.

Some methods include individually controlling one or more of the nanostructures 475 to characterize one or more properties thereof. In some instances, the one or more properties comprise a resistance of a nanostructure.

In some embodiments, the circuit 450 comprises one or more current sources 495 that are coupled with the first and second contacts 441, 442 of the heating elements 415. Certain methods include selectively driving current from the first electrical contacts 441 to the second electrical contacts 442 via the one or more current sources.

Some methods include measuring one or more electrical properties of one or more nanostructures 415 of the array via the circuit 450. In some instances, the electrical property comprises a voltage across the nanostructure. In other or further instances, the electrical property comprises a resistance of the nanostructure.

Some methods include measuring one or more electrical properties of each pair of first and second electrical contacts 441, 442 via the circuit 450. In some instances, the electrical property comprises a voltage between the electrical contacts. In other or further instances, the electrical property comprises a resistance between the electrical contacts.

In some methods, selectively addressing one or more individual heating elements 415 within the array comprises addressing a plurality of the heating elements as a set. In some instances, each of the heating elements within the set is addressed simultaneously. In other or further instances, the set comprises three or more heating elements 415. Other suitable methods of heating, such as by using any of the heaters disclosed herein, are contemplated.

In many instances, the heaters and the methods for manufacturing the same, can also describe sensors and methods for manufacturing the same. For example, in some instances the heaters may be configured to operate in a sensing mode. In other instances, the circuits 450 may be configured for dedicated operation only as a heater or for dedicated operation only as a sensor.

For example, the structures of the heaters 400-411 may be used either in addition or instead as sensors 400-411. In some instances, the circuits 450 may merely be reconfigured for sensing operations. For the sensors 400-411, the heating elements 415 may instead be referred to as sensing elements 415. The sensors may selectively monitor one or more of the sensing elements 415.

Any suitable uses of the heaters and/or sensors 400-411 are contemplated. For example, uses of heaters and sensors discussed below with respect to configurations other than those disclosed with respect to the heaters/sensors 400-411 may be utilized with the heaters/sensors, as appropriate.

In view of the foregoing, an example of a sensor 400 is provided by way of illustration. With reference again to FIG. 30, the sensor 400 can include an array 420 of sensing elements 415, wherein each sensing element comprises a first electrical contact 441, a second electrical contact 442 spaced from the first electrical contact, and a nanostructure 475 electrically coupling the first electrical contact to the second electrical contact. The sensor 400 can include a circuit 450 coupled with the array of sensing elements to selectively monitor one or more sensing elements 415 within the array.

Other arrangements of sensors 400-411 can be obtained by replacing the terms "heater" with "sensor," "heating" with "sensing," "heating element" with "sensing element," and "address" with "monitor" in the prior discussion of the heaters 400-411 and/or other heaters or sensors referred to herein.

In certain embodiments, the sensors 400-411 are configured to monitor one or more of the sensing elements 415 in any suitable manner. For example, the circuit 450 can be configured to determine a resistance of individual nanostructures and/or a voltage across the first and second electrical contacts 441, 442 to determine whether heating or cooling has occurred with respect to the nanostructure and/or the magnitude of such heating or cooling. Having an array of sensing elements 415 can allow for methods in which gradients or other useful information, such as discussed elsewhere herein, is determined.

Certain methods for sensing are now described. In some instances, one or more of any suitable sensor described herein may be used in these methods. Any process or function for which one or more components of the sensors are configured can be achieved during the course of the methods.

Some methods utilize a sensor that comprises an array of sensing elements 415, wherein each sensing element 415 comprises a first electrical contact 441, a second electrical contact 442, and a nanostructure 475 electrically coupling the first electrical contact to the second electrical contact. The methods can include selectively monitoring one or more individual sensing elements within the array.

Each nanostructure 475 within the array can be sufficiently isolated from the remaining nanostructures so as to be individually addressable via one or more of the first and second contacts 441, 442 to which it is electrically coupled. In some embodiments, the sensor comprises one or more current sources 495, and certain methods can include individually monitoring one or more of the nanostructures via the one or more current sources. In some embodiments, the sensor comprises measurement circuits 496, and certain methods can include individually monitoring one or more of the nanostructures via the measurement circuits.

In some embodiments, each nanostructure 475 is sufficiently isolated from the remaining nanostructures so as to be individually controllable via one or more of the first and second contacts to which it is electrically coupled. In some embodiments, the sensor comprises one or more current sources, and certain methods include individually controlling one or more of the nanostructures via the one or more current sources. In some embodiments, the sensor comprises measurement circuits 476, and certain methods include individually controlling one or more of the nanostructures via the measurement circuits.

Some methods include individually controlling one or more of the nanostructures to characterize one or more properties thereof. The one or more properties can comprise a resistance of a nanostructure.

In some embodiments, the circuit 450 comprises one or more current sources 495 that are coupled with the first and second contacts of the sensing elements, and certain methods include selectively driving current from the first electrical contacts to the second electrical contacts via the one or more current sources.

Certain methods include measuring one or more electrical properties of one or more nanostructures of the array via the circuit. In some instances, the electrical property comprises a voltage across the nanostructure. In other or further instances, the electrical property comprises a resistance of the nanostructure.

Certain methods include measuring one or more electrical properties of each pair of first and second electrical contacts via the circuit. In some instances, the electrical property comprises a voltage between the electrical contacts. In other or further instances, the electrical property comprises a resistance between the electrical contacts.

In certain embodiments, a heater includes a first electrical contact, a second electrical contact spaced from the first electrical contact, and a first graphene sheet electrically coupling the first electrical contact to the second electrical contact. The heater 500 may further include a circuit coupled with each of the first and second electrical contacts, that is configured to selectively drive an electrical current from the first electrical contact to the second electrical contact, or vice versa, via the graphene sheet. In some embodiments, one or more of the components of the heater can be positioned on a substrate, such as any suitable substrate described above.

The heater can include a plurality of heating elements. Each heating element can include a pair of electrical contacts and the portion of the graphene sheet that is oriented between the electrical contacts and/or through which current can flow from one electrical contact to the other. Other heaters discussed below can similarly include heating elements. In some instances the heating elements are dynamically assignable or changeable, as the polarity of a given electrical contact and/or as pairings among various contacts can be selectively altered.

The heater may include a first set of electrical contacts and a second set of electrical contacts spaced from the first set of electrical contacts. Each of the first and second sets of electrical contacts are electrically coupled with each other via the first graphene sheet. The first set of electrical contacts comprises the first electrical contact and the second set of electrical contacts comprises the second electrical contact. In certain embodiments, the first set of electrical contacts is arranged in a first row and the second set of electrical contacts is arranged in a second row. In some embodiments, the first and second rows are parallel to each other. In some embodiments, one or more of the first and second rows comprise a straight line of electrical contacts.

In certain embodiments, a heater includes a first set of electrical contacts that comprises a first row of electrical contacts and includes a second set of electrical contacts that comprises a first column of electrical contacts. The first row and the first column of electrical contacts are oriented in different directions. In some embodiments, the first set of electrical contacts comprises a second row of electrical contacts and the second set of electrical contacts comprises a second column of electrical contacts. The second row and the second column of electrical contacts can be oriented in different directions.

In some embodiments, the first and second rows of electrical contacts are parallel to each other. In other or further embodiments, the first and second columns of electrical contacts are parallel to each other. In some embodiments, the first row of electrical contacts is perpendicular to the first column of electrical contacts. In other or further embodiments, the second row of electrical contacts is perpendicular to the second column of electrical contacts.

The electrical contacts may be positioned solely at the edges of the graphene sheet, although other arrangements are possible. Additionally, although each electrical contact may be electrically coupled with the circuit.

In some embodiments, each electrical contact of the first set may be paired with a single electrical contact of the second set. Each such pairing can correspond with a separate heating element. In some embodiments, each of the electrical contacts may be assigned a first polarity (positive or negative) and each of the electrical contacts is a assigned a second, opposite polarity (negative or positive). Each heating element may be selectively addressed via the circuit to pass current through an associated portion of the graphene sheet.

In some embodiments, each electrical contact can be selectively coupled or paired with every electrical contact. In this manner, a much greater portion of the graphene sheet may be selectively addressed, or selectively heated, by passing current from one electrical contact to another, or vice versa. Again, each pair of electrical contacts and the associated portion of the graphene sheet that is between them and/or through which current passes from one contact to the other represents a separate heating element. Any other desired pattern for the heating elements is contemplated. Moreover, any suitable pattern for pairing various electrical contacts is also contemplated. By selectively addressing a desired pair of contacts, a desired heating pattern or arrangement via the graphene sheet may be achieved.

Some embodiments of a heater include a plurality of electrical contacts that are arranged in a repeating arrangement or pattern. The electrical contacts are electrically coupled with a circuit, although electrical leads via which the coupling may be achieved are not shown. A graphene sheet is physically supported by and is electrically coupled with the electrical contacts. With respect to the repeating pattern of the electrical contacts, it may be said that two sets of contacts are present. The contacts are arranged in alternating rows and columns. Any suitable pairing of the electrical contacts and any suitable manners for selectively addressing the various pairings is contemplated. In various embodiments of the heaters, the circuit 550 is coupled with each of the electrical contacts 541, 542 in each of the first and second sets 581, 582 of electrical contacts.

Some embodiments of a heater include a plurality of electrical contacts that are arranged in a non-repeating pattern. The electrical contacts are electrically coupled with a circuit, although electrical leads via which the coupling may be achieved are not shown. A graphene sheet is physically supported by and is electrically coupled with the electrical contacts. Other arrangements of the heaters and of the components thereof are contemplated.

In the illustrated embodiment, each electrical contact may be substantially the same. In some embodiments, each electrical contact may be dynamically selected to act as a positive or negative electrical contact. The polarity of the electrical contact may be assigned dynamically via the circuit. For example, in some embodiments, one or more transistors or other electronic components may be used to achieve the dynamic selection of the polarity of the electrical contacts. Such dynamic assignment of the polarity of an electrical contact can also be achieved with embodiments of the heaters discussed above. Stated otherwise, in various embodiments of the heaters, a polarity of each of the first and second electrical contacts, or sets of electrical contacts, is configured to be dynamically determined via the circuit.

In certain embodiments of the heaters, the circuit is configured to selectively address any combination of the electrical contacts. In some embodiments, the circuit is configured to selectively drive an electrical current from any electrical contact to any other electrical contact via the graphene sheet. A paired set of electrical contacts, together with an associated portion of the graphene sheet, may be referred to as a heating element.

With respect to the heaters, in certain embodiments, any electrical contact within the first set of electrical contacts is individually addressable via the circuit. In further embodiments, any electrical contact within the second set of electrical contacts is individually addressable via the circuit. As previously mentioned, in some embodiments, a polarity of each electrical contact that is individually addressed is configured to be dynamically determined via the circuit. The circuit can be configured to drive current from the electrical contact that is selected from the first set to the electrical contact that is selected from the second set via the graphene sheet.

In some embodiments, a heater includes a third set of electrical contacts and a fourth set of electrical contacts that is spaced from the third set of electrical contacts. The heater can include a second graphene sheet electrically coupling the third set of electrical contacts to the fourth set of electrical contacts. In some embodiments, the circuit is coupled with the third and fourth sets of electrical contacts and is configured to selectively pass a current from one or more electrical contacts in the third set to one or more of the electrical contacts in the fourth set via the second graphene sheet. In some embodiments, the first, second, third, and fourth sets of electrical contacts are arranged in a two-dimensional array. Other array configurations are contemplated. The graphene sheets may be oriented over the circuit, or in other embodiments, the circuit may be external to the array of electrical contacts. In further embodiments, many graphene sheets may be used. For example, three or more, five or more, ten or more, one hundred or more, or one thousand or more graphene sheets may be coupled to a single circuit and/or processor.

In some embodiments of the heaters, a graphene sheet can comprise an arc shape. The arc may be formed in any suitable manner. For example, in some embodiments, the graphene sheet is coupled to the electrical contacts, and then the contacts are brought into closer proximity to each other, such as in the manners discussed above. The arc shape is at a position between the first and second sets of electrical contacts. In some embodiments, the first and second sets of electrical contacts are spaced from each other by a separation distance SD and a length of the graphene sheet that is positioned between the first and second sets of electrical contacts is greater than the separation distance SD. In some embodiments, the length of the graphene sheet is no less than 1.5 times the separation distance SD. In some embodiments, a maximum diameter of the arc shape is greater than the separation distance SD.

In certain embodiments, each electrical contact in the first set is paired with one electrical contact in the second set. In certain of such embodiments, each resulting pair of electrical contacts is individually addressable via the circuit. In some embodiments, the circuit is coupled with each pair of electrical contacts and is configured to time multiplex different pairs of electrical contacts. For example, in some embodiments, the circuit is configured to time multiplex adjacent pairs of electrical contacts.

In some embodiments, a heater comprises multiple circuits. For example, in some embodiments, each pair of electrical contacts can be controlled by a separate circuit. The circuits can be configured to time multiplex signals delivered to the pairs of electrical contacts.

In some embodiments, different pairs of electrical contacts are powered by different power supplies. For example, each circuit may have a separate power supply. One or more of the power supplies can comprise one or more transformers and/or capacitors. In some embodiments, use of different power supplies with different pairs of electrical contacts is configured to reduce cross-talk between the pairs of electrical contacts, as compared with cross-talk between the pairs of electrical contacts if a common power supply is used with multiple pairs of electrical contacts.

In certain embodiments, any of the circuits discussed above can comprise one or more current sources that are coupled with the first and second sets of electrical contacts to selectively pass current from the first set of electrical contacts to the second set of electrical contacts. For example, each circuit may include a separate current source for a separate pair of electrical contacts.

In certain embodiments, a system can include an array of heaters. It is understood that any of the other heaters discussed herein may be used in conjunction with any of the other embodiments described herein. In some embodiments, different types of heaters may be used within the same system. Although the heaters are shown spaced from one another, in other embodiments, they may be in closer proximity, and may be in contact with each other. The heaters may be arranged in a one-dimensional array.

Each heater may be coupled with a processor. Additionally, at least some of the methods for selective heating discussed hereafter may employ a processor for implementing one or more of the stages of the methods.

Any suitable method for manufacturing any of the foregoing heaters is contemplated. Some methods include electrically coupling a first electrical contact with a second electrical contact via a first graphene sheet. The methods can further include coupling a circuit with each of the first and second electrical contacts. The circuit can be configured to selectively drive an electrical current from the first electrical contact to the second electrical contact via the graphene sheet.

Various methods can include arranging the various components of the heaters in any of the arrangements discussed above. Further, any suitable materials may be used in the processes, including those discussed above.

For example, some methods include electrically coupling, via the first graphene sheet, a first set of electrical contacts with a second set of electrical contacts that is spaced from the first set of electrical contacts, wherein the first set of electrical contacts comprises the first electrical contact and the second set of electrical contacts comprises the second electrical contact. The first set of electrical contacts can be arranged in a first row and the second set of electrical contacts can be arranged in a second row. In some instances, the first and second rows are parallel to each other. Methods for manufacturing further arrangements such as those discussed above also follow directly from the disclosure.

Certain methods for heating are now described. In some instances, one or more of any suitable heaters described herein may be used in these methods. Any process or function for which one or more components of the heaters are configured can be achieved during the course of the methods.

Some methods of selective heating include, in a heater that comprises a set of electrical contacts and a sheet of graphene that electrically couples the set of electrical contacts, selectively addressing one or more pairs of electrical contacts within the set of electrical contacts to drive, for each pair of electrical contacts thus addressed, an electrical current from one of the electrical contacts of the pair to the other of the electrical contacts of the pair via the graphene sheet. Some methods further include, for each pair of electrical contacts thus addressed, dynamically determining a polarity of each electrical contact.

Some methods include time multiplexing electrical signals provided to different pairs of the electrical contacts. Some methods comprise powering different pairs of electrical contacts via different power supplies. In some embodiments, one or more of the power supplies comprise one or more transformers and/or one or more flying capacitors.

In many instances, the heaters and the methods for manufacturing the same can also describe sensors and methods for manufacturing the same. For example, in some instances the heaters may be configured to operate in a sensing mode. In other instances, the circuits may be configured for dedicated operation only as a heater or for dedicated operation only as a sensor.

For example, the structures of the heaters described herein be used either in addition or instead as sensors. In some instances, the circuits may merely be reconfigured for sensing operations. Any suitable uses of the heaters and/or sensors are contemplated, including those discussed hereafter as well as those discussed previously.

In view of the foregoing, an example of a sensor is provided by way of illustration. The sensor can include a first electrical contact, a second electrical contact spaced from the first electrical contact, and a first graphene sheet electrically coupling the first electrical contact to the second electrical contact. The sensor can further include a circuit coupled with each of the first and second electrical contacts.

Figure 40:
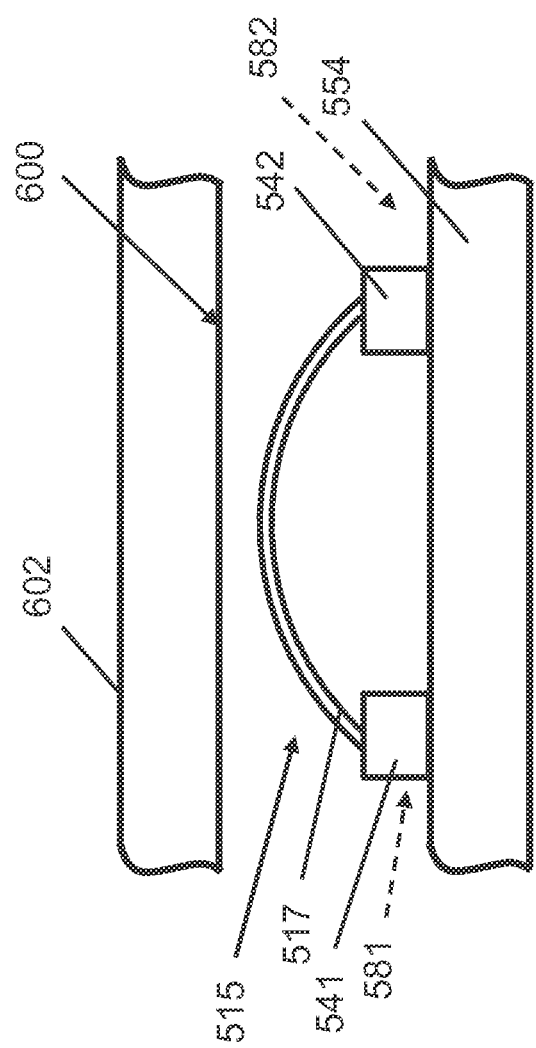
FIG. 40 is an elevation view of a portion of an embodiment of a heater and/or sensor that is approximated to a surface for heating and/or sensing the surface.

With reference to FIG. 40, in some embodiments, the circuit 550 is configured to determine a thermal property of a surface 600 that is in contact with or in proximity to the first graphene sheet 517 based on an effect of the thermal property on the graphene sheet 517. The surface 600 can be the surface of any suitable item 602 or material that it may be desirable to observe, monitor, or otherwise sense via the sensor 500.

As with the heater 500 discussed above, the sensor can include the first set of electrical contacts and a second set of electrical contacts spaced from the first set of electrical contacts. Each of the first and second sets of electrical contacts can be electrically coupled with each other via the first graphene sheet. Other arrangements of heaters discussed above are likewise possible for various embodiments of sensors.

In some embodiments, a sensor includes a third set of electrical contacts and a fourth set of electrical contacts spaced from the third set of electrical contacts. The sensor can include a second graphene sheet electrically coupling the third set of electrical contacts to the fourth set of electrical contacts. The circuit can be coupled with the third and fourth sets of electrical contacts and can be configured to determine a thermal property of a surface that is in contact with or in proximity to the second graphene sheet based on an effect of the thermal property on the second graphene sheet. In some embodiments, a plurality of sensors are arranged in arrays and/or systems.

Certain methods for sensing are now described. In some instances, one or more of any suitable sensor described herein may be used in these methods. Any process or function for which one or more components of the sensors are configured can be achieved during the course of the methods.

Some methods of selective sensing include, in a sensor 500, 501, 502, 503, 504, 505 that comprises a plurality of electrical contacts 541 (and/or 542) and a graphene sheet 517 that electrically couples the plurality of electrical contacts, using one or more pairs of electrical contacts from the plurality of electrical contacts to monitor, for each of the one or more pairs of electrical contacts, a portion of the graphene sheet positioned between the electrical contacts to determine a thermal property of a surface 600 that is in contact with or in proximity to the portion of the first graphene sheet based on an effect of the thermal property on the portion of the first graphene sheet. For example, with reference to FIG. 40, the portion of the graphene sheet 517 may be the illustrated portion that is oriented between the electrical contacts 541, 542. Some methods further include selecting the one or more pairs of electrical contacts used for monitoring one or more portions of the first graphene sheet. For example, a circuit 550 and/or a processor 530 may be used to dynamically select which of the electrical contacts 541 (and/or 542) may be used in a given sensing event. Some methods include, for each pair of electrical contacts thus selected, dynamically determining a polarity of each electrical contact.

Additional methods for heating will now be disclosed. In certain instances, any suitable heater disclosed herein may be used.

With reference to FIG. 40, some methods include approximating a heater (e.g., 400-411, 500-505) to a surface 600, wherein the heater comprises an array of heating elements 415, 515. Each heating element 415, 515 can include a first electrical contact 441, 541, a second electrical contact 442 (or 441), 542 (or 542) spaced from the first electrical contact, and one or more carbon structures electrically coupling the first electrical contact to the second electrical contact. The term carbon structure is used in its ordinary sense and includes structures that are formed of carbon such as, for example, one or more carbon nanotubes, one or more carbon nanotube meshes, and/or one or more graphene sheets.

The methods can include controlling one or more individual heating elements within the array to induce one or more changes at the surface. In some embodiments, the one or more changes at the surface are non-transient. In various embodiments, the one or more changes at the surface comprise one or more of a physical change or a chemical change. In various embodiments, inducing one or more changes at the surface comprises one or more of etching the surface, deposition of a layer on the surface, melting the surface, solidification of the surface, crystallization, diffusion of one substance into another, functionalization of the surface, doping the surface, alloying the surface, or effecting a chemical reaction at the surface.

In some methods, controlling the one or more individual heating elements comprises addressing one or more of the heating elements. Addressing a heating element can comprise passing current through the one or more carbon structures that electrically couple a pair of first and second electrical contacts. In some embodiments, addressing the one or more heating elements takes place for a predetermined period of time. In other or further embodiments, addressing the one or more elements takes place for a dynamically selected period of time.

In some embodiments, controlling the one or more individual heating elements comprises addressing a first heating element for a first period of time and addressing a second heating element for a second period of time. In some methods, the first and second times are the same. In other or further methods the first and second times are the different. In some methods, the first and second times are executed simultaneously. In other or further methods, the first and second times are executed serially. In some instances, a pause is provided between execution of the first and second times.

In some instances, a physical change is induced at the surface and the physical change is a structuring of the surface.

Some methods include contacting the one or more carbon structures to the surface. In certain of such methods, inducing one or more changes at the surface comprises conducting heat to the surface from one or more of the heating elements.

In some methods, inducing one or more changes at the surface comprises conducting heat to the surface from one or more of the heating elements through an intermediate medium. In various embodiments, the intermediate medium comprises one or more of a gas, a liquid, or a solid.

In some methods, inducing one or more changes at the surface comprises providing radiant heat to the surface from one or more of the heating elements. In some methods, inducing one or more changes at the surface comprises providing heat to the surface from one or more of the heating elements via near field coupling.

In some methods, the array of heating elements comprises a one-dimensional array. The methods can include moving the array of heating elements relative to the surface of an object. For example, either of the heaters could be moved relative to the surface.

In some methods, moving the array of heating elements comprises one or more of moving the array of heating elements along a linear path, moving the array of heating elements in a raster scan pattern, rotating the array of heating elements, or oscillating the array of heating elements.

Some methods include controlling a speed at which the array of heating elements is moved relative to the surface. Controlling the speed can include on or more of increasing the speed of the array of heating elements relative to the surface, decreasing the speed of the array of heating elements relative to the surface, periodically changing the speed of the array of heating elements relative to the surface, changing the speed of the array of heating elements relative to the surface according to a predetermined function of time, or stopping the array of heating elements relative to the surface.

In some methods, the array of heating elements comprises a two-dimensional array. For example, the array can include any of the various arrangements described herein. In some methods, the array of heating elements is held stationary relative to the surface as the one or more changes are induced at the surface. Different heating patterns, movement of heating relative to the surface, or the like may be varied over time by time-dependent addressing of various heating elements.

In some methods, controlling the one or more individual heating elements comprises pulsing current through one or more of the heating elements. In some methods, inducing one or more changes at the surface comprises pulsed heating of the surface.

In some methods, one or more changes comprise writing on the surface. For example, in some methods, the writing comprises adding material to the surface. In other or further methods, the writing comprises subtracting material from the surface.

In some methods, one or more changes take place at one or more localized regions of the surface. In some methods, one or more changes at the surface result in the addition of material to the surface. In other or further methods, one or more changes result in the subtraction of material from the surface.

In various methods, one or more changes alter one or more pathways on the surface. In some instances, the one or more pathways are electrical. In some instances, the one or more pathways are metalized.

In some methods, controlling the one or more individual heating elements comprises forming a temperature gradient via the heating elements. Various methods include driving one or more changes at the surface in a specified direction along the surface and/or driving the one or more changes at the surface at a specified rate along the surface.

Some methods include passing one or more reactants through the array of heating elements, as depicted by the curved arrow. In some instances, the array of heating elements defines multiple openings through which the one or more reactants can pass to come into contact with the surface. In some embodiments, graphene sheets used in certain embodiments of heaters may include openings through which reactants may pass. Some methods thus include passing one or more reactants between adjacent nanotubes. Some methods include passing one or more reactants through one or more individual nanotubes.

In of the various methods described herein, the carbon structure comprises one or more carbon nanotubes. In some methods, the carbon structure comprises one or more graphene sheets. In certain of such methods, a single graphene sheet spans the first and second electrical contacts of at least a plurality of the heating elements.

In some methods, each carbon structure is sufficiently isolated from the remaining carbon structures so as to be individually addressable and/or controllable via the first and second contacts to which it is electrically coupled. In some methods, the heater further comprises one or more current sources, and the method comprises individually accessing and/or controlling one or more of the carbon structures via the one or more current sources. In some methods, the heater further comprises one or more measurement circuits, and wherein the method further comprises individually accessing and/or controlling one or more of the carbon structures via the measurement circuits. Some methods include individually controlling one or more of the carbon structures to characterize one or more properties thereof. In some instances, the one or more properties comprise a resistance of a carbon structure.

In some methods, the heater further comprises a circuit that comprises one or more current sources that are coupled with the first and second contacts of the heating elements, and wherein the method further comprises selectively driving current from the first electrical contacts to the second electrical contacts via the one or more current sources.

Some methods include measuring one or more electrical properties of one or more carbon structures of the array. In various instances, the one or more electrical properties comprise one or more of a voltage across the carbon structure and a resistance of the carbon structure.

Some methods include measuring one or more electrical properties of each pair of first and second electrical contacts. In various instances, the one or more electrical properties comprise one or more of a voltage between the electrical contacts and a resistance between the electrical contacts.

Additional methods for sensing will now be disclosed. In certain instances, any suitable sensor disclosed herein may be used, such as the sensors 400-411, 500-505 described above.

Some methods include approximating a sensor (e.g., 400-411, 500-505) to a surface, wherein the sensor comprises an array of sensing elements, wherein each sensing element comprises a first electrical contact, a second electrical contact spaced from the first electrical contact, and one or more carbon structures electrically coupling the first electrical contact to the second electrical contact. The methods can include determining a thermal property of the surface based on an effect of the thermal property on one or more of the sensing elements.

In some methods, determining the thermal property comprises applying a constant voltage across each pair of first and second electrical contacts and comparing currents that pass through different sensing elements.

In some methods, the thermal property is a temperature distribution. In other or further methods, the thermal property is a conductivity distribution.

Some methods include contacting the one or more carbon structures to the surface.

In some methods, the array of sensing elements comprises a one-dimensional array, and the method includes moving the array of sensing elements relative to the surface. Movement of the array can be in any of the manners discussed above with respect to the methods of heating. Other or further methods include controlling a speed at which the array of sensing elements is moved relative to the surface. Controlling the speed can be in any of the manners discussed above with respect to the methods of heating. Some methods include stopping the array of sensing elements relative to the surface.

In some methods, the array of sensing elements comprises a two-dimensional array. In some instances, the array of sensing elements is held stationary relative to the surface as the thermal property of the surface is determined.

Some methods include reading information from the surface based on the thermal property of the surface. For example, various methods include detecting material that has been added to the surface and/or detecting that material has been subtracted from the surface.

In various methods, the carbon structure comprises one or more carbon nanotubes. In some methods, the carbon structure comprises one or more graphene sheets. In further instances, a single graphene sheet spans the first and second electrical contacts of multiple sensing elements.

Some methods include measuring one or more electrical properties of one or more carbon structures of the array. In some instances, the electrical property can comprise a voltage across the carbon structure. In other or further instances, the electrical property can comprise a resistance of the carbon structure.

Some methods include measuring one or more electrical properties of each pair of first and second electrical contacts. In some instances, the electrical property comprises a voltage between the electrical contacts. In other or further instances, the electrical property comprises a resistance between the electrical contacts.

Figure 41A:
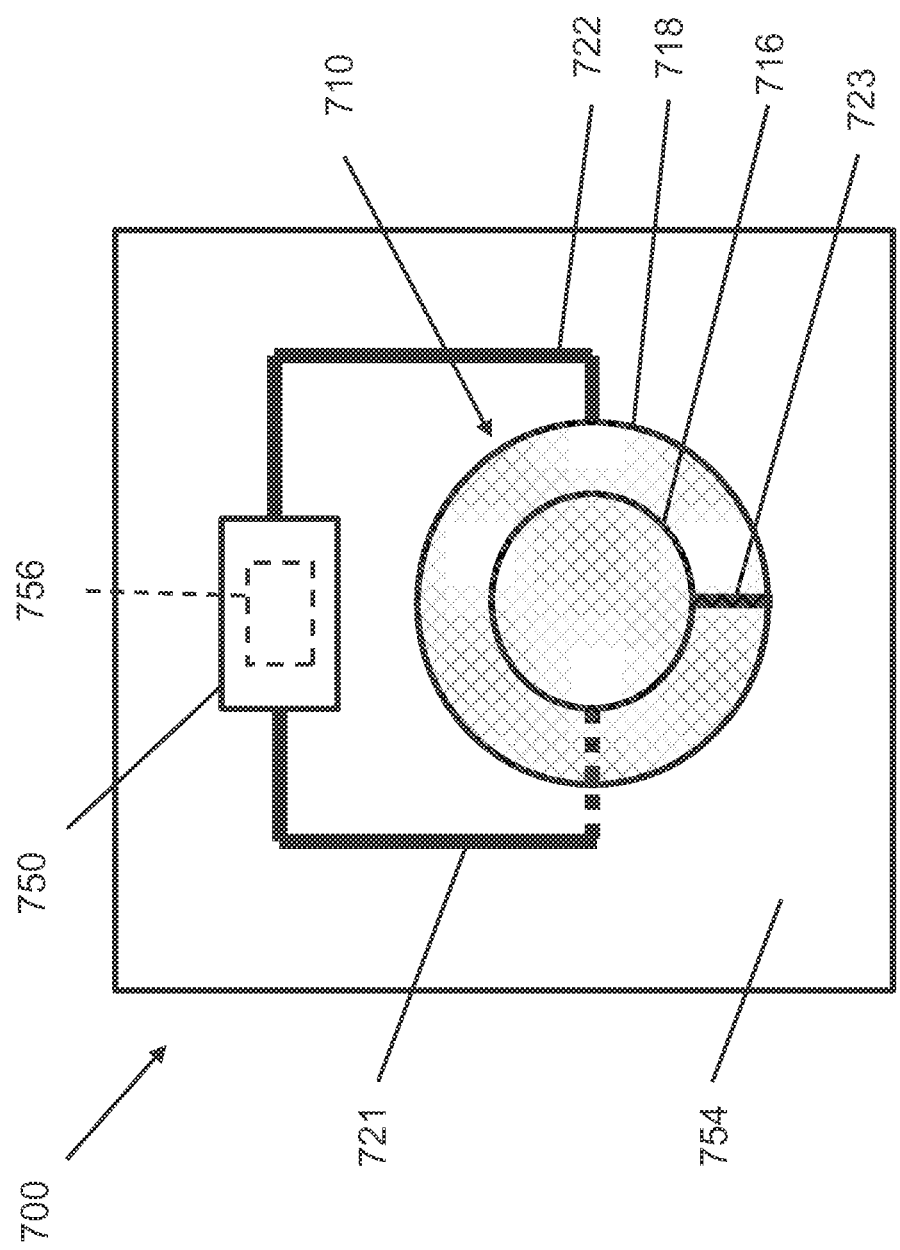
FIG. 41A is a plan view of the thermal device of FIG. 41B.
Figure 41B:
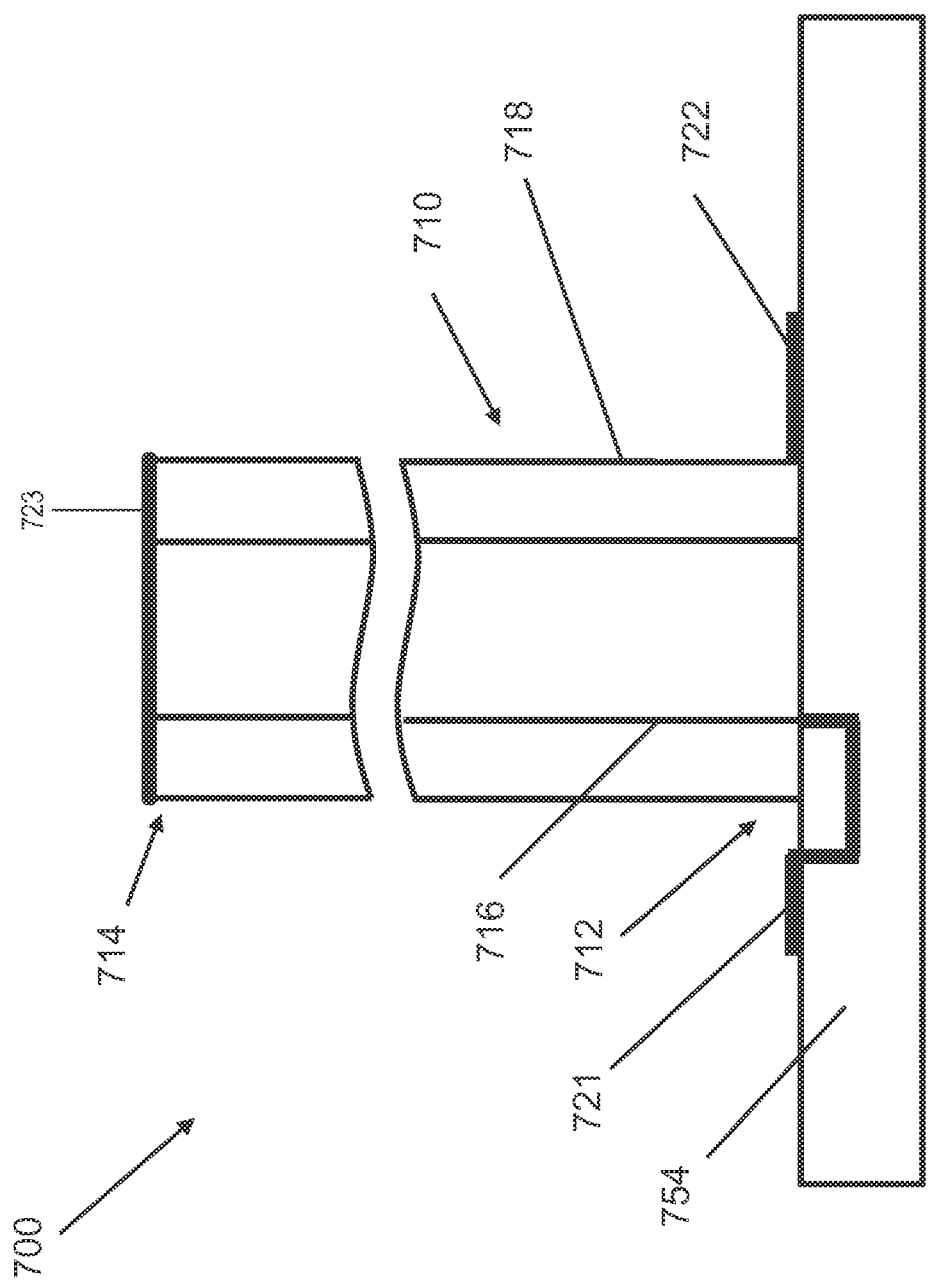
FIG. 41B is a cross-sectional view of an embodiment of a thermal device that includes a multi-wall nanotube coupled with a substrate.
Figure 41C:
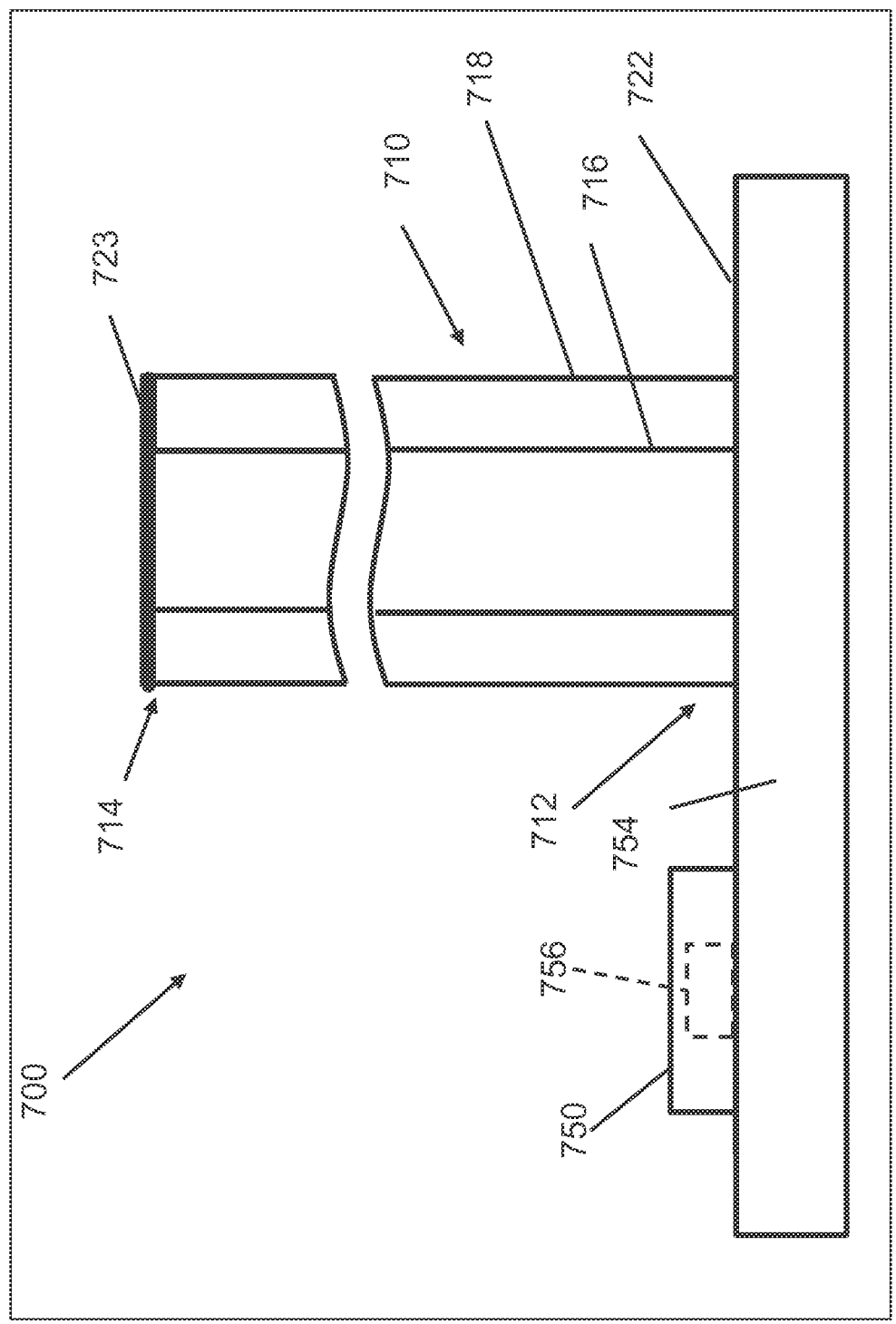
FIG. 41C is another cross-sectional view of the thermal device of FIG. 41B taken along a plane that is perpendicular to a plane of the cross-section of FIG. 41B, wherein the cross-sectional planes of FIGS. 41B and 41C intersect along a longitudinal axis of the multi-wall nanotube.

With reference to FIGS. 41A, 41B, and 41C, in some embodiments, a thermal device 700 can be configured to operate as a heater and/or a sensor. Stated otherwise, the thermal device 700 may be referred to as a heater 700 and/or as a sensor 700, depending on a manner in which the thermal device is configured to operate. In certain embodiments, the thermal device 700 can include a substrate 754 and a multi-wall carbon nanotube 710 coupled to the substrate 754 at a first end 712 thereof. The carbon nanotube 710 can include a second end 714 that is spaced from the substrate 754. The carbon nanotube 710 can further comprise a first wall 716 and a second wall 718 external to the first wall. A first electrical lead 721 can be coupled to the first wall 716 and a second electrical lead 718 can be coupled to the second wall 718. The first and second walls 716, 718 can be electrically coupled to each other via an electrical lead 723.

In certain embodiments, the first and second electrical leads 721, 722 can be supported by the substrate 754. With reference to FIG. 41C, in some embodiments, the thermal device 700 further includes a circuit 750 coupled with the first and second electrical leads 721, 722 that is configured to heat the second end 714 of the carbon nanotube 710 by passing current through the electrical leads 721, 722. In some embodiments, the first and second walls 716, 718 are electrically coupled to each other at the second end 714 of the carbon nanotube 710. For example, the first and second walls 716, 718 can be electrically coupled to each other via an electrical lead 723. In some embodiments, the entire top surface of the carbon nanotube 710 may be covered and/or partially covered with an electrical lead 723 (shown with cross-hatching).

In some embodiments, the circuit 750 is configured to sense a thermal change at the second end 714 of the carbon nanotube 710 based on an effect of the thermal change on the carbon nanotube. In some embodiments, the effect of the thermal change on the carbon nanotube is a change in resistance of the carbon nanotube. For example, the change in resistance can be due at least in part to an increase in temperature of the second end of the carbon nanotube. In other or further instances, the change in resistance is due at least in part to a decrease in temperature of the second end of the carbon nanotube.

In some embodiments, the circuit 750 can be configured to determine a magnitude of the change in the resistance of the carbon nanotube based on a change in voltage across the first and second walls 716, 718. In other or further embodiments, the circuit 750 is configured to determine whether or not a thermal change occurs at the second end 714 of the carbon nanotube by determining whether or not a voltage across the first and second walls changes.

In some embodiments, the circuit 750 is configured to determine a magnitude of the change in the resistance of the carbon nanotube based on a change in current passing through the nanotube. In other or further embodiments, the circuit 750 is configured to determine whether or not a thermal change occurs at the second end of the carbon nanotube by determining whether or not a current passing through the nanotube changes.

In some embodiments, the circuit 750 is configured to determine a magnitude of the change in resistance of the carbon nanotube based on a change in power dissipated in the circuit. In other or further embodiments, the circuit 750 is configured to determine whether or not a thermal change occurs at the second end of the carbon nanotube by determining whether or not a level of power dissipated in the circuit changes.

In some embodiments, the circuit 750 is configured to counteract a change in the resistance at the second end 714 of the nanotube so as to maintain the nanotube at a constant resistance. In further embodiments, the circuit 750 comprises a feedback circuit 756 that is configured to counteract a change in the resistance of the nanotube by controlling a current within the feedback circuit. In some embodiments, a magnitude of the thermal change is detected via a magnitude of a change in the current used to maintain the nanotube at the constant resistance.

In some embodiments, the circuit 750 is configured to maintain a constant voltage across the first and second walls 716, 718 of the carbon nanotube 710. In further embodiments, changes in the circuit 750 that aid in maintaining the constant voltage are used to determine whether or not a thermal change occurs at the second end 714 of the carbon nanotube. In some embodiments, changes in the circuit 750 that aid in maintaining the constant voltage are used to determine a magnitude of a thermal change at the second end 714 of the carbon nanotube.

In some embodiments, the circuit 750 is configured to pass a constant current through the nanotube 710. In further embodiments, changes in the circuit 750 that aid in maintaining the constant current are used to determine whether or not a thermal change occurs at the second end of the carbon nanotube. In some embodiments, changes in the circuit 750 that aid in maintaining the constant current are used to determine a magnitude of a thermal change at the second end 714 of the carbon nanotube.

In certain embodiments, the circuit 750 is configured to dissipate a constant power. In further embodiments, changes in the circuit 750 that aid in maintaining the constant power are used to determine whether or not a thermal change occurs at the second end 714 of the carbon nanotube. In some embodiments, changes in the circuit that aid in maintaining the constant power are used to determine a magnitude of a thermal change at the second end of the carbon nanotube.

In some embodiments, a system comprises a plurality of thermal devices arranged in a one-dimensional array. In the illustrated embodiment, each of the plurality of thermal devices defines a longitudinal axis that extends into and out of the page. The longitudinal axes of the four illustrated thermal devices are thus substantially parallel to each other. Other arrangements are also possible.

In the illustrated embodiment, each of the plurality of thermal devices comprises a circuit coupled with the first and second electrical leads thereof. In some embodiments, the circuit of each thermal device is configured to heat the second end of the carbon nanotube thereof by passing current through the electrical leads thereof. In other or further embodiments, the circuit of each thermal device is configured sense a thermal change at the second end of the carbon nanotube thereof based on an effect of the thermal change on the carbon nanotube.

In some embodiments, a processor is coupled with the circuit of each of the thermal devices. In some embodiments, the processor is configured to form a temperature gradient at the second ends of the carbon nanotubes. In other or further embodiments, the processor is configured to sense a temperature gradient at the second ends of the carbon nanotubes. More or fewer thermal devices are used in other embodiments.

In some embodiments, a system comprises a plurality of thermal devices arranged in a two-dimensional array. In some embodiments, each thermal device can include a separate circuit such as discussed above. In some instances, the circuits may be at or near the nanotube, such as depicted in FIG. In the illustrated embodiment, the circuits are incorporated into the processor. Electrical couplings between each thermal device and the processor are not shown. More or fewer thermal devices are used in other embodiments.

The thermal devices and the systems can be used in any suitable manner. For example, any of the methods for heating and/or sensing disclosed herein may be employed with one or more thermal devices and/or one or more of the systems, as appropriate.

For example, with reference again to FIGS. 41A-41C, each multi-wall nanotube 710 may be considered a heating element or a sensing element, depending on how it is used. Each such heating and/or sensing element can include a first electrical contact (e.g., the electrical lead 721), a second electrical contact (e.g., the electrical lead 722), and one or more carbon nanostructures that electrically couple the first and second electrical contacts. Here, the carbon nanostructures can comprise the multi-wall nanotubes 710. As previously discussed, in some embodiments, the nanotubes 710 may include an electrical lead 723, which may be located at the second end 714 of nanotube 710 or at any other suitable position. The electrical lead 723 electrically couples the first and second nanotube walls 716, 718, thus permitting the nanotube 710 to provide an electrical coupling of the first and second electrical leads 721, 722.

In various embodiments, a thermal device 700, or an array of such devices, may be approximated to a surface, such as the surface discussed above. Any suitable heating and/or sensing operations may be performed in manners such as discussed above.

Figure 42:
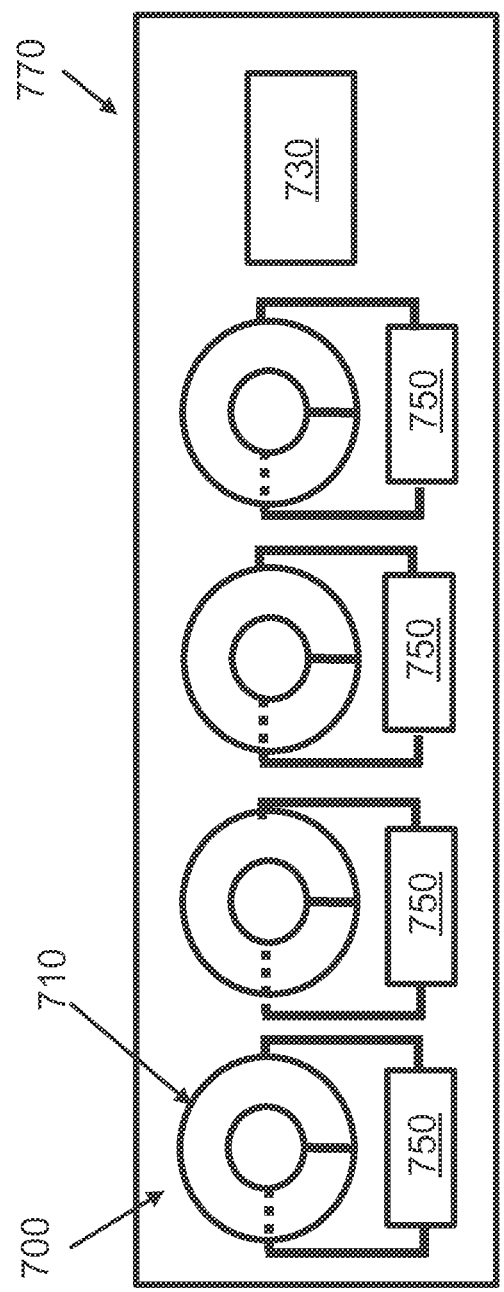
FIG. 42 is a plan view of an embodiment of a system that includes a plurality of thermal devices arranged in a one-dimensional array.

FIG. 42 is a plan view 770 of an embodiment of a system that includes a plurality of thermal devices 700 arranged in a one-dimensional array with a processor 730 and circuit 750 components, as described herein.

Figure 43:
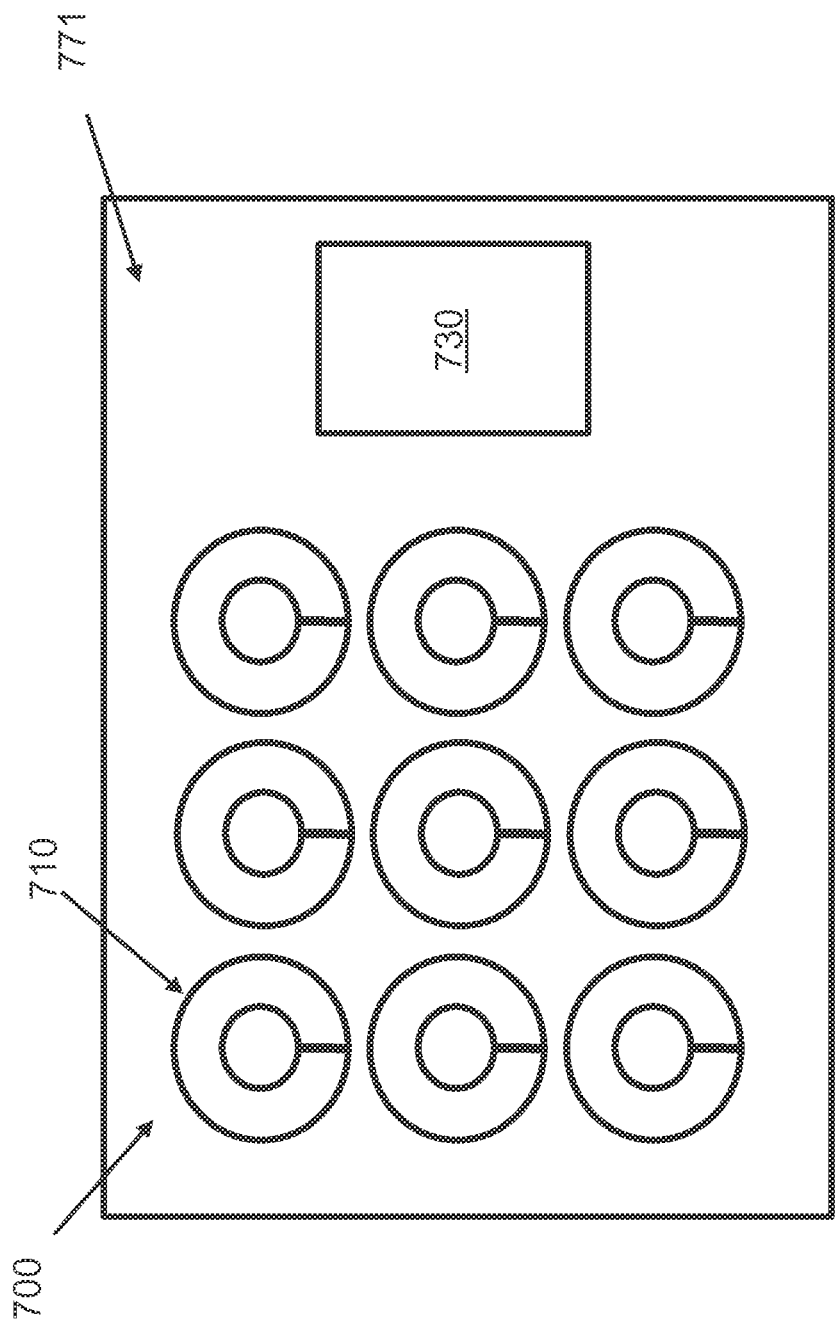
FIG. 43 is a plan view of another embodiment of a system that includes a plurality of thermal devices, wherein the thermal devices are arranged in a two-dimensional array.

FIG. 43 is a plan view of another embodiment 771 of a system that includes a plurality of thermal devices 700 with multi-walled nanotubes 710, wherein the thermal devices 700 are arranged in a two-dimensional array and are in communication with one or more processors 730.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

References to approximations are made throughout this specification, such as by use of the terms "about" or "approximately." For each such reference, it is to be understood that, in some embodiments, the value, feature, or characteristic may be specified without approximation. For example, where qualifiers such as "about," "substantially," and "generally" are used, these terms include within their scope the qualified words in the absence of their qualifiers. For example, where the term "substantially the same" is recited with respect to a feature, it is understood that in further embodiments, the feature can be precisely the same.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. The term "first" in the claims with respect to a given feature does not necessarily imply the existence of a second or greater number of that feature.

The invention claimed is:

1. A method of heating comprising:
in a heater comprising an array of a plurality of heating elements, wherein each heating element comprises:
a first electrical contact;
a second electrical contact; and
a nanostructure electrically coupling the first electrical contact to the second electrical contact,
causing the selective heating of one or more individual heating elements by selectively addressing one or more individual heating elements within the array by driving an electrical current from one electrical contact to another contact for each heating element thus addressed.

2. The method of claim 1, wherein each nanostructure is sufficiently electrically isolated from the remaining nanostructures so as to be individually addressable via one or more of the first and second contacts to which it is electrically coupled.

3. The method of claim 2, wherein the heater further comprises one or more current sources, and wherein the method further comprises individually accessing one or more of the nanostructures via the one or more current sources.

4. The method of claim 1, wherein each nanostructure is sufficiently electrically isolated from the remaining nanostructures so as to be individually controllable via one or more of the first and second contacts to which it is electrically coupled.

5. The method of claim 4, wherein the heater further comprises one or more current sources, and wherein the method further comprises individually controlling one or more of the nanostructures via the one or more current sources.

6. The method of claim 1, further comprising measuring one or more electrical properties of each pair of first and second electrical contacts via the circuit.

7. The method of claim 1, wherein said selectively addressing one or more individual heating elements within the array comprises addressing a plurality of the heating elements as a set.

8. The method of claim 1, wherein selectively addressing the one or more individual heating elements comprises addressing a first heating element for a first period of time and addressing a second heating element for a second period of time.

9. The method of claim 1, wherein the array of heating elements comprises a one-dimensional array, the method further comprising moving the array of heating elements relative to the surface.

10. The method of claim 9, wherein said moving the array of heating elements comprises rotating the array of heating elements.

11. The method of claim 9, wherein said moving the array of heating elements comprises oscillating the array of heating elements.

12. The method of claim 1, wherein the array of heating elements comprises a two-dimensional array.

13. The method of claim 1, wherein selectively addressing the one or more individual heating elements comprises forming a temperature gradient via the heating elements.

14. The method of claim 1, further comprising passing one or more reactants through the array of heating elements.

15. The method of claim 1, wherein each nanostructure is sufficiently electrically isolated from the remaining nanostructures so as to be individually controllable via the first and second contacts to which it is electrically coupled.

16. The method of claim 1, further comprising measuring one or more electrical properties of each pair of first and second electrical contacts.

17. A method comprising:
approximating a heater to a surface, wherein the heater comprises an array of a plurality of heating elements, wherein each heating element comprises: a first electrical contact; a second electrical contact spaced from the first electrical contact; and one or more carbon nanostructures electrically coupling the first electrical contact to the second electrical contact; and
controlling one or more individual heating elements within the array to induce one or more changes at the surface.

18. The method of claim 17, wherein inducing one or more changes at the surface comprises conducting heat to the surface from one or more of the heating elements through an intermediate medium.

19. The method of claim 17, further comprising:
moving the array of heating elements relative to the surface; and controlling a speed at which the array of heating elements is moved relative to the surface.

20. The method of claim 17, wherein the one or more changes alter one or more pathways on the surface.

21. The method of claim 17, wherein each nanostructure is sufficiently electrically isolated from the remaining nanostructures so as to be individually addressable via the first and second contacts to which it is electrically coupled.

* * * * *